United States Patent [19]
Roden et al.

[11] Patent Number: 5,500,946
[45] Date of Patent: Mar. 19, 1996

[54] INTEGRATED DUAL BUS CONTROLLER

[75] Inventors: Philip Roden, Plano; Khodor Elnashar; Brian T. Deng, both of Richardson; Steve Tsang, Dallas, all of Tex.; William Saperstein, San Mateo, Calif.

[73] Assignee: Texas Instruments Incorporated, Dallas, Tex.

[21] Appl. No.: 380,453

[22] Filed: Jan. 27, 1995

Related U.S. Application Data

[63] Continuation of Ser. No. 981,657, Nov. 25, 1992, abandoned.

[51] Int. Cl.⁶ ..................................................... G06F 13/14
[52] U.S. Cl. .................. 395/308; 395/290; 364/240.5; 364/DIG. 1; 364/926.91; 364/DIG. 2
[58] Field of Search .................................. 395/325, 275, 395/725, 308, 309, 290; 364/240.5, DIG. 1, 926.91, DIG. 2

[56] References Cited

U.S. PATENT DOCUMENTS

| | | | |
|---|---|---|---|
| 4,257,095 | 3/1981 | Nadir | 395/325 |
| 4,281,380 | 7/1981 | DeMesa, III et al. | 395/325 |
| 4,807,109 | 2/1989 | Farrell et al. | 395/325 |
| 5,029,074 | 7/1991 | Maskas et al. | 395/325 |
| 5,050,066 | 9/1991 | Myers et al. | 395/575 |
| 5,129,090 | 7/1992 | Bland et al. | 395/725 |
| 5,179,713 | 1/1993 | Catlin et al. | 395/800 |
| 5,182,808 | 1/1993 | Bagnoli et al. | 395/725 |
| 5,280,589 | 1/1994 | Nakamura | 395/325 |
| 5,280,590 | 1/1994 | Pleva et al. | 395/325 |

Primary Examiner—Glenn A. Auve
Attorney, Agent, or Firm—Thomas G. Eschweiler; James C. Kesterson; Richard L. Donaldson

[57] ABSTRACT

A dual bus controller includes a system bus control module connected to a local bus control module. An optional filter is also connected to the system bus control module. A plurality of programmable status registers for the local bus is connected to the local bus control module and a time dependent reset circuit is connected to both the system bus control module and the local bus control module. The dual bus controller allows simultaneous, autonomous activity with both the local bus and the system bus via the local bus and system bus control modules. The unique interaction between the local bus and system bus control modules also allow both the local bus and system bus to interact with the dual bus controller operating as a slave without any imposed speed limitations by actively resolving bus collisions and "live-lock" conditions.

5 Claims, 2 Drawing Sheets

INTEGRATED DUAL BUS CONTROLLER

This application is a continuation of application Ser. No. 07/981,657, filed Nov. 25, 1992 now abandoned.

FIELD OF THE INVENTION

This invention is in the area of computers and more specifically relates to bus controller architecture.

BACKGROUND OF THE INVENTION

The design of bus controllers has evolved over the years as performance requirements and customer needs have driven computer architectures to become more sophisticated and efficient. Specifically, the desire for higher performance has necessitated that a bus controller be able to operate with both a local bus and a system bus simultaneously and autonomously. Additionally, a bus controller that is not limited with regard to speed is needed; in this way both the local bus or the system bus may interact with the bus controller as fast as circuitry on the boards permit without suffering from speed limitations incurred by the bus controller. Lastly, a need has been felt for a bus controller that may operate as a master during a transaction or as a slave during a transaction simultaneously with both the local bus and the system bus, thus providing for more system flexibility.

The design of bus architectures typically include a number of compromises to optimize performance parameters that may be inversely related to one another. Certain bus architecture standards are designed as open standards to provide a general framework, yet provide flexibility so that performance criteria may be enhanced for specific system applications. Futurebus+ is one such open standard. The Futurebus+ standard is an IEEE specification #896.1–1991 and is described in an article entitled "Futurebus+ Coming of Age" (Theus, John, "Futurebus+ Coming of Age", *Microprocessor Report*, May 27, 1992, pp. 17–22).

It is an object of this invention to provide a dual bus controller architecture that enables simultaneous, autonomous interaction with both the local bus and the system bus and is compatible with the Futurebus+ bus architecture standard (IEEE spec #896.1-1991). It is another object of this invention to provide a dual bus controller architecture that allows both the local bus and the system bus to interact with the bus controller operating as a master or a slave without any imposed speed limitations. Other objects and advantages of the invention will become apparent to those of ordinary skill in the art having reference to the following specification together with the drawings herein.

SUMMARY OF THE INVENTION

A dual bus controller includes a system bus control module connected to a local bus control module. An optional filter is also connected to the system bus control module. A plurality of programmable status registers for the local bus is connected to the local bus control module and a time dependent reset circuit is connected to both the system bus control module and the local bus control module. The dual bus controller allows simultaneous, autonomous activity with both the local bus and the system bus via the local bus and system bus control modules. The unique interaction between the local bus and system bus control modules also allow both the local bus and system bus to interact with the dual bus controller operating as a slave without any imposed speed limitations by actively resolving bus collisions and "live-lock" conditions.

BRIEF DESCRIPTION OF THE DRAWINGS

FIG. 2 is a block level diagram illustrating the preferred embodiment of the invention, a dual bus controller 22a.

DETAILED DESCRIPTION OF THE PREFERRED EMBODIMENT

Figure 1:
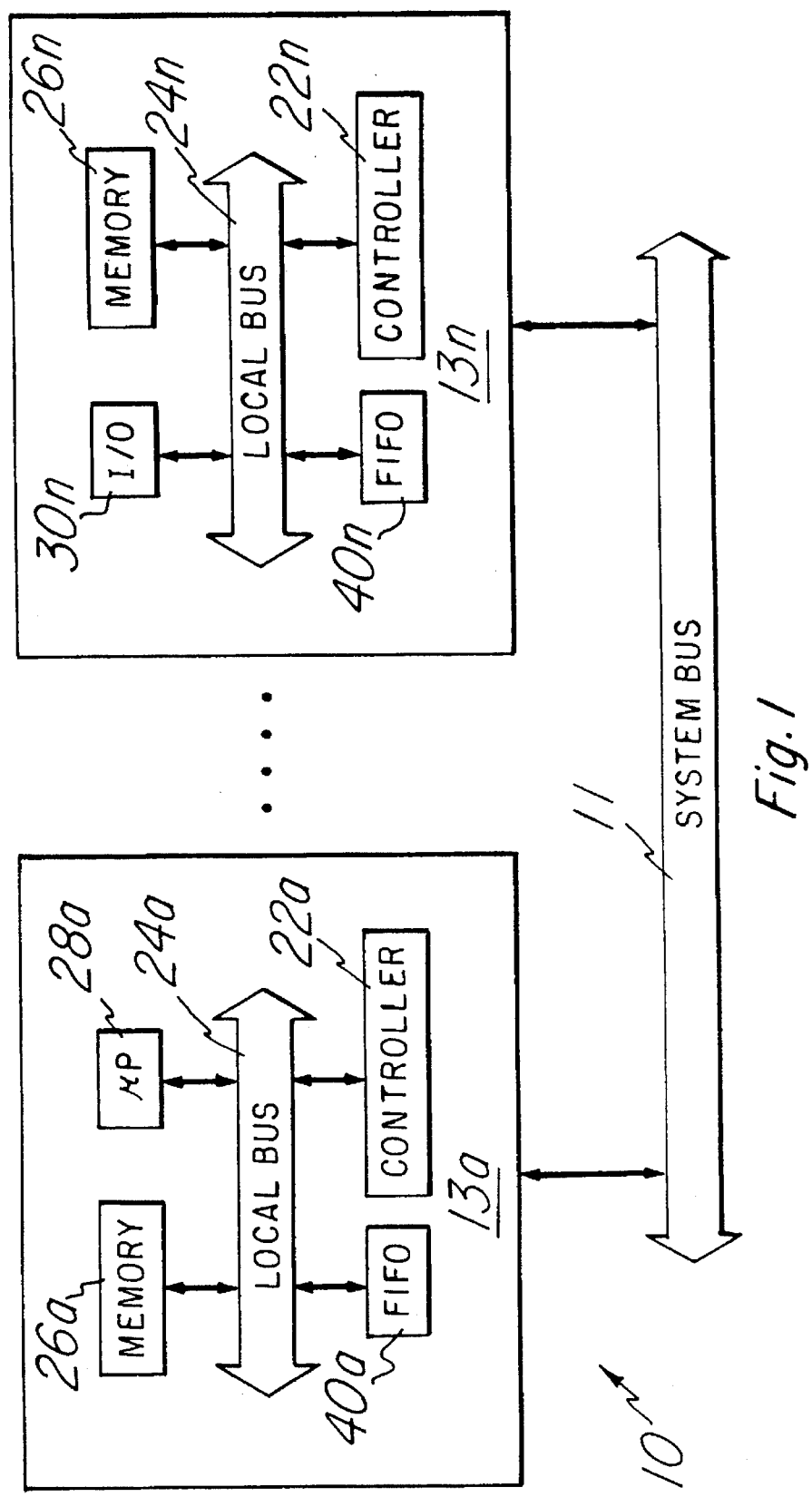
FIG. 1 is a block level diagram illustrating a backplane based computer system 10.

FIG. 1 is a block level diagram illustrating a backplane based computer system 10. Computer system 10 includes a system bus 11 connected to a plurality of computer boards 13a–n. Each computer board 13a–n includes a local bus 24a–n, a bus controller 22a–n, and possibly a memory 26, a microprocessor 28, an input/output (I/O) device 30 or other type devices depending upon each board's 13a–n application requirements. Each board 13a–n communicates with one another via system bus 11.

Figure 2:
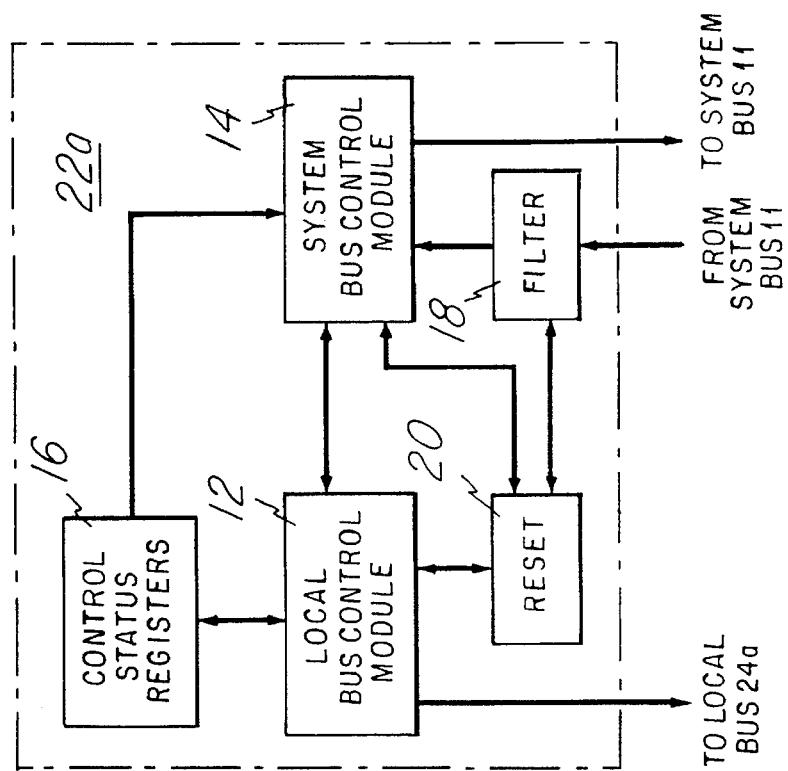

FIG. 2 is a block level diagram illustrating the preferred embodiment of the invention, a dual bus controller 22a. Within bus controller 22a a system bus control module 14 is connected to a filter 18, a reset circuit 20, a system bus 11, a local bus control module 12, and a plurality of control status registers 16. Local bus control module 12 is also connected to control status registers 16, reset circuit 20, and a local bus 24a. Filter 18 is also connected to reset circuit 20 and to system bus 11.

System bus control module 14 monitors signals on system bus 11 (which in this particular embodiment is a Futurebus+ system bus) and maintains the appropriate handshake protocols necessary for proper operation with Futurebus+ 11. System bus control module 14 will be described in greater detail later. Local bus control module 12 monitors signals on local bus 24a and maintains the appropriate handshake protocols necessary for proper operation with local bus 24a. Additionally, local bus control module 12 also decodes and encodes commands from local bus 24a to Futurebus+ 11 and from Futurebus+ 11 to local bus 24a. This allows Futurebus+ 11 and local bus 24a to be completely independent of one another with respect to speed and handshake protocols. Therefore, local bus control module 12 acts as a command translator between Futurebus+ 11 and local bus 24a. Local bus control module 12 also provides synchronization circuitry which allows signals to cross the timing boundaries between different time domains. This allows either or both Futurebus+ 11 and local bus 24a to be asynchronous. (Futurebus+ 11 is an asynchronous bus).

Filter 18 is an optional filter that allows incoming signals from Futurebus+ 11 to be glitch filtered. This is sometimes desired when each computer card 13a–n in a backplane based computer environment is configured in a "wired-OR" configuration which is well known by those skilled in the art of system design. It is often desired to glitch filter incoming signals since they may suffer from the "wired-OR" glitch phenomena which is also well known by those skilled in the art. Other times, due to speed requirements or specific transaction types, filtering of incoming signals is not desirable; therefore the filter is optional and use will depend upon the specific operation being performed.

Reset block 20 is a time dependent reset circuit that conforms to the Futurebus+ spec noted earlier. Therefore, depending upon the duration of a reset signal being asserted, different types of reset operations take place. Different types of reset include: start, power-up, system initialization, and local bus initialization.

Control status registers 16 include a plurality of programmable status and configuration registers. Therefore, via software, control status registers 16 may be programmed to indicate the capability of the components within system 10. These capabilities may include: address size, data size, memory capacity, interrupt registers, timers, data speed capabilities, glitch filter settings, bus status, and enables.

Figure 3:
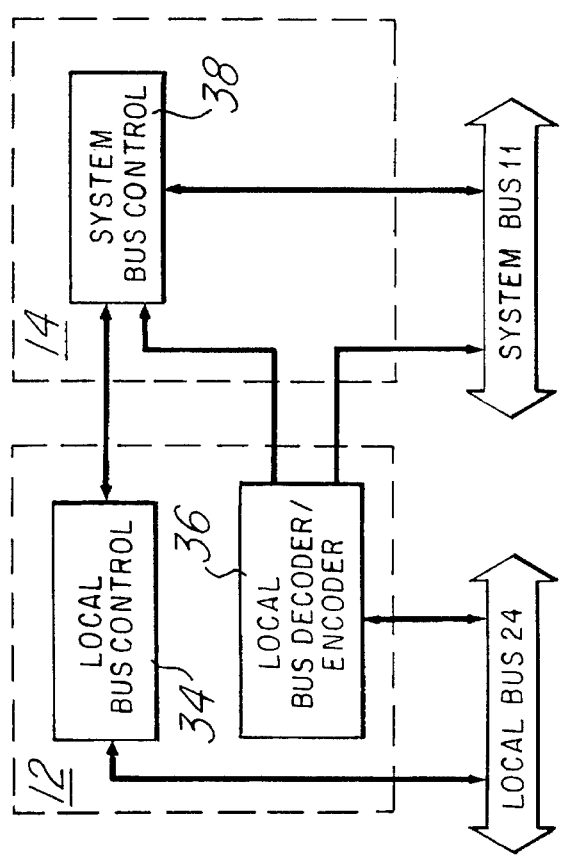
FIG. 3 is a block diagram illustrating in greater detail a local bus control module 12 and a system bus control module 14 within dual bus controller 22a of FIG. 2.

FIG. 3 is a block level diagram illustrating in greater detail local bus control module 12 and system bus control module 14 of FIG. 2. It was stated earlier that local bus control module 12 monitors signals on local bus 24a and decoded command signals between local bus 24a and Futurebus+ 11. FIG. 3 illustrates the two separate functions of local bus control module 12, a local bus control 34, and a local bus decoder/encoder 36. Local bus control 34 may include a state machine and synchronizer. Local bus decoder/encoder 36 is composed of standard decoding circuitry well known by those skilled in the art. System bus control module 14 is composed of system bus control 38 which may include a state machine.

Dual bus controller 22a resides on computer board 13a and communicates with devices on board 13a via local bus 24a and with components on other boards via system bus 11. Bus controller 22a may advantageously become a bus slave of both local bus 24a and Futurebus+ 11 simultaneously with the ability to resolve both bus collisions and "live-lock" problems which are well known be those skilled in the art. Additionally, bus controller 22a may operate with both local bus 24a and Futurebus+ 11 simultaneously and autonomously, thereby improving system 10 performance. Thus, for example, bus controller 22a may simultaneously be sending data to a component on local board 13a via local bus 24a and performing an appropriate handshake with Futurebus+ 11. This improves system performance.

The following is an example illustrating the ability of bus controller 22a to operated as a slave simultaneously with both local bus 24a and Futurebus+ 11. Board A 13a wants to transfer data to board B 13b. Simultaneously, board B 13b wants to transfer data to board A 13a. Both boards make requests for Futurebus+ 11, yet only one board will receive a grant which will depend upon the priorities of each request. In this instance, board A 13a has a higher priority and receives a grant for Futurebus+ 11. Microprocessor 28a on board A 13a presently is the master of local bus 24a and controller 22a is the slave of local bus 24a. This same series of events occurs on board B with a microprocessor 28b (not shown) being the master on local bus 24b and the controller 22b the slave. The data then transfers from memory 26a to FIFO 40a via local bus 24a; FIFO 40a acts as a temporary data storage on board A 13a. Typically, on board A 13a processor 28a or memory 26a is master moving data into FIFO 40a via local bus 24a. Then controller 22a becomes the master on Futurebus+. While controller 22a is a master on Futurebus+, controller B 22b is a slave on Futurebus+. This typically would be a problem since bus controller 22b on board B 13b is now a slave of both local bus 24b and Futurebus+ 11 simultaneously, however bus controller 22b has the ability to recognize this potential problem through the monitoring of signals on local bus 24b and Futurebus+ 11. When this case occurs, bus controller 22b sends a signal to the microprocessor on board B 13b telling it to "back-off" on its attempt to send data to board A 13a. This frees local bus 24b to complete the transaction of sending data from board A 13a to board B 13b. Data is transferred to a memory 32b or an I/O device 30b on board B 13b via Futurebus+ 11, bus controller 22b, and local bus 24b. After completion of this transaction, board B may then complete its desired transaction of sending data from board B 13b to board A 13a. Similarly, when both local bus 24b and Futurebus+ 11 are bus masters bus controller 22b utilizes the "back-off" feature to avoid the bus collision that may occur.

It should also be noted that the "back-off" feature may work with either Futurebus+ 11 or a local bus 24a–n. However, bus controllers 22a–n are configured specifically to operate the "back-off" signal in the majority of cases with local buses 24a–n. This is to avoid the "live-lock" phenomena which is well known by those skilled in the art. If the "back-off" signal were used with Futurebus+ 11 it is possible that two boards, for example board 13a and board 13b, may alternately back each other off Futurebus+ 11 when attempting a transaction. Therefore, although Futurebus+ 11 is active (back-off signals are traveling along Futurebus+ 11) neither transaction is being executed and system 10 becomes "locked up". Bus controllers 22a–n traverse this problem by implementing the "back-off" signal on local buses 24a–n, therefore transactions always travel along Futurebus+ 11 without any impediments and the risk of system 10 lock-up is eliminated.

Dual bus controller 22a also may operate with both local bus 24a and Futurebus+ 11 simultaneously and autonomously. This feature is due primarily to the independent operation of local bus control module 12 and system bus control module 14. Below is an example illustrating how these modules interact to provide the decoupling feature and thereby the improved performance.

Bus controller 22a on board 13a monitors signals on both Futurebus+ 11 via system bus control module 14 and local bus 24a via local bus control module 12. Microprocessor 28a on board A 13a wants to transfer data to memory 32b on board B 13b. Local bus decoder 36 within local bus system module 12 in bus controller 22a decodes the address and determines that the address resides in memory 32b on board B 13b and translates a request to system bus control 38 within system bus control module 14. System bus control module 14, in response, makes a request for mastership of Futurebus+ 11. As system bus control module 14 is making a request for Futurebus+ 11 it also sends a signal to local bus control module 12 indicating that bus controller 22a is in the "request phase" of the transaction. After that event, this triggers the transfer of data from memory 26a to FIFO 40a on board A. After data has been sent to FIFO 40a local bus control module 12 sends a signal to system bus control module 14 via local bus control 34 indicating that data is in FIFO 40a and ready for transfer to memory 32b on board B 13b which begins the "data phase" of the transfer. System bus control module 14 relays a signal back to local bus control module 12 indicating the that Futurebus+ 11 is in the "data phase" of the transaction. Local bus control module 12, in response to the "data phase" signal, effectively disconnects from system bus control module 14 and is therefore independent of the remainder of the data transfer to memory 32b on board B 13b. The data in FIFO 40a is transferred along Futurebus+ 11 to its destination in memory 32b on board B 13b during the Futurebus+ "data phase". While the transfer of data from FIFO 40a to memory 32b is occurring, new activity may occur on board A 13a along local bus 24a via local bus control module 12. In one instance, data from memory 26a could again be retrieved and stored in FIFO 40a for future transfer independent of the speed of the Futurebus+ transaction. The ability to operate along local bus 24a and Futurebus+ 11 simultaneously and autonomously greatly improves system performance in that certain operations may occur in a pipeline or parallel fashion as opposed to a serial fashion.

Table 1, listed below, is a Verilog program listing. Verilog is a behavioral program which translates macro-level system inputs into a gate level schematic and is well known by those skilled in the art of digital circuit design. The following Verilog program listing is a detailed representation of dual bus controller 24a–n and describes the gate-level construction of dual bus controller 24a–n.

//node_27aa0/cadence/tifb/ioc/b/ioc.v                                           modified 07/15/92 7:01 AM

```
//*********************************************************************
//
//      Model Name      : ioc.v
//      Revision        : $Revision: 2.22 $
//      Date            : $Date: 92/07/15 07:56:59 $
//      Author          : Phil Roden/Brian Deng
//      Description     : IOC top level with i/o
//
//*********************************************************************

//*********************************************************************
// Module Definition
//*********************************************************************
module ioc
        (
        // Inputs
                ca              , // fbus capability
                at              , // fbus input status as              , // fbus  address strobe
                ak              , // fbus  address acknowledge
                ai              , // fbus address acknowledge inverse
                ds              , // fbus data strobe
                dk              , // fbus data acknowledge
                di              , // fbus data acknowledge inverse et              , // fbus end of tenure indication
                gr              , // fbus grant acknowledge
                pe              , // fbus pre-empt hadec           , // hbus address decode
                fadec           , // fbus address decode
                \f_ack*         , // fbus dpu acknowledge
                \data_av*       , // dpu data available
                \sp_av*         , // dpu space available
                \unaligned*     , // unaligned partial
                \cpyrq*         , // copyback request
                \cfull*         , // store cache full
                tsiz            , // hbus transaction size
//              tdi             , // jtag test port data in
//              tck             , // jtag test port clock in
//              tms             , // jtag test port mode select \more*          , // some pin for dma mode
                \ignore*        , // some pin to ignore hbus x-fers
                \hbg*           , // hbus grant
                clk             , // hbus clock
                ref_clk         , // packet clock \rst*           , // power up reset
                re              , // fbus reset input
                aq              , // some pin used for reset
                ar              , // some pin used for reset
                arb_err         , // some pins for arb error
                dpc_err         , // dpc parity error \lb_wr*         , // lbus read/write
                \lb_cs*         , // lbus chip select
                \lb_oe*         , // lbus output enable
                b_la            , // lbus address
                \rstbypass*     , // reset block bypass // Outputs
                \f_rd*          , // direction of fbus transaction
                \f_strb*        , // fbus to/from FIFO strobe
                f_mode          , // f_mode for external dpu
                \selected*      , // module selected for fbus trans.

h_mode          , // h_mode for external dpu
                dma_mode        , // dma mode
                \h_strb*        , // dpu h_strb
                \fifo_rst*      , // reset the fifo \as+            , // fbus address strobe
                \ak+            , // fbus address acknowledge
                \ai+            , // fbus address acknowledge inverse \ds+            , // fbus data strobe
                \dk+            , // fbus data acknowledge
                \di+            , // fbus data acknowledge inverse
```

```
//node_27ea0/cadence/tifb/ioc/b/ioc.v                              modified 07/15/92 7:01 AM \et*          , // fbus end of tenure indication
                \ca*          , // fbus output capability
                \st*          , // fbus output status
                \ad_drv*      , // btl ad bus driver direction
                ad_rcv        , // btl ad bus receiver direction
                \cm_wr*       , // btl cmd driver direction \int*         , // hbus interrupt \binit*       , // fbus init
                \sys_rst*     , // system reset
                \re*          , // fbus reset output
                \busi*        , // bus idle rq            , // fbus request \hbr*         , // hbus bus request //              tdo           , // jtag test port data out \fb_grant*    , // x-fer address hbus -> addreg
                \new_addr*    , // new address into addreg
                \hbgack_o*    , // Bi-directionals cm            , // fbus command
                cp            , // fbus command parity \has*         , // hbus address strobe
                \hds*         , // hbus data strobe
                \hip*         , // hbus transaction in progress
                \dsack*       , // hbus data strobe acknowledge
                \bstrdy*      , // hbus burst ready \tr_w*        , // direction of hbus transaction
                \lk*          , // indivisible cycle indication
                \tbst*        , // burst request
                \dw64*        , // data width indication
                dl            , // data length encoding \bstat*       , // hbus status lines \hbgack*      , // hbus bus grant acknowledge \snack*       , // hbus snack
                \share*       , // hbus share
                \inv*         , //
                \cc*          , // hbus cache data
                b_ld          , // lbus data
                b_lp            // lbus parity

) ;

//*****************************************************************************
// Define Parameters (optional)
//*****************************************************************************

// Not Applicable

//*****************************************************************************
// Port Declarations
//*****************************************************************************
        input
                as, ak, ai, ds, dk, di, et,
                gr, pe, \f_ack* , \data_av* , \sp_av* ,
                \unaligned* , \cpyrq* , \cfull* ,
//                tdi, tck, tms,
                \ignore* , \hbg* , clk, ref_clk,
                \rst* , re, \more* ,
                aq, ar, \lb_wr* ,\lb_cs* ,\lb_oe* ,\rstbypass* ;
        input [1:0]
                arb_err, tsiz, dpc_err ;
        input [2:0]
                ca ;
        input [3:0]
                hadec, fadec ;
        input [7:0]
                st ;
        input [11:0]
```

//node_27ea0/cadence/t1fb/ioc/b/ioc.v                                          modified 07/15/92  7:01 AM

```verilog
            b_la;

output
            \f_rd* , \f_strb* ,
            \selected* , dma_mode,
            \h_strb* , \fifo_rst* ,
            \as+ , \ak+ , \ai+ , \ds+ ,
            \dk+ , \di+ , \et+ ,
            \ad_drv* , ad_rcv, \cm_wr* ,
            \int* , \binit* , \sys_rst* ,
            \re+ , \busi* ,                  //tdo ,
            \hbr* , \fb_grant* ,\new_addr* , \hbgack_o* ;
    output [1:0]
            rq;
    output [2:0]
            \ca+ , f_mode, h_mode;
    output [7:0]
            \st+ ;

inout
            cp, \has* , \hds* , \hip* , \bstrdy* ,
            \tr_w* , \lk* , \tbst* , \dw64* , \inv* ,
            \hbgack* , \snack* , \share* , \cc* , b_lp ;
    inout [1:0]
            \dsack* , dl, \bstat* ;
    inout [7:0]
            cm, b_ld ;

`protect
//********************************************************************
// Net Assignments and Declarations
//********************************************************************

// *** Define internal busses from pins

// *** Define inter-module nets wire \fbc_err* , berr, hdata64_cap, \ad_wr* , \ad_wr_f* , \ad_wr_d* ,
         slw_brst, wb_cache, \brst_clr* , pkt_cap, faddr64_cap,
         \reset_hb* , \reset_fb* , \sf_hit* , \hbc_err* , \error* ,
         \has_o* ,\hds_o* , \hip_o* , \tr_w_o* , \lk_o* , \tbst_o* ,
         \dw64_o* , \inv_o* , \cc_o* , \bstrdy_o* ,
         \cmdpar_err* , ld_par_o, \cmdprot_err* ,\tmr_clr* ,\bsy_rtry_dly_en* ,
         \bsy_rtry_dly_clr* , adpar_err, cp_i, \hbgack_out* ,
         \bsy_rtry_cnt_en* , \bsy_rtry_cnt_clr* ,
         pd_split ,fb_read, sys_mess, lcl_mess, st_reset ,
         pd_split_err , \snack_o* , \share_o* ,busy_tmout, split_resp ,
         cmd_perr,cmd_proterr, \dma* ,grnt2, \bus_idle* ;
    wire [1:0] phase, hb_dlen, ln_siz, fdata_wd, dl_o, \dsack_o* , \bstat_o* ;
    wire [2:0] ca_o, ca_fb, cmd_enc, filtr_sel, tr_mode, count_en, fb_dlength,
               lk_ext, cap ;
    wire [3:0] pktsiz_en , air2;
    wire [7:0] cm_o, cm_i, b_ld_o;
    wire [31:0] air3;
    wire [5:0] st_reg_h;
    wire [4:0] st_reg_f;

//********************************************************************
// Pre-defined Module Instantiations
//******************************************************************** hb_ctl   the_hb_ctl (
        // Inputs
            st ,            // fbus input status
            f_write ,       // fbus write command
            cap ,           // fbus input capability
            mast_sl,        // fbus master with selected slave
            mast_bs,        // fbus master was busied by slave
            phase ,         // fbus transaction phase (from fbc)
            \fbc_err* ,     // fbus time-out error
            gr ,            // fbus grant acknowledge
            -pe     ,       // fbus preemption of fbus master
            fadec ,         // fbus address compare encoding
            hadec ,         // hbus address compare encoding
            \data_av* ,     // data available in fifo
            \sp_av* ,       // space available in fifo
            \selected* ,    // module selected for fbus trans.
            \cpyrq* ,       // store cache copyback request
            \cfull* ,       // store cache full
```

//node_27ea0/cadence/tifb/icc/b/icc.v                                              modified 07/15/92 7:01 AM

```
        \hbg*  ,        // hbus grant
        \ignore* ,      //
        \request* ,     // pre-fetch request
        \pref_end* ,    // pre-fetch counter compare output
        \tran_end* ,    // fbus mastered trans. complete \gbl*  ,        // hbus coherent transaction indication
        \coherent* ,    // coherent hbus transaction indication
        wr_inv_l ,      // write_invalid indicator when fbus slave
        h_mode ,        // hbus transaction encoding
        hb_read ,       // direction of hbus transaction
        berr ,                  // hbus data parity error
        cmd_perr ,      // fbus command parity error
        cmd_proterr ,   // fbus protocol error
        splt_cmd ,      // split command
        unrstrd ,       // unrestricted fbus transfer
        restart ,       // end-of-data restart indication
        mem_addr ,      // hbus master mode hadec decode
        \dma* ,         // the signal for dma mode
        \dma_l* ,       // the signal for dma mode
        hb_dlen ,       // data length hbus transaction
        \w64* ,         // 64 bit data request as hbus slave
        \hb_brst* ,     // hbus burst request
        hdata64_cap ,   // 64 bit hbus data capable
        slw_brst ,      // slow hbus burst protocol enable
        wb_cache ,      // write-back cache
        fbmstr_en ,     // fbus master enable
        splt_tmout ,    // split response time out
        busy_tmout ,    // busy response time out
        \lock* ,        // indivisible cycle indication
                        //      latched input
        \lk_o* ,        // indivisible cycle indication
                        //      output to hbus
        clk ,       // hbus clock
        \reset_hb* ,    // hbc chip reset
// Bi-directional Inputs
        \has* ,         // hbus address strobe
        \hds* ,         // hbus data strobe
        \hip* ,         // hbus transaction in progress
        \dsack* ,       // hbus data strobe acknowledge
        \bstrdy* ,      // hbus burst ready
        \snack* ,       // snoop acknowledge
        \share* ,       // share/private* cache attribute
        \bstat* ,       // hbus status lines
        \hbgack* ,      // hbus bus grant acknowledge
// Outputs
        tr_mode ,       // fbus mode encoding to fbc
        rq ,            // fbus request
        fbc_gr ,        //fbus grant to fbc
        \bstat_en* ,    // bstat output enable
        \fifo_rst* ,    // fifo and lb_ptr pointer reset
        \fb_grant* ,    // fbus granted to module
        \new_addr* ,    // select inc_addr for addreg
        \sel_en* ,      // selected_o pulse
        \h_strb* ,      // hbus transaction strobe
        \hbr* ,         // hbus request
        grnt2 ,         // synchronized gr_i
        cmd_enc ,       // copyback transaction indication
        \tran_en* ,     // transaction latch enable
        \brst_inc* ,    // pre-fetch cntr. increment enable
        brstcnt_dec ,   // burst counter decrement enable
        dec_sel ,       // decrement selector for burst cntr
        \brst_clr* ,    // fbus slave transaction cntr. clear
        \hbc_err* ,             // hbc parity or protocol error
        pd_split ,      // pending split indication
        \bsy_rtry_dly_en* , // busy retry count enable
        \bsy_rtry_dly_clr* , // busy retry count enable
        \bsy_rtry_cnt_en* , // busy retry count enable
        \bsy_rtry_cnt_clr* , // busy retry count enable
        st_reg_h ,      // hbc state machine output to csr
// Bi-directional Outputs
        \has_o* ,       // hbus address strobe
        \hds_o* ,       // hbus data strobe
        \hip_o* ,       // hbus transaction in progress
        \dsack_o* ,     // hbus data strobe acknowledge
        \bstrdy_o* ,    // hbus burst ready
        \snack_o* ,     // snoop acknowledge
        \share_o* ,     // share/private* cache attribute
        \bstat_o* ,     // hbus status lines
        \hbgack_o*      // hbus bus grant acknowledge
            );
```

//node_27aa0/cadence/tifb/icc/b/icc.v                                                    modified 07/15/92  7:01 AM

```
hbc_dec   the_hbc_dec (
    // Inputs
        ak_f ,          // fbus address acknowledge filtered
        st ,            // fbus input status
        ca ,            // fbus input capability
        et ,            // fbus end of tenure indication
        pe ,            // fbus preemption indication
        gr ,            // fbus grant indication
        phase ,         // fbus transaction phase (from fbc)
        \f_strb* ,      // dpu strobe
        \f_ack* ,       // dpu strobe acknowledge
        \unaligned* ,   // unaligned fbus partial indication
        fadec ,         // fbus address compare encoding
        hadec ,         // hbus address compare encoding
        \sel_en* ,      // selected_o pulse
        \selected* ,    // module selected for fbus trans.
        grnt2 ,         // synchronized gr_1
        \fb_grant* ,    // module master for fbus trans.
        fb_master ,     // futurebus master
        \hbg* ,         // hbus grant
        \hip* ,         // hbus transaction in progress
        \more* ,        // some pin used for dma
        \data_av* ,     // dpu data available
        clk ,           // hbus clock
        \reset_hb* ,    // hbc chip reset
        pktsiz_en ,     // packet size enable from csr
        pkt_cap ,       // packet capable from csr
        fdata_wd ,      // fbus data width capability from csr
        hdata64_cap ,   // hbus 64 bit data capable from csr
        faddr64_cap ,   // fbus 64 bit address enable from csr
        ln_siz ,        // hbus line/burst size from csr
        wb_cache ,      // write-back chace
        lk_ext ,        // lock command extensions
        cmd_enc ,       // non-hbus initiated (dpc) fbus cmds
        tr_mode ,       // fbus transfer mode
        \tran_en* ,     // hbus transaction latch enable
        \brst_inc* ,    // pre-fetch counter increment enable
        brstcnt_dec ,   // burst counter decrement enable
        \brst_clr* ,    // fbus slave transaction cntr clear
        dec_sel ,       // decrementor select for brst cntr
    // Bi-directional Inputs
        cm_1 ,          // fbus command
        cp_1 ,          // fbus command
        \tr_w* ,        // direction of hbus transaction
        tsiz ,          // hbus transaction size
        \tbst* ,        // burst request
        \dw64* ,        // data width indication
        dl ,            // data length encoding
        \lk* ,          // indivisible hbus cycle indication
        \inv* ,         // hbus invalidate
        \cc* ,          // global snoop control
    // Outputs
        ca_o ,          // fbus output capability
        cap ,           // fbus output capability latch
        h_mode ,        // hbus transaction encoding
        hb_read ,       // direction of hbus transaction
        \gbl* ,         // hbus coherent transaction indication
        \coherent* ,    // hbus coherent transaction indication
        hb_dlen ,       // data-length of hbus transaction
        \hb_brst* ,     // hbus burst indication
        f_write ,       // fbus write indication
        splt_cmd ,      // split command
        unrstrd ,       // unrestriced fbus transfer
        restart ,       // end-of-data restart indication
        mem_addr ,      // hbus master mode hadec decode
        \request* ,     // pre-fetch request
        \pref_end* ,    // pre-fetch counter compare output
        \tran_end* ,    // fbus mastered transaction complete
        no_dat_ph ,     // no data phase wait indication
                        //   for address_only trans and
                        //   cmds that do not need dcmd
                        //   for decoding
        wr_inv_1 ,      // write-invalid indicator when
                        //   fbus slave
        \w64* ,         // hbus 64 bit data bus request
        \lock* ,        // indivisible hbus transaction
        \lock_f* ,      // indivisible hbus transaction
        cmd_perr ,      // fbus command parity error
        cmd_proterr ,   // fbus protocol error
        \dma* ,         // dma output
        \dma_1* ,       // dma output
        sys_mess ,      // fbus message access
```

//node_27ea0/cadence/tifb/ioc/b/ioc.v                                    modified 07/15/92 7:01 AM

```
        // Bi-directional Outputs
                cm_o ,              // fbus command
                cp_o ,              // fbus command parity
                \tr_w_o* ,          // direction of hbus transaction
                \tbst_o* ,          // burst request
                \dw64_o* ,          // data width indication
                dl_o ,              // data length encoding
                \lk_o* ,            // indivisible hbus cycle indication
                \inv_o* ,           // hbus invalidate
                \cc_o* ,            // global snoop control
                );

hbc_csr  the_hbc_csr (
        // Inputs
                \lb_wr* ,               // ext. bus data transfer direction
                \lb_cs* ,               // hbc chip select for ext. bus
                \lb_oe* ,               // hbc chip oe for ext. bus
                b_la ,                  // ext. bus address
                phase ,                 // transaction phase
                dpc_err ,               // encoded dpc parity error
                cmd_perr ,          // fbus command parity error
                cmd_proterr ,       // fbus protocol error
                arb_err ,               // encoded arbitration error
                cap ,                   // capability lines
                st ,                    // input status lines
                cm ,                    // input command lines
                gr ,                    // fbus grant indication
                \tmr_clr* ,             // transaction timer clear
                \bsy_rtry_dly_en* ,     // busy retry delay enable
                \bsy_rtry_dly_clr* ,    // busy retry delay clear
                \bsy_rtry_cnt_en* ,     // busy retry count enable
                \bsy_rtry_cnt_clr* ,    // busy retry count clear
                st_reg_f ,              // fbc state machine
                st_reg_h ,              // fbc state machine
                pd_split ,              // pending split indication
                fb_master ,             // fbus master
                fb_read ,               // fbus master read/write direction
                \lk_o* ,                // hbus lock indication resulting
                                        // from fbus lock command
                \hbgack_o* ,             // hbus grant indication (latched)
                sys_mess ,              // fbus message access
                split_resp ,            // split response indication
                count_en ,              // counter enable for reset
                \align_occ* ,           // fbus align has occurred
                \st_ack* ,              // reset has finished
                \reset_hb* ,            // hbc reset
                \reset_fb* ,            // hbc reset
                \rst* ,                 // hbc reset
                clk ,                   // hbus clock
                ref_clk ,               // 40 MHz reference clock
                b_lp ,                  // ext. data bus parity
                b_ld ,                  // ext. bus data
                air2 ,                  // hbc status register
                air3 ,                  // reset counters
                pktsiz_en ,             // packet size enable
                pkt_cap ,               // packet capable
                fdata_wd ,              // fbus data width capability
                hdata64_cap ,           // hbus 64 bit data width cap
                faddr64_cap ,           // fbus 64 bit addr. width cap
                par_rpt_en ,            // parity report enable
                fbmstr_en ,             // fbus master capable
                ln_siz ,                // hbus line/burst size
                wb_cache ,              // write-back cache
                slw_brst ,              // slow burst enable on hbus
                splt_tmout ,            // split response timeout
                busy_tmout ,             // busy retry timeout
                \fbc_err* ,             // transaction timeout
                adpar_err,              // dpc address parity error
                st_reset ,              // reset start indication
                lk_ext ,                // lock command extension
                berr ,                  // hbus data parity error
                filtr_sel ,             // glitch filter select
                \int* ,                 // hbus interrupt indication
                \csr_chip_oe* ,         // csr bus output en
                ld_par_o ,              // ext. data bus parity
                b_ld_o                  // ext. bus data
                );

fb_ctl  the_fb_ctl (
                tr_mode ,      // fbus transfer mode
```

```
//node_27ea0/cadence/t1fb/ioc/b/ioc.v                                    modified 07/15/92 7:01 AM cm_i[4:0] ,        // fbus command
                st ,               // fbus input status
                ca ,               // fbus capability
                as ,               // fbus  address strobe
                ak_f ,             // fbus address acknowledge filtered
                ai_f ,             // fbus addr. acknowledge inverse filtered
                ds ,               // fbus data strobe
                dk ,               // fbus data acknowledge
                di ,               // fbus data acknowledge inverse
                dk_f ,             // fbus data acknowledge filtered
                di_f ,             // fbus data ack. inverse filtered
                et ,               // fbus end of tenure indication
                \data_av* ,        // FIFO data available indication
                \sp_av* ,          // FIFO space available indication
                fadec ,            // fbus address compare encoding
                1'b1      ,        // snoop filter hit
                fbc_gr ,           //fbus grant to fbc
                pkt_cap ,          // module is packet capable
                \f_ack* ,          // dpu strobe acknowledge
                par_rpt_en ,       // enable fbus parity error reporting
                adpar_err ,        // dpc parity error
                \hbc_err* ,        // hbc command error
                \fbc_err* ,        // fbus timeout error
                \bus_idle* ,       // fbc aligned to fbus
                restart ,          // some pin to make steve's life easy
                \rst* ,            // power up module reset
                \binit* ,          // bus initialization
                \reset_fb* ,       // fbc reset
                \lock_f* ,         // indivisible hbus transaction
        // Outputs
                \f_rd* ,           // direction of fbus transaction
                \f_strb* ,         // fbus to/from FIFO strobe
                f_mode ,           // fbus mode encoding
                \selected* ,       // module selected for fbus trans.
                \as+ ,             // fbus address strobe
                \ak+ ,             // fbus address acknowledge
                \ai+ ,             // fbus address acknowledge inverse
                \ds+ ,             // fbus data strobe
                \dk+ ,             // fbus data acknowledge
                \di+ ,             // fbus data acknowledge inverse
                \et+ ,             // fbus end of tenure indication
                \st+ ,             // fbus output status
                ca_fb ,            // fbus output capability
                \ad_wr* ,          // btl ad bus driver direction
                \cm_wr* ,          // btl cmd driver direction
                mast_sl,           // fbus master with selected slave
                mast_bs,           // fbus master was busied by slave
                phase ,            // fbus transaction phase
                \tmr_clr* ,        // fbus time-out error
                split_resp ,       // split response
                st_reg_f    ,      // fbc state machine
                fb_master          // module is fbus master
                    );

dcc_rst   the_rst (
            // Inputs - from I/O pads
                ar ,               // arbitration synchronization
                as ,               // address synchronization
                ai ,               // address acknowledge inverse
                ref_clk ,          // reference 40MHz crystal clock
                \rst* ,            // power up module reset
            // Inputs - from internal CSR block & gletch filter block
                air3 ,             // CSR counter bits [31:0]
                air2 ,             // CSR configuration bits [3:0]
                st_reset ,         // 1212 CSR  CSR12 - reset_start
                re_f ,             // fbus reset filtered
                aq_f ,             // arbitration sync filtered
            // Outputs - to I/O pads
                \binit* ,          // bus initialization
                \sys_rst* ,        // system reset
                \re+ ,             // fbus reset
                \busi* ,           // bus idle
            // Outputs - to internal blocks
                count_en ,         // counter enable to CSR [1:0]
                \align_occ* ,      // alignment occurred
                \st_ack* ,         // reset start local reset done ack
                \reset_fb* ,       // internal reset - fb related
                \reset_hb*         // internal reset - hb related

);
```

//node_27ea0/cadence/tifb/ioc/b/ioc.v                                                    modified 07/15/92 7:01 AM

```verilog
    dcc_fil  the_fil (
      // Inputs
              ak ,         // fbus  address acknowledge
              ai ,         // fbus address acknowledge inverse
              dk ,         // fbus data acknowledge
              di ,         // fbus data acknowledge inverse
              aq ,         // fbus data arbitration message sync
              re ,         // fbus data fbus reset
              filtr_sel,   // glitch filter select from CSR // Outputs
              ak_f ,       // fbus address acknowledge filtered
              ai_f ,       // fbus addr. acknowledge inverse filtered
              dk_f ,       // fbus data acknowledge filtered
              di_f ,       // fbus data ack. inverse filtered
              aq_f ,       // fbus data arbitration message sync filtered
              re_f         // fbus data fbus reset filtered
              );

//***************************************************************************
// Gate and Structural Declarations
//***************************************************************************

//***************************************************************************
// Procedural Assignments
//*************************************************************************** dff_rs_ce #(1)

ad_ff ( \ad_wr* , \ad_wr_f* , 1'b1 , et , 1'b0 , \f_strb* ) ;

assign ad_rcv = \ad_wr* ;
    assign \ad_drv* = (&{~ai_f,~ca[1],\f_rd* }) ? \ad_wr_f* : \ad_wr* ;

assign cm = (\cm_wr* ) ? 8'hz : cm_o ;
    assign cp = (\cm_wr* ) ? 1'hz : cp_o ;
    assign cm_i = cm;
    assign cp_i = cp;
    assign #4 \hbgack_out* = \hbgack_o* ;
    wire #4 \h_strb_out* = \h_strb* ;
    assign  dma_mode = ~\dma* ;

assign \bus_idle* = &{\busi* , \rstbypass* } ;

wire csr_fifo = &{|{(fadec == 4'b1101),(fadec == 4'b1111)},
                      ~\selected* , (h_mode == 3'b001) };
        assign
                \ca* = (fb_master) ? ca_o : ca_fb , \has* =    (\hbgack_out* ) ? 1'bz : \has_o* ,
                \hds* =    (\hbgack_out* ) ? 1'bz : \hds_o* ,
                \hip* =    (\hbgack_out* ) ? 1'bz : \hip_o* , \tr_w* =   (\hbgack_out* ) ? 1'bz : \tr_w_o* ,
                \lk* =     (\hbgack_out* ) ? 1'bz : \lk_o* ,
                \tbst* =   (\hbgack_out* ) ? 1'bz : \tbst_o* ,
                \dw64* =   (\hbgack_out* ) ? 1'bz : \dw64_o* ,
                dl =       (\hbgack_out* ) ? 2'bz : dl_o ,
                \inv* =    (\hbgack_out* ) ? 1'bz : \inv_o* ,
                \cc* =     (\hbgack_out* ) ? 1'bz : \cc_o* , \dsack* = (|{csr_fifo, \h_strb_out* ,~\hbgack_out* } ) ? 2'bz : \dsack_o* ,
                \bstrdy* = (|{csr_fifo, \h_strb_out* ,~\hbgack_out* } ) ? 1'bz : \bstrdy_o* , \bstat* =  (\bstat_en* ) ? 2'bz : \bstat_o* ,
                \hbgack* = (\hbgack_out* ) ? 1'bz : 1'b0 , \snack* = (~\hbgack_out* ) ? 1'bz : \snack_o* ,
                \share* = (~\hbgack_out* ) ? 1'bz : \share_o* , b_ld = (\csr_chip_oe* ) ? 8'bz : b_ld_o ,
                b_lp = (\csr_chip_oe* ) ? 1'bz : ld_par_o ;

//***************************************************************************
// Task and Function Definitions
//***************************************************************************

`endprotect
```

```
//node_27ea0/cadence/t1fb/ioc/b/ioa.v                                    modified 07/15/92 7:01 AM //*******************************************************************************
// End of Model
//*******************************************************************************
endmodule
```

```
//node_27ea0/cadence/tifb/dcc/b/hbc_dec.v                                    modified 09/02/92 11:48 AM
//*********************************************************************
//
//     Model Name   : hbc_dec.v
//     Revision     : $Revision: 2.24 $
//     Date         : $Date: 92/09/02 12:41:34 $
//     Author       : Bill Saperstein
//     Description  : hbc encoder/decoder for command/attribute on
//                    hbus and fbus including transaction counters
//
//*********************************************************************

//*********************************************************************
// Module Definition
//*********************************************************************
`protect module hbc_dec
        (
        // Inputs
                ak_f_i ,          // fbus address acknowledge filtered
                st_i ,            // fbus input status
                ca_i ,            // fbus input capability et_i ,            // fbus end of tenure indication
                pe_i ,            // fbus preemption indication
                gr_i ,           // fbus grant indication phase_i ,         // fbus transaction phase (from fbc)

\f_strb_i* ,      // dpu strobe
                \f_ack_i* ,       // dpu strobe acknowledge
                \unaligned_i* ,   // unaligned fbus partial indication fadec_i ,         // fbus address compare encoding
                hadec_i ,         // hbus address compare encoding \sel_en* ,        // module selected for fbus trans.
                \selected_i* ,    // module selected for fbus trans.
                grnt2 ,           // sync gr_i
                \fb_grant_o* ,    // module master for fbus trans.
                fb_master ,       // futurebus master \hbg_i* ,         // hbus grant
                \hip_i* ,         // hbus transaction in progress
                \more* ,          // some pin used for dma
                \data_av*    ,   // dpu data available clock_i ,         // hbus clock
                \reset* ,         // hbc chip reset pktsiz_en ,       // packet size enable from csr
                pkt_cap ,         // packet capable from csr
                fdata_wd ,        // fbus data width capability from csr
                hdata64_cap ,     // hbus 64 bit data capable from csr
                faddr64_cap ,     // fbus 64 bit address enable from csr
                ln_siz ,          // hbus line/burst size from csr
                wb_cache ,        // write-back chace lk_ext ,          // lock command extensions cmd_enc ,         // non-hbus initiated (dpc) fbus cmds
                tr_mode_o ,       // fbus transfer mode \tran_en* ,       // hbus transaction latch enable \brst_inc* ,      // pre-fetch counter increment enable
                brstcnt_dec ,     // burst counter decrement enable
                \brst_clr* ,      // fbus slave transaction cntr clear
                dec_sel ,         // decrementor select for brst cntr
        // Bi-directional Inputs
                cm_i ,            // fbus command
                cp_i ,            // fbus command \tr_w_i* ,        // direction of hbus transaction
                tsiz_i ,               // hbus transaction size \tbst_i* ,        // burst request
                \dw64_i* ,        // data width indication
                dl_i ,            // data length encoding
                \lk_i* ,          // indivisible hbus cycle indication \inv_i* ,         // hbus invalidate
```

//node_27ea0/cadence/tifb/dcc/b/hbc_dec.v                                  modified 09/02/92 11:48 AM

```
                \cc_i* ,          // global snoop control
        // Outputs
                ca_o ,            // fbus output capability
                cap ,             // fbus output capability latch h_mode_o ,        // hbus transaction encoding
                hb_read ,         // direction of hbus transaction
                \gbl* ,           // hbus cache coherent indication
                \coherent* ,      // hbus coherent transaction indication
                hb_dlen ,         // data-length of hbus transaction
                \hb_brst* ,       // hbus burst indication
                f_write ,         // fbus write indication splt_cmd ,        // split response
                unrstrd ,         // unrestriced fbus transfer
                restart ,         // end-of-data restart indication
                mem_addr ,        // hbus master mode hadec decode \request* ,       // pre-fetch request
                \pref_end* ,      // pre-fetch counter compare output \tran_end* ,      // fbus mastered transaction complete no_dat_ph ,       // no data phase wait indication
                                  //    for address_only trans and
                                  //    cmds that do not need dcmd
                                  //    for decoding wr_inv_l ,        // write-invalid indicator when
                                  //    fbus slave \w64* ,           // hbus 64 bit data bus request
                \lock* ,          // indivisible hbus transaction
                \lock_f* ,        // indivisible hbus transaction to fbc
                cmd_perr ,        // fbus command parity error
                cmd_proterr,      //  fbus command protacall error
                \dma* ,           // dma output
                \dma_l* ,         // dma output
                sys_mess ,        // fbus message mailbox access
        // Bi-directional Outputs
                cm_o ,            // fbus command
                cp_o ,            // fbus command parity \tr_w_o* ,        // direction of hbus transaction \tbst_o* ,        // burst request
                \dw64_o* ,        // data width indication
                \dl_o* ,          // data length encoding
                \lk_o* ,          // indivisible hbus cycle indication \inv_o* ,         // hbus invalidate \cc_o* ,          // global snoop control

) ;

//*************************************************************************
// Define Parameters (optional)
//*************************************************************************

// Not Applicable

//*************************************************************************
// Port Declarations
//************************************************************************* input   ak_f_i , \f_strb_i* ,\f_ack_i* , \unaligned_i* ,
                \sel_en* ,\tran_en* ,
                clock_i ,\reset* , \more* ,
                \tr_w_i* ,\tbst_i* ,\dw64_i* ,\lk_i* ,\inv_i* ,
                \cc_i* ,\brst_inc* ,brstcnt_dec,\brst_clr* , dec_sel ,
                pkt_cap,hdata64_cap,faddr64_cap ,wb_cache ,
                \fb_grant_o* ,fb_master,\hbg_i* ,\hip_i* ,
                et_i, pe_i, cp_i , \selected_i* , \data_av* , gr_i ;

input [1:0]   phase_i ,ln_siz ,dl_i ,
                      fdata_wd ,tsiz_i ;
```

```
//node_27ea0/cadence/tifb/dcc/b/hbc_dec.v                        modified 09/02/92 11:48 AM input [2:0]     ca_i ,cmd_enc ,tr_mode_o ,lk_ext ;

input [3:0]     fadec_i ,hadec_i ,pktsiz_en ;

input [7:0]     st_i ,cm_i ;

output  \tr_w_o* ,\tbst_o* ,grnt2,
                \dw64_o* ,\w64* ,\lk_o* ,\lock* ,\lock_f* ,
                \inv_o* ,\cc_o* , \dma* ,\dma_l* ,sys_mess, \request* ,\pref_end* , f_write,
                \tran_end* ,no_dat_ph , mem_addr,
                wr_inv_l ,\gbl* ,\coherent* ,hb_read ,\hb_brst* ,
                splt_cmd,unrstrd, restart ,cmd_perr, cmd_proterr , cp_o ;

output [1:0]    \dl_o*  ,hb_dlen ;

output [2:0]    ca_o ,h_mode_o, cap ;

output [7:0]    cm_o ;

//**********************************************************************
// Net Assignments and Declarations
//**********************************************************************

// *** Define internal wire nets wire \tr_w_o* ;

wire [8:0]      mode_in, mode_in_d ;
        wire [7:0]      ccmd, dcmd, discmd ,burst_amt ,mc_cmd ,
                        mc_cmd_1 ,byt_cnt, byt_rmd ,byt_dec, new_bcnt ,
                        brst_cnt,brst_cnt_d, brst_rmd ,brst_dec ,
                        new_brstcnt ,cmd_in ,c_cmd ,dec_val ;
        wire [5:0]      mode_out ;
        wire [3:0]      fadec_l ;
        wire [2:0]      pktdlen, compdlen ,sys_hmode ,fb_dlen ,
                        fb_dlen_l ,cap ,cm_i_d,d_cmd ;
        wire [1:0]      datlen ,dlen , dlength_i ,tsize_i ;
        wire    csr_addr ,wr_inv ,pgen_cmd,
                \cmp_error* , \conn_cmp_err* , \dat_cmp_err* ,
                prefetch ,\hbgrant_l* ,\iv* ,lk_cmd ,
                \dpctr_en* ,\rd_wr* ,\coh* ;

wire    last_htran;     // latch of \dma* and last hbus
                                //   transaction
        wire #1 dec_sel_d = dec_sel ;
        wire    dec_sel_d2 = |{dec_sel, dec_sel_d} ;
        assign #1  brst_cnt_d = brst_cnt;
        assign #1  mode_in_d = mode_in;
        wire [1:0] #1 phase_d = phase_i;
// *** Define register/latch elements //      * transaction attribute latches lch #(2)
                tsz     (tsiz_i,tsize_i ,\tran_en* ),
                dlnth   (dl_i,dlength_i,\tran_en* ) ;

lch #(1)
                globl   (\cc_i* ,\gbl* ,\tran_en* ) ,
                r_w     (\tr_w_i* ,\r_w_i* ,\tran_en* ) ,
                brst    (\tbst_i* ,\brst_i* ,\tran_en* ) ,
                w64     (\dw64_i* ,\w64* ,\tran_en* ) ,
                hbgr    (\hbg_i* ,\hbgrn* ,\tran_en* ) ,
                inv     (\inv_i* ,\invalid_i* ,\tran_en* ) ;

//      * fbus command encoder counters/latches

//              hbus attributes are latched during connection
//              phase for use in generating data_cmd
//              phase = 01 -> connection lch #(3)
                fbdl    (fb_dlen,fb_dlen_l,(phase_i != 2'b01)) ;

lch #(8)
                concmd  (mc_cmd,mc_cmd_1,(phase_i != 2'b01)) ,
```

//node_27ea0/cadence/tifb/dcc/b/hbc_dec.v                                    modified 09/02/92 11:48 AM

```
//      * pre-fetch counter for hbus reads
                brstcnt   (brst_dec,new_brstcnt,brstcnt_dec ) ;

lch_rs #(8)
                brstreq   (brst_cnt_d,brst_rmd,1'b1 ,1'b1,
                          ~|{brstcnt_dec ,
                          &{(phase_i[1:0] != 2'b01),~dec_sel},
                          &{(phase_i[1:0] == 2'b01),no_dat_ph, ~dec_sel}} ) ;

//      * byte counter for fbus transactions
        lch_rs #(8)
                bytcnt    (byt_cnt,byt_rmd,\reset* ,1'b1,
                          |{~fb_master, \tran_cyc* ,&{restart, (phase_i != 2'b11)}}),
                bytdec    (byt_dec,new_bcnt,&{\reset* ,(phase_i != 2'b00)},1'b1,
                          |{~fb_master, ~\tran_cyc* ,&{restart, (phase_i != 2'b11)} } ) ;

//      * pre-fetch request toggle dff_rs_ce #(1)
                dma_d     (\dma* , dma_f , \reset* , 1'b1 ,1'b0,\trcyc* ), dma_d_1   (dma_f , \dma_d* , \reset* , 1'b1 ,1'b0,~\trcyc* ),
                dma_ld    (\dma_l* , dma_l_f , \reset* , 1'b1 ,1'b0,\trcyc* ), dma_ld_1  (dma_l_f , \dma_l_d* , \reset* , 1'b1 ,1'b0,~\trcyc* );
        lch_rs #(1)
                prot      (prot_err ,cmd_proterr,&{\reset* ,(phase_i != 2'b00)},1'b1,(phase_i != 2'b01) ) , lk        (\lk_1* ,\lock* ,1'b1,\reset* ,\hip_i* ) , // added signal lock_1 in order not to hose previous transactions.

lk2       (\lock* ,\lock_1* ,1'b1,\reset* ,(phase_i != 2'b00) ) , togl      (toggle,p_req,&{\reset* ,(phase_i != 2'b10)},
                           1'b1,\tran_cyc* ) , tog2      (~p_req,toggle,\reset* ,1'b1,~\tran_cyc* ) ;

//      * hbus lock indication from fbus transaction
        lch_rs_mod #(1)
                lck       (\lk_en* ,\lk_o* ,1'b1,&{\reset* ,et_1},
                           (phase_i == 2'b00));

lch_rs #(1)
                pel       (&{gr_i, pe_i}, pe_1,1'b1 ,1'b1 ,clock_i ),
                pel2      (pe_1, pe_12,1'b1,1'b1 ,~clock_i ),
                pel3      (pe_12,pe_13,1'b1,1'b1 ,~|{\hip_i* ,pre_gr }), mor       (|{pe_13,\more* },\dma* ,1'b1,\reset* ,\hip_i* ), mor2      (\dma* , \dma_1* ,1'b1,\reset* ,~\hip_i* ), //      * end-of-data restart indication
                restrt    (st_1[1],restart,&{\reset* ,~&{~\tran_end* ,(phase_i[1] == 1'b1)} },
                           1'b1,~&{(phase_i == 2'b11), ak_f_1}) ;
        dff_rs_ce #(1)
// * define pre-grant signal in order to release pre-empt pregr     ( ~grnt2, pre_gr, ~grnt2, 1'b1, 1'b0, ~\hip_i* ), //      * pre-fetch request counter preq      (~preq_cnt,preq_cnt,&{\reset* ,\brst_clr* },
                           1'b1,\brst_inc* ,clock_i) ;

//      * input command ,capability fadec and hmode latches lch #(4)
                fdec      (fadec_i,fadec_l,|{\selected_i* ,(phase_i != 2'b01)} ) ;

lch #(8)
                cmdin     (cm_i,cmd_in,(phase_i != 2'b00)) , ccmdin    (cmd_in,c_cmd,\sel_en* ) ;

lch #(3)
```

```
//node_27sa0/cadence/t1fb/dcc/b/hbc_dec.v                          modified 09/02/92 11:48 AM dcmdin  (cm_i_d,d_cmd,(phase_i != 2'b11)) ;

lch_rs #(6)
                hmod1   (mode_in_d[8:3],mode_out,\reset* ,1'b1,
                         &{\sel_en* ,\fb_grant_o* ,
                         ~&(~fb_master ,~dec_sel, \dma_l* },  \dpctr_en* }) ;

lch_rs #(3)
                hmod2   (mode_in_d[2:0],{hb_dlen,\hb_brst* },1'b1,\reset* ,
                         &{\fb_grant_o* ,
                         ~|{&(~dec_sel,~\hbgrant_i* },
                         &(no_dat_ph,~\sel_en* ,~fb_master ) } });

lch_rs #(2)
                dl_1    (dlen,datlen,&{\reset* ,(phase_i != 2'b10)},
                         1'b1, ~|{(phase_d == 2'b00),(phase_i == 2'b01)} ) ;

lch_rs #(3)
                capin   (ca_i,cap,\reset* ,1'b1,&{\sel_en* ,~&(fb_master,(phase_i == 2'b01)}} ) ;

//      * command parity flip-flop dff_rs_ce #(1)
                cmdpar1 (\cmp_error* ,\dat_cmp_err* , 1'b1,
                         &{\reset* ,(phase_i != 2'b00)} ,
                         1'b0, &{(phase_i == 2'b11),\f_ack_i* }) , cmdpar2 (\cmp_error* ,\conn_cmp_err* , 1'b1,
                         &{\reset* ,(phase_i != 2'b00)} ,
                         1'b0, |{ &{(phase_i == 2'b00),~\f_ack_i* } ,
                                  &{(phase_i == 2'b11),~\f_ack_i* } ,
                                   (phase_i == 2'b10) }) ;

lch_rs #(1)
                cmdper  (1'b1 ,cmd_perr, &{\reset* ,(phase_i != 2'b00)},
                         1'b1 ,&{\dat_cmp_err* ,\conn_cmp_err* }) ;

dff_ce #(1)
                pred_s ( p_req, p_req_d, 1'b0, clock_1);

//*********************************************************************
// Pre-defined Module Instantiations
//*********************************************************************

// Not Applicable

//*********************************************************************
// Gate and Structural Declarations
//*********************************************************************

// Define command encoding block for fbus master transaction
//      ccmd_enc -- connection command
//      dcmd_enc -- data phase command
//      discmd_enc -- disc phase command
//
//      hbus attributes are latched during the hbus connection
//      phase and used to encode the fbus cmds for each phase
//
//      the fbus connection command is latched at the end
//      of the connection phase in case the mastered transaction
//      is interrupted, in which case the original hbus
//      attributes have already disappeared
//              mc_cmd   -> decoded hbus attirbues
//              mc_cmd_l -> latched version of mc_cmd
//              ccmd     -> fbus connection command output by hbc assign #2 cm_i_d = cm_i[7:5] ;
        wire #2 \f_strb_d* = \f_strb_i* ;

assign
                \lock_f* = |{\lock* ,\lock_l* },  // added lock_f
                ccmd = (restart) ? mc_cmd_l : mc_cmd , sys_mess = ~|{~fadec_i[3],fadec_i[2],fadec_i[1],fadec_i[0]},
                                                //mailbox address
//      fbus addr_width ccmd[7] is determined by csr capability
//      bit and hadec encoding for csr address
```

```
//node_27ea0/cadence/tifb/dcc/b/hbc_dec.v                               modified 09/02/92 11:48 AM
//              hadec -- 0100 -> broadcast addr
//                       0111 -> fbus csr address
//                       1001 -> broadcast csr address csr_addr = (hadec_i == 4'b0100) || (hadec_i == 4'b0111) ||
                   (hadec_i == 4'b1001) , mc_cmd[7] = ~|{&{faddr64_cap,csr_addr},~faddr64_cap} , //      fbus command encoding ccmd[4:0] is determined by
//      hbus transaciton or dpc request (i.e. copyback)
//              dpc request encoding are
//                      cmd_enc = 000 -> no cmd
//                              = 001 -> copyback
//                              = 010 -> shared response
//                              = 011 -> modified response
//                              = 100 -> merge
//                              = 101 -> reserved
//                              = 110 -> reserved
//                              = 111 -> reserved mc_cmd[4:0] = ccmd_enc_lwr( cmd_enc,dlength_i,tsize_i,
                        \brst_i* ,\gbl* ,\r_w_i* ,\invalid_i* ,
                        \lock_f* ) , //      fbus data_width ccmd[6:5] ,data_length dcmd[7:5],and
//      outgoing capability (when fbiu is fbus master) is determined
//      by csr capability and hbus transaction //      Note: slave module may not have data_width capability in
//            which case it signals 'be' on status //      fbus data_length will change depending on whether the slave
//      is packet capable
//              pktdlen -- packet data length -> ca_i[1] = 0
//              compdlen -- compelled data length -> ca_i[1] = 1 dlen = (restart) ? bytcnt_enc(byt_rmd) : dlength_i ,

//      outgoing capability for packet speed and split defaults to
//      1'b0
        ca_o[2] = 1'b0 ,
        ca_o[0] = 1'b0 , {pktdlen,compdlen,mc_cmd[6:5],ca_o[1]} =
                        dcmd_enc_uppr (\brst_i* ,pkt_cap,\gbl* ,datlen,
                                fdata_wd,cmd_enc,pktsiz_en) , fb_dlen = (ca_i[1]) ? compdlen : pktdlen ,
        dcmd[7:5] = fb_dlen_l , //      byte decrement value for fbus transactions is determined
//      from fbus data_width,pkt_len and capability
//              when ca_i = 0 dec_val = bytes/packet
//              when ca_i = 1 dec_val = 4 bytes (32 bit dwidth)
//                                      8 bytes (64 bit dwidth)

dec_val = (ca_i[1]) ? 10'h004 << fbwidth(ccmd[6:5]) :
                              10'h004 << (dcmd[7:5] +
                                              ( fbwidth(ccmd[6:5]) - 1 ) ) , byt_dec = byt_rmd - dec_val , \trcyc* = |{~^{\f_strb_d* ,\f_ack_i* } ,(phase_i == 2'b10) },
        \tran_cyc* = &{\trcyc* , ~&{~|(byt_rmd),\dma_d* ,~\dma_l_d* } } , //      the byt_cnt input to the byte counter is either the
//      initial decoded value from the hbus attributes or
//      the decremented value from the counter
//              NOTE : when the counter is restarted due to
//                     an interrupted transaction, the
//                     counter is not updated byt_cnt = ( &{|{(phase_i == 2'b11),(phase_i == 2'b10)},~&{last_htran,~ca_i[1]},
                        ~&{~|(new_bcnt),~\dma* }}) ? new_bcnt :
                                bytcnt_dec(dlength_i,\brst_i* ,mc_cmd[3:1]) , //      zero detect of byt_rmd determines master disconnect
```

```
//node_27ea0/cadence/tifb/dcc/b/hbc_dec.v                              modified 09/02/92 11:48 AM //      indication to fbc and also 'pr' command dcmd[0] for packet
//      and extended lock command bit (0)

last_htran = &{~hb_read,\dma* , ~\dma_l* },
                    // last hbus transaction, only applied to write case
            \tran_end* = |{|(byt_rmd),~\dma* ,&(last_htran, ~\data_av* ) }, dcmd[0] = (\lock_f* ) ? &{\tran_end* ,~ca_i[1]} :
                        lk_ext[0] , //      slave write data command is determined by st_i[5] intervention
//      line at the end of connection phase
//      last transaction flage is determined by st_i[4] trans_flag
//      line at the end of connection phase dcmd[4] = st_i[5] ,
            dcmd[1] = (\lock_f* ) ? &{st_i[4],~ca_i[1]} :
                        lk_ext[1] , //      if lock command on hbus, enable value in air10 (lk_ext)
//      during data phase, otherwise, deassert dcmd[3:2]

dcmd[2] = (\lock_f* ) ? 1'b0 : lk_ext[2] ,
            dcmd[3] = 1'b0 ,

//      disconnect command has the same upper bit definition as
//      data command with the low order bits deasserted discmd[7:4] = dcmd[7:4] ,
            discmd[3:1] = 3'b0 ,
            discmd[0] = ~\lock_f* ,   // added latch for previous disc data //      fbus command out (cm_o) is controlled by the phase
//      indication from the fbc
//              cm_o = ccmd      -> connection phase (default)
//                     dcmd      -> data phase
//                     discmd    -> disconnect phase //      cm_o is enabled onto the bi-directional cm bus
//      when hbc is fbus master and phase != idle cm_o = cmd_mux(ccmd,dcmd,discmd,phase_i) , cp_o = ~^cm_o , // Define hmode encoding when fbiu is fbus master/slave
//      when fbiu is fbus master, hmode = lcl_hmode
//              and is determined from hbus attributes
//              or hb_ctl encoding of cmd_enc //      when fbiu is fbus slave, hmode = sys_hmode
//              and is determined from ccmd and dcmd
//              the hbus attributes are also determined
//              from ccmd and dcmd //      when determining dl_o* and tbst_o*, burst capability
//              must be considered, i.e. proximity to the
//              memory boundary
//              when the fbiu is hbus master, the hadec lines
//              multiplex their encodings from the addreg
//              to csr comparators (mux select by hbgrant_i*)
//                      hadec    0001 -> memory address
//                               0010 -> memory addr. pkt. capable
//                               0011 -> memory addr. brst64 capable
//                               0100 -> memory addr. brst32 capable
//                               0101 -> memory addr. brst16 capable
//                               0110 -> memory addr. brst8 capable \dpctr_en* = ~|{ &{~cmd_enc[2],|{cmd_enc[1],cmd_enc[0]}},
                    &{cmd_enc[2],~cmd_enc[1],~cmd_enc[0]} } , \iv* = ~|{st_i[5],(tr_mode_o == 3'b111) ||
                        (tr_mode_o == 3'b110)} , {sys_hmode,no_dat_ph,wr_inv,\rd_wr* ,\inv_o* ,\coh* ,lk_cmd,splt_cmd,prot_err} =
                    cmd_in_dec(c_cmd[4:0],fadec_i,\tbst_o* ,\iv* ,wb_cache}, \tr_w_o* = hb_read , f_write = c_cmd[4] , \cc_o* = \coherent* ,
```

//node_27ea0/cadance/tifb/dcc/b/hbc_dec.v                                    modified 09/02/92 11:48 AM

```
        {\dl_o* ,\tbst_o* } = cmd_dl_dec(brst_rmd,hadec_i,
                              ({ln_siz}|{2{wb_cache}}),
                              no_dat_ph,~\cc_o* ,\unaligned_i* ) , \dw64_o* = ~&{~\tbst_o* ,hdata64_cap} , \lk_en* = ~&{lk_cmd, ~&((phase_i == 2'b10),~cm_i[0])} , mode_in = (&{\fb_grant_o* ,\dpctr_en* ,~splt_cmd}) ?
                     {sys_hmode,wr_inv,\rd_wr* ,\coh* ,\dl_o* ,\tbst_o* } :
                     {lcl_hmode{\brst_i* ,\gbl* ,\r_w_i* ,
                      \invalid_i* ,dlength_i,cmd_enc,hadec_i},1'b0,
                      \r_w_i* ,\gbl* ,dlength_i ,\brst_i* } , {h_mode_o,wr_inv_1,hb_read,\coherent* } = mode_out , // Define pre-fetch request for both compelled and
// packet mode
//       for compelled mode, pre-fetch occurs until the
//       entire byte count is complete or cross a mem. boundary //       for packet, pre-fetch occurs one packet ahead of
//       current requested packet (if pr is asserted) and
//       if packet does not cross a memory boundary //       for writes, the pre-fetch counter is used to determine
//       burst length on hbus and request is used to
//       determine if the write has crossed a boundary..
//       this only applies to compelled writes mem_addr = |{ (hadec_i == 4'b0001),(hadec_i == 4'b0010),
                      (hadec_i == 4'b0011),(hadec_i == 4'b0100),
                      (hadec_i == 4'b0101),(hadec_i == 4'b0110),
                      (fadec_i == 4'b1000) } ,
                  // for message mail box, we should do multiple
                  // hbus transfers(compelled or burst)

prefetch = &{~^(p_req_d,preq_cnt}, phase_i[0]} ,

// for packet read, check fadec_i to determine it cross memory boundary
// or not(the definition of crossing memory boundary for packet is (memory upper
// bound - 256 bytes), and fadec_i will change from 1001 to 0001

// this is for dpc is hbus master fbus slave which means fadec is encoded faster
// than hadec, so we need use fadec_i for fbus packet mode to determine crossing
// memory bound \request* = ~|{ &{cap(1),mem_addr,~&(unrstrd,hb_read)},
                      &{|{(fadec_i == 4'b1001),(fadec_i == 4'b1000)},
                      ~cap(1),cm_i[0], (phase_i == 2'b11},
                      // including mailbox address for multiple burst prefetch,hb_read} ,
                      &{unrstrd,cap(1),mem_addr,prefetch,hb_read}} , // Define burst_count/pre-fetch decrementor and m/s flip-flop
// combination
//       input to counter is either ccmd/dcmd decoded byte count
//       at beginning of transaction, or decremented value during
//       data transfer //       decremented value is determined by dl* and tbst*
//       attributes {unrstrd,burst_amt} = brst_req({c_cmd[6:5], c_cmd[3:1]},d_cmd,
                              ~\cc_o* ,no_dat_ph, \unaligned_i* ) , brst_cnt = (dec_sel) ? new_brstcnt : burst_amt , \pref_end* = |(brst_rmd) , brst_dec = brst_rmd - wrdcnt_dec(\dl_o* ,\tbst_o* ) , // Define memory_select encoded control lines \hbgrant_i* = &{\hbg_i* ,\hbgrn* } , // Define command parity check
//       command parity error is qualified with gr_i so
//       that slaves indicate parity during connection or data
```

```
//node_27ea0/cadence/tifb/dcc/b/hbc_dec.v                              modified 09/02/92 11:48 AM
//      phase pgen_cmd = (~^(cm_i)) , \cmp_error* = |((pgen_cmd == cp_i ),fb_master} ;

//*********************************************************************************
// Procedural Assignments
//*********************************************************************************

// Not Applicable

//*********************************************************************************
// Task and Function Definitions
//********************************************************************************* function [7:0] cmd_mux ;
                input [7:0] ccmd ,dcmd, discmd ;
                input [1:0] phase_i ;
            begin
                case (phase_i)
                   2'b00 ,2'b01     : cmd_mux = ccmd ;
                   2'b11            : cmd_mux = dcmd ;
                   2'b10            : cmd_mux = discmd ;
                   default  cmd_mux = ccmd ;
                endcase
            end
        endfunction
        function integer fbwidth ;
                input [1:0] ccmd ;
                                // decode fbus datapath width
            begin
                case (ccmd)
                        2'b00 : fbwidth = 0 ;
                        2'b01 : fbwidth = 1 ;
                        2'b10 : fbwidth = 2 ;
                    default    fbwidth = 0 ;
                endcase
            end
        endfunction function [6:0] bytcnt_dec ;
                input [1:0] dlength_i ;
                input \brst_i* ;
                input [2:0] cmd;
                                // byte count decode from hbus dlength
            begin
                casez ((dlength_i ,\brst_i* ,(cmd == 3'b001)})
                   4'b??_1_0 : bytcnt_dec = 7'h04 ;
                   4'b??_1_1 : bytcnt_dec = 7'h08 ;
                   4'b00_0_? : bytcnt_dec = 7'h40 ;
                   4'b01_0_? : bytcnt_dec = 7'h20 ;
                   4'b10_0_? : bytcnt_dec = 7'h10 ;
                   4'b11_0_? : bytcnt_dec = 7'h08 ;
                   default   bytcnt_dec = 7'h04 ;
                endcase
            end
        endfunction function [6:0] wrdcnt_dec ;
                input [1:0] dlength_i ;
                input \brst_i* ;
                                // byte count decode from hbus dlength
            begin
                casez ((dlength_i ,\brst_i* ))
                   3'b??_1 : wrdcnt_dec = 7'h01 ;
                   3'b00_0 : wrdcnt_dec = 7'h10 ;
                   3'b01_0 : wrdcnt_dec = 7'h08 ;
                   3'b10_0 : wrdcnt_dec = 7'h04 ;
                   3'b11_0 : wrdcnt_dec = 7'h02 ;
                   default   wrdcnt_dec = 7'h01 ;
                endcase
            end
        endfunction
```

//node_27ea0/cadence/tifb/dcc/b/hbc_dec.v                                    modified 09/02/92 11:48 AM

```verilog
function [1:0] bytcnt_enc ;
    input [6:0] byt_rmd ;
                        // encoded dlength from byte count register
    begin
        case (byt_rmd)
            8'h40 : bytcnt_enc = 2'b00 ;
            8'h20 : bytcnt_enc = 2'b01 ;
            8'h10 : bytcnt_enc = 2'b10 ;
            8'h08 : bytcnt_enc = 2'b11 ;
            default bytcnt_enc = 2'b00 ;
        endcase
    end
endfunction function [4:0] ccmd_enc_lwr ;
                // ccmd_enc_lwr -- connection_cmd [4:0]
    input [2:0] cmd_enc ;
    input [1:0] datlen ,tsize_i ;
    input \brst_i* ,\gbl* ,\r_w_i* ,\invalid_i* ,\lock* ;
    begin casez   ({\brst_i* ,\gbl* ,\r_w_i* ,\invalid_i* ,
                 cmd_enc, dlength_i ,\lock* ,tsize_i })

12'b0_1_1_1_000_??_1_?? ,
            12'b1_1_1_1_000_??_1_00 : ccmd_enc_lwr = 5'h00 ; // read unlocked
            12'b0_1_1_1_000_??_0_?? ,
            12'b1_1_1_1_000_??_0_00 : ccmd_enc_lwr = 5'h01 ; // read locked
            12'b0_1_0_1_000_??_1_?? ,
            12'b1_1_0_1_000_??_1_00 : ccmd_enc_lwr = 5'h10 ; // write unlocked
            12'b0_1_0_1_000_??_0_?? ,
            12'b1_1_0_1_000_??_0_00 : ccmd_enc_lwr = 5'h11 ; // write locked
            12'b1_1_1_1_000_??_1_?1 ,
            12'b1_1_1_1_000_??_1_1? : ccmd_enc_lwr = 5'h02 ; // rd partial unlk
            12'b1_1_1_1_000_??_0_?1 ,
            12'b1_1_1_1_000_??_0_1? : ccmd_enc_lwr = 5'h03 ; // rd partial lk
            12'b1_1_0_1_000_??_1_?1 ,
            12'b1_1_0_1_000_??_1_1? : ccmd_enc_lwr = 5'h12 ; // wr partial unlk
            12'b1_1_0_1_000_??_0_?1 ,
            12'b1_1_0_1_000_??_0_1? : ccmd_enc_lwr = 5'h13 ; // wr partial lk 12'b?_?_?_?_010_??_?_?? : ccmd_enc_lwr = 5'h1c ; // shared response
            12'b?_?_?_?_011_??_?_?? : ccmd_enc_lwr = 5'h1f ; // modified response 12'b?_?_?_?_001_??_?_?? : ccmd_enc_lwr = 5'h19 ; // copyback 12'b?_0_1_1_000_??_?_?? : ccmd_enc_lwr = 5'h09 ; // read shared
            12'b?_0_1_0_000_??_?_??,
            12'b?_0_0_1_000_11_?_??,
            12'b?_0_0_1_000_10_?_??,
            12'b?_0_0_1_000_01_?_?? : ccmd_enc_lwr = 5'h0b ; // read modified 12'b0_0_0_1_000_00_?_?? : ccmd_enc_lwr = 5'h18 ; // write invalid 12'b0_0_0_0_000_??_?_?? : ccmd_enc_lwr = 5'h1b ; // invalidate default ccmd_enc_lwr = 5'hxx ;

endcase
    end
endfunction function [8:0] dcmd_enc_uppr ;
                // dcmd_enc_uppr -- (pktdlen,compdlen,f_dw,compel}
    input \brst_i* ,pkt_cap ,\gbl* ;
    input [1:0] datalen ,fdata_wd ;
    input [2:0] cmd_enc ;
    input [3:0] pktsiz_en ;
    begin casez ({\gbl* ,\brst_i* ,datlen,pktsiz_en,
                fdata_wd,cmd_enc,pkt_cap })

// 64 bytes - 32 bit datapath
            14'b?_?_??_????_00_01?_0,               // shared-modified response
            14'b?_?_??_????_00_0?1_0,               // copyback
            14'b1_0_00_????_00_000_0,
            14'b0_?_??_????_00_000_0,
            14'b0_?_??_0000_00_000_1,
            14'b1_0_00_0000_00_000_1 : dcmd_enc_uppr = 9'b101_101_00_1 ;
            14'b0_?_??_1000_01_000_1,
```

//node_27ea0/cadence/tifb/dcc/b/hbc_dec.v                                          modified 09/02/92 11:48 AM

```
        14'b1_0_00_1000_01_000_1,
        14'b0_?_??_1000_10_000_1,
        14'b1_0_00_1000_10_000_1,
        14'b?_?_??_1???_00_01?_1,                       // shared-modified response
        14'b?_?_??_1???_00_0?1_1,                       // copyback
        14'b0_?_??_1???_00_000_1,
        14'b1_0_00_1???_00_000_1 : dcmd_enc_uppr = 9'b101_101_00_0 ;
        14'b?_?_??_01??_00_01?_1,                       // shared-modified response
        14'b?_?_??_01??_00_0?1_1,                       // copyback
        14'b0_?_??_01??_00_000_1,
        14'b1_0_00_01??_00_000_1 : dcmd_enc_uppr = 9'b100_101_00_0 ;
        14'b?_?_??_001?_00_01?_1,                       // shared-modified response
        14'b?_?_??_001?_00_0?1_1,                       // copyback
        14'b0_?_??_001?_00_000_1,
        14'b1_0_00_001?_00_000_1 : dcmd_enc_uppr = 9'b011_101_00_0 ;
        14'b?_?_??_0001_00_01?_1,                       // shared-modified response
        14'b?_?_??_0001_00_0?1_1,                       // copyback
        14'b0_?_??_0001_00_000_1,
        14'b1_0_00_0001_00_000_1 : dcmd_enc_uppr = 9'b010_101_00_0 ;

// 64 bytes - 64 bit datapath
        14'b?_?_??_????_01_01?_0,                       // shared-modified response
        14'b?_?_??_????_01_0?1_0,                       // copyback
        14'b0_?_??_????_01_000_0,
        14'b1_0_00_????_01_000_0,
        14'b0_?_??_0000_01_000_1,
        14'b1_0_00_0000_01_000_1 : dcmd_enc_uppr = 9'b100_100_01_1 ;
        14'b0_?_??_?100_10_000_1,
        14'b1_0_00_?100_10_000_1,
        14'b?_?_??_?1??_01_01?_1,                       // shared-modified response
        14'b?_?_??_?1??_01_0?1_1,                       // copyback
        14'b0_?_??_?1??_01_000_1,
        14'b1_0_00_?1??_01_000_1 : dcmd_enc_uppr = 9'b100_100_01_0 ;
        14'b?_?_??_?01?_01_01?_1,                       // shared-modified response
        14'b?_?_??_?01?_01_0?1_1,                       // copyback
        14'b0_?_??_?01?_01_000_1,
        14'b1_0_00_?01?_01_000_1 : dcmd_enc_uppr = 9'b011_100_01_0 ;
        14'b?_?_??_?001_01_01?_1,                       // shared-modified response
        14'b?_?_??_?001_01_0?1_1,                       // copyback
        14'b0_?_??_?001_01_000_1,
        14'b1_0_00_?001_01_000_1 : dcmd_enc_uppr = 9'b010_100_01_0 ;

// 64 bytes - 128 bit datapath
        14'b?_?_??_????_10_01?_0,                       // shared-modified response
        14'b?_?_??_????_10_0?1_0,                       // copyback
        14'b0_?_??_????_10_000_0,
        14'b1_0_00_????_10_000_0,
        14'b0_?_??_0000_10_000_1,
        14'b1_0_00_0000_10_000_1 : dcmd_enc_uppr = 9'b011_011_10_1 ;
        14'b?_?_??_??1?_10_01?_1,                       // shared-modified response
        14'b?_?_??_??1?_10_0?1_1,                       // copyback
        14'b0_?_??_??1?_10_000_1,
        14'b1_0_00_??1?_10_000_1 : dcmd_enc_uppr = 9'b011_011_10_0 ;
        14'b?_?_??_??01_10_01?_1,                       // shared-modified response
        14'b?_?_??_??01_10_0?1_1,                       // copyback
        14'b0_?_??_??01_10_000_1,
        14'b1_0_00_??01_10_000_1 : dcmd_enc_uppr = 9'b010_011_10_0 ;

// 32 bytes - 32 bit datapath
        14'b1_0_01_????_00_000_0,
        14'b1_0_01_?000_00_000_1 : dcmd_enc_uppr = 9'b100_100_00_1 ;
        14'b1_0_01_?100_01_000_1,
        14'b1_0_01_?100_10_000_1,
        14'b1_0_01_?100_??_000_1 ,
        14'b1_0_01_?1??_00_000_1 : dcmd_enc_uppr = 9'b100_100_00_0 ;
        14'b1_0_01_?01?_00_000_1 : dcmd_enc_uppr = 9'b011_100_00_0 ;
        14'b1_0_01_?001_00_000_1 : dcmd_enc_uppr = 9'b010_100_00_0 ;

// 32 bytes - 64 bit datapath
        14'b1_0_01_????_01_000_0,
        14'b1_0_01_?000_01_000_1 : dcmd_enc_uppr = 9'b011_011_01_1 ;
        14'b1_0_01_??10_10_000_1,
        14'b1_0_01_??1?_01_000_1 : dcmd_enc_uppr = 9'b011_011_01_0 ;
        14'b1_0_01_?001_01_000_1 : dcmd_enc_uppr = 9'b010_011_01_0 ;

// 32 bytes - 128 bit datapath
        14'b1_0_01_????_10_000_0,
        14'b1_0_01_?000_10_000_1 : dcmd_enc_uppr = 9'b010_010_10_1 ;
        14'b1_0_01_???1_10_000_1 : dcmd_enc_uppr = 9'b010_010_10_0 ;

// 16 bytes - 32 bit datapath
        14'b1_0_10_????_00_000_0,
```

//node_27aa0/cadence/tifb/dcc/b/hbc_dec.v                                                                        modified 09/02/92 11:48 AM

```
            14'b1_0_10_??00_00_000_1 : dcmd_enc_uppr = 9'b011_011_00_1 ;
            14'b1_0_10_??10_01_000_1,
            14'b1_0_10_??10_10_000_1 : dcmd_enc_uppr = 9'b011_011_00_0 ;
            14'b1_0_10_??1?_?0_000_1 : dcmd_enc_uppr = 9'b011_011_00_0 ;
            14'b1_0_10_??01_00_000_1 : dcmd_enc_uppr = 9'b010_011_00_0 ;

// 16 bytes - 64 bit datapath
            14'b1_0_10_????_01_000_0,
            14'b1_0_10_??00_01_000_1 : dcmd_enc_uppr = 9'b010_010_01_1 ;
            14'b1_0_10_???1_01_000_1 : dcmd_enc_uppr = 9'b010_010_01_0 ;

// 8 bytes - 32 bit datapath
            14'b1_0_11_????_00_000_0,
            14'b1_0_11_???0_00_000_1 : dcmd_enc_uppr = 9'b010_010_00_1 ;
            14'b1_0_11_???1_01_000_1,
            14'b1_0_11_???1_10_000_1,
            14'b1_0_11_???1_00_000_1 : dcmd_enc_uppr = 9'b010_010_00_0 ;

// 8 bytes - 64 bit datapath
            14'b1_0_11_????_01_000_0,
            14'b1_0_11_???0_01_000_1 : dcmd_enc_uppr = 9'b010_001_01_1 ;

// 4 bytes or partial - 32 bit datapath (default)
            14'b1_1_??_????_??_000_? : dcmd_enc_uppr = 9'b000_001_00_1 ;

default dcmd_enc_uppr = 8'hxx ;
        endcase
    end
endfunction function [10:0] cmd_in_dec ;
        input [4:0] c_cmd ;
        input [3:0] fadec_1 ;
        input \tbst_o* ,\iv* ,wb_cache ;
// cmd_in_dec = {sys_hmode[2:0],no_dat_ph,invalid,
//     \tr_w_o* ,\inv_o* ,\cc_o* ,lk_cmd,splt_cmd,prot_err}
    begin
        casez ({c_cmd,\iv* ,fadec_1,\tbst_o* ,wb_cache})
                    // read unlocked - burst
            12'b00000_?_0100_0_?, 12'b00000_?_?001_0_?,
            12'b00000_?_100?_0_?, 12'b00000_?_0010_0_? :
                    cmd_in_dec = 11'b101_0_0_1_1_1_0_0_0 ;
                    // read locked - burst
            12'b00001_?_0100_0_?, 12'b00001_?_?001_0_?,
            12'b00001_?_100?_0_?, 12'b00001_?_0010_0_? :
                    cmd_in_dec = 11'b101_0_0_1_1_1_1_0_0 ;
                    // read unlocked - compelled
            12'b00000_?_0100_1_?, 12'b00000_?_?001_1_?,
            12'b00000_?_100?_1_?, 12'b00000_?_0010_1_? :
                    cmd_in_dec = 11'b001_0_0_1_1_1_0_0_0 ;
                    // read locked - compelled
            12'b00001_?_0100_1_?, 12'b00001_?_?001_1_?,
            12'b00001_?_100?_1_?, 12'b00001_?_0010_1_? :
                    cmd_in_dec = 11'b001_0_0_1_1_1_1_0_0 ;
                    // read unlocked - csr
            12'b00000_?_0011_?_?, 12'b00000_?_1101_?_? ,
            12'b00000_?_1111_?_?, 12'b00000_?_1110_?_? :
                    cmd_in_dec = 11'b001_1_0_1_1_1_0_0_0 ;
                    // read locked - csr
            12'b00001_?_0011_?_?, 12'b00001_?_1101_?_? :
                    cmd_in_dec = 11'b001_1_0_1_1_1_1_0_0 ;

// write unlocked - burst
            12'b10000_?_0100_0_?, 12'b10000_?_?001_0_?,
            12'b10000_?_100?_0_?, 12'b10000_?_0010_0_? :
                    cmd_in_dec = 11'b101_0_0_0_1_1_0_0_0 ;
                    // write locked - burst
            12'b10001_?_0100_0_?, 12'b10001_?_?001_0_?,
            12'b10001_?_100?_0_?, 12'b10001_?_0010_0_? :
                    cmd_in_dec = 11'b101_0_0_0_1_1_1_0_0 ;
                    // write unlocked - compelled
            12'b10000_?_0100_1_?, 12'b10000_?_?001_1_?,
            12'b10000_?_100?_1_?, 12'b10000_?_0010_1_?,
            12'b10000_?_1110_1_? :
                    cmd_in_dec = 11'b001_0_0_0_1_1_0_0_0 ;
                    // write locked - compelled
            12'b10001_?_0100_1_?, 12'b10001_?_?001_1_?,
            12'b10001_?_100?_1_?, 12'b10001_?_0010_1_? :
                    cmd_in_dec = 11'b001_0_0_0_1_1_1_0_0 ;
                    // write unlocked - csr
            12'b10000_?_0011_?_?, 12'b10000_?_1101_?_?,
            12'b10000_?_1111_?_? : // added fadec = 1111
```

```
                              cmd_in_dec = 11'b010_1_0_0_1_1_0_0_0 ;
              // write locked - csr
              12'b10001_?_0011_?_?, 12'b10001_?_1101_?_? :
                              cmd_in_dec = 11'b010_1_0_0_1_1_1_0_0 ;

// read partial
              12'b00010_?_0010_?_?, 12'b00010_?_?001_?_? :
                              cmd_in_dec = 11'b001_0_0_1_1_1_0_0_0 ;
              // read partial locked
              12'b00011_?_0010_?_?, 12'b00011_?_?001_?_? :
                              cmd_in_dec = 11'b001_0_0_1_1_1_1_0_0 ;
              // write partial
              12'b10010_?_0010_?_?, 12'b10010_?_?001_?_? :
                              cmd_in_dec = 11'b001_0_0_0_1_1_0_0_0 ;
              // write partial locked
              12'b10011_?_0010_?_?, 12'b10011_?_?001_?_? :
                              cmd_in_dec = 11'b001_0_0_0_1_1_1_0_0 ;

// write_no_acknowledge - burst
              12'b10110_?_0100_0_?, 12'b10110_?_?001_0_? ,
              12'b10110_?_100?_0_?, 12'b10110_?_0010_0_? :
                              cmd_in_dec = 11'b101_0_0_0_1_1_0_0_0 ;
              // write_no_acknowledge - compelled
              12'b10110_?_0100_1_?, 12'b10110_?_?001_1_?,
              12'b10110_?_100?_1_?, 12'b10110_?_0010_1_? :
                              cmd_in_dec = 11'b001_0_0_0_1_1_0_0_0 ;
              // write_no_acknowledge - csr
              12'b10110_?_0011_?_?, 12'b10110_?_1101_?_? :
                              cmd_in_dec = 11'b010_1_0_0_1_1_0_0_0 ;

// read invalid - read shared
              12'b0100?_1_?001_?_?, 12'b0100?_1_0000_?_? :
                              cmd_in_dec = 11'b101_1_0_1_1_0_0_0_0 ;
              12'b0100?_0_?001_?_? : cmd_in_dec = 11'b101_1_0_0_1_0_0_0_0 ;
              12'b0100?_1_0101_?_? : cmd_in_dec = 11'b110_1_0_1_1_1_0_0_0 ;
              12'b0100?_1_0000_?_? : cmd_in_dec = 11'b101_1_0_1_1_0_0_0_0 ;

// write invalid
              12'b11000_1_?001_?_? : cmd_in_dec = 11'b101_1_1_0_1_0_0_0_0 ;
              12'b11000_1_0000_?_? : cmd_in_dec = 11'b011_1_0_0_0_0_0_0_0 ;
              12'b11000_1_0101_?_? : cmd_in_dec = 11'b110_1_0_1_1_1_0_0_0 ;

// read modified
              12'b01011_1_?001_?_1, 12'b01011_1_0000_?_1 :
                              cmd_in_dec = 11'b101_1_0_1_0_0_0_0_0 ;
              12'b01011_1_?001_?_0 : cmd_in_dec = 11'b101_1_1_1_0_0_0_0_0 ;
              12'b01011_0_?001_?_? : cmd_in_dec = 11'b101_1_0_0_1_0_0_0_0 ;
              12'b01011_1_0101_?_? : cmd_in_dec = 11'b110_1_0_1_1_1_0_0_0 ;
              12'b01011_1_0000_?_0 : cmd_in_dec = 11'b011_1_0_0_0_0_0_0_0 ;

// copyback
              12'b11001_1_?001_?_? : cmd_in_dec = 11'b101_1_0_0_1_1_0_0_0 ;

// read response - write response
              12'b10100_1_0011_?_? : cmd_in_dec = 11'b011_1_0_0_1_1_0_1_0 ;
              12'b10101_1_0011_?_? : cmd_in_dec = 11'b011_1_0_1_1_1_0_1_0 ;

// shared response - modified response
              12'b11100_1_0110_?_?, 12'b11111_1_0110_?_? :
                              cmd_in_dec = 11'b011_1_0_1_1_1_0_1_0 ;

default         cmd_in_dec = 11'b101_0_0_1_1_1_0_0_1 ;
    endcase
  end
endfunction function [2:0] cmd_dl_dec ;
      input [7:0] brst_rmd ;
      input [3:0] hadec_i ;
      input [1:0] ln_siz ;
      input no_dat_ph ,\cc_o* ,\unaligned_i* ;

// cmd_dl_dec = ( dl_o* [1:0],tbst_o* )
  begin
      casez ({{|{brst_rmd[7:4]}},brst_rmd[3],brst_rmd[2],brst_rmd[1],
              brst_rmd[0],no_dat_ph,ln_siz,\cc_o* ,hadec_i,
              \unaligned_i* })

// 64 byte bursts
              14'b1_?_?_?_?_0_??_0_001?_? : cmd_dl_dec = 3'b00_0 ;
```

```
                    // 32 byte bursts
            14'b1_?_?_?_0_??_0_0100_?,
            14'b0_1_?_?_?_0_??_0_001?_?,
            14'b0_1_?_?_?_0_??_0_0100_?  : cmd_dl_dec = 3'b01_0 ;

// 16 byte bursts
            14'b1_?_?_?_0_??_0_0101_?,
            14'b0_1_?_?_?_0_??_0_0101_?,
            14'b0_0_1_?_?_0_??_0_010?_?,
            14'b0_0_1_?_?_0_??_0_001?_?  : cmd_dl_dec = 3'b10_0 ;

// 8 byte bursts
            14'b1_?_?_?_0_??_0_0110_?,
            14'b0_1_?_?_?_0_??_0_0110_?,
            14'b0_0_1_?_?_0_??_0_0110_?, 14'b0_0_0_1_?_0_??_0_001?_1, 14'b0_0_0_1_?_0_??_0_010?_1, 14'b0_0_0_1_?_0_??_0_0110_1  : cmd_dl_dec = 3'b11_0 ;

// 4 byte compelled - set dl_o to be 64 byte
                    // to handle unrestricted transfers
            14'b1_?_?_?_0_??_0_0001_?,
            14'b0_1_?_?_?_0_??_0_0001_?,
            14'b0_0_1_?_?_0_??_0_0001_?,
            14'b0_0_0_1_?_0_??_0_0001_?,
            14'b0_0_0_1_?_0_??_0_????_0,
            14'b0_0_0_0_1_0_??_0_????_?,
            14'b0_0_0_0_1_1_??_0_????_?,
            14'b0_0_0_1_?_1_??_0_????_?  : cmd_dl_dec = 3'b00_1 ;

// coherent bursts by line size
            14'b?_?_?_?_?_1_11_1_????_?  : cmd_dl_dec = 3'b11_0 ;
            14'b?_?_?_?_?_1_10_1_????_?  : cmd_dl_dec = 3'b10_0 ;
            14'b?_?_?_?_?_1_01_1_????_?  : cmd_dl_dec = 3'b01_0 ;
            14'b?_?_?_?_?_1_00_1_????_?  : cmd_dl_dec = 3'b00_0 ;

default          cmd_dl_dec = 3'b00_1 ;
        endcase
    end
endfunction function [8:0] brst_req ;
        input [4:0] c_cmd ;
        input [2:0] cm_i ;
        input \cc_o* ,no_dat_ph, \unaligned_i* ;

// brst_cnt - unrestricked indication,number of hbus bytes
    begin
        casez ({cm_i,c_cmd[4:3],\cc_o* ,no_dat_ph,
              (c_cmd[2:0] == 3'b001), \unaligned_i* })

//              128 bit data path not implemented
//        7'b111_10_0_0_0_1                    : brst_req = 10'h100 ;

9'b111_01_0_0_0_?,9'b110_10_0_0_0_?   : brst_req = 9'h080 ;

9'b111_00_0_0_0_?,9'b110_01_0_0_0_?,
        9'b101_10_0_0_0_?                     : brst_req = 9'h040 ;

9'b110_00_0_0_0_?,9'b101_01_0_0_0_?,
        9'b100_10_0_0_0_?                     : brst_req = 9'h020 ;

9'b101_00_0_0_0_?,9'b100_01_0_0_0_?,
        9'b011_10_0_0_0_?,9'b???_??_1_1_0_?   : brst_req = 9'h010 ;

9'b100_00_0_0_0_?,9'b011_01_0_0_0_?,
        9'b010_10_0_0_0_?                     : brst_req = 9'h008 ;

9'b011_00_0_0_0_?,9'b010_01_0_0_0_?,
        9'b001_10_0_0_0_?,9'b000_10_0_0_0_?   : brst_req = 9'h004 ;

9'b010_00_0_0_0_?,9'b001_01_0_0_0_?,
        9'b???_01_0_1_0_?,9'b001_01_0_0_1_0   : brst_req = 9'h002 ; // unaligned 9'b000_01_0_0_0_?                     : brst_req = 9'h102 ;
```

```
//node_27ea0/cadence/tifb/dcc/b/hbc_dec.v                              modified 09/02/92 11:48 AM 9'b001_00_0_0_0_?,9'b???_00_0_1_0_?,
                9'b001_01_0_0_1_1                       : brst_req = 9'h001 ; //not unaligned 9'b000_00_0_0_0_1                       : brst_req = 9'h101 ;

default                                 : brst_req = 9'h001 ;
            endcase
        end
    endfunction function [2:0] lcl_hmode ;
        input \brst_i* ,\gbl* ,\r_w_i* ,\invalid_i* ;
        input [1:0] dlength_i ;
        input [2:0] cmd_enc ;
        input [3:0] hadec_i ;
    begin
        casez ({\brst_i* ,\gbl* ,\r_w_i* ,\invalid_i* ,
                dlength_i,hadec_i, cmd_enc})

// fifo <-> hbus block
            13'b0_0_1_0_00_0000_000 ,       // read-modify 64 bytes
            13'b0_0_0_1_00_0000_000 ,       // write invalid
            13'b0_?_1_1_??_0000_000 ,       // read/read-shared
            13'b0_0_1_?_??_0001_000 ,       // coherent read-snoop
            13'b0_1_0_1_??_0000_000 ,       // write
// for send mail box message to fbus from hbus in burst mode
            13'b0_1_?_1_??_0111_000         // read/write fbus-csr : lcl_hmode = 3'b101 ;

// fifo <-> hbus compelled
            13'b1_?_1_1_??_0000_000 ,       // read/read-shared
            13'b1_0_1_?_??_0001_000 ,       // coherent read-snoop
            13'b1_1_0_1_??_0000_000 ,       // write
            13'b1_1_?_1_??_1?01_000 ,       // read/write dpu-csr
            13'b1_1_?_1_??_0111_000         // read/write fbus-csr
                        : lcl_hmode = 3'b001 ;

// sc <-> hbus block
            13'b0_0_0_1_1?_0110_000 ,       // write coherent
            13'b0_0_0_1_01_0110_000 ,       // write coherent
            13'b0_0_1_1_??_0110_000 ,       // read-shared
            13'b0_0_1_0_1?_0110_000 ,       // read-modified
            13'b0_0_1_0_01_0110_000 ,       // read-modified
            13'b0_0_?_?_??_????_100         // merge w/ sc
                        : lcl_hmode = 3'b100 ;

// sc <-> hbus compelled
            13'b1_0_0_1_??_0110_000 ,       // write coherent
            13'b1_0_1_?_??_0110_000 ,       // read-shared/read-modified
            13'b1_0_?_?_??_????_100         // merge w/ sc
                        : lcl_hmode = 3'b000 ;

// fifo -> sc block
            13'b0_0_1_0_1?_0000_000 ,       // read-modified
            13'b0_0_1_0_01_0000_000 ,       // read-modified
            13'b0_0_0_1_1?_0000_000 ,       // write coherent
            13'b0_0_0_1_01_0000_000         // write coherent
                        : lcl_hmode = 3'b111 ;

// sc -> fifo block
            13'b?_?_?_?_??_????_001         // copyback
                        : lcl_hmode = 3'b110 ;
        endcase
    end
    endfunction `endprotect
//*********************************************************************
// End of Model
//*********************************************************************
endmodule
```

//node_27ea0/cadence/tifb/dcc/b/hbc_csr.v                                    modified  03/30/92  5:02 PM
//*********************************************************************
//
//      Model Name      : hbc_csr.v
//      Revision        : $Revision: 2.12 $
//      Date            : $SDate: 92/03/30 17:02:26 $
//      Author          : Bill Saperstein
//      Description     : Hbus controller control and status
//                        registers and local bus interface
//
//*********************************************************************

//*********************************************************************
// Module Definition
//*********************************************************************
`protect module hbc_csr
        (
        // Inputs
                \lb_wr_i* ,             // ext. bus data transfer direction
                \lb_cs_i* ,             // hbc chip select for ext. bus
                \lb_oe_i* ,             // hbc chip oe for ext. bus b_la_i ,                // ext. bus address phase_i ,               // transaction phase
                dpc_err_i ,             // encoded dpc parity error
                cmdprot_err ,           // hbc protocol error
                cmdpar_err ,            // command parity error
                arb_err_i ,             // encoded arbitration error cap ,                   // capability lines
                st_i ,                  // input status lines
                cm_i ,                  // input command lines
                gr_i ,                  // fbus grant indication \tmr_clr* ,             // transaction timer clear
                \bsy_rtry_dly_en* ,     // busy retry delay enable
                \bsy_rtry_dly_clr* ,    // busy retry delay clear
                \bsy_rtry_cnt_en* ,     // busy retry count enable
                \bsy_rtry_cnt_clr* ,    // busy retry count clear st_reg_f ,              // fbc state machine
                st_reg_h ,              // fbc state machine pd_split ,              // pending split indication fb_master ,             // fbus master
                fb_read ,               // fbus master read/write direction
                \lk_o* ,                // hbus lock indication resulting
                                        // from fbus lock command \hbgrant_i* ,           // hbus grant indication (latched)

sys_mess ,              // fbus message access split_resp ,            // split response indication
                count_en ,              // counter enable for reset
                \align_occ* ,           // fbus align has occurred
                \st_ack* ,              // reset has finished \reset* ,               // hbc reset
                \reset_fb* ,            // hbc reset
                \rst* ,                 // hbc reset
                clock_i ,               // hbus clock
                ref_clk_i ,             // 40 MHz reference clock // Bi-directional Inputs
                ld_par_i ,              // ext. data bus parity
                b_ld_i ,                // ext. bus data // Outputs
                air2 ,                  // hbc status register
                air3 ,                  // reset counters
                pktsiz_en ,             // packet size enable
                pkt_cap ,               // packet capable
                fdata_wd ,              // fbus data width capability
                hdata64_cap ,           // hbus 64 bit data width cap
                faddr64_cap ,           // fbus 64 bit addr. width cap
                par_rpt_en ,            // parity report enable

```
//node_27es0/cadence/tifb/dcc/b/hbc_csr.v                              modified 03/30/92 5:02 PM fbmstr_en ,          // fbus master capable ln_siz ,             // hbus line/burst size
              wb_cache ,           // write-back cache
              slw_brst ,           // slow burst enable on hbus splt_tmout ,         // split response timeout
              bsy_tmout ,          // busy retry timeout
              \fbc_err* ,          // transaction timeout
              adpar_err,           // dpc address  parity error st_reset ,           // reset start indication lk_ext ,             // lock command extension berr ,               // hbus data parity error filtr_sel ,          // glitch filter select \int* ,              // hbus interrupt indication \csr_chip_oe* ,      // csr bus output en // Bi-directional Outputs
              ld_par_o ,           // ext. data bus parity
              b_ld_o               // ext. bus data
              ) ;

//**********************************************************************
// AIR4 bit definitions (configuration and status registers)
//**********************************************************************

//      air4a
//              [0]      write back cache supported on hbus
//              [1]      slow burst enable on hbus
//              [2-3]    processor cache line size
//                           00      64 bytes
//                           01      32 bytes
//                           10      16 bytes
//                           11       8 bytes
//              [4]      bypass glitch filter
//              [5]      hbus 64 data mode enable
//              [6]      module test capable
//              [7]      reserved //      air4b
//              [0-7]    reserved //      air4c
//              [0-7]    reserved //      air4d
//              [0-7]    reserved //**********************************************************************
// AIR5/6 bit definitions (configuration and status register)
//**********************************************************************

//      hbc_status_d
//              [7]      state register has been written
//              [6]      reset finiish
//              [5]      reserved
//              [4]      lock command received on fbus
//              [3]      message mailbox has been accessed //              [2]      hbus parity error
//              [1]      test start register has been written
//              [0]      split response received //      hbc_status_c
//              [7:2]    reserved
//              [1]      align has occurred
//              [0]      reserved //      hbc_status_b
//              [7:0]    reserved //      hbc_status_a
//              [7:0]    reserved
```

//node_27ea0/cadence/tifb/dcc/b/hbc_csr.v                                    modified 03/30/92 5:02 PM

```
//****************************************************************************
// AIR8/9 bit definitions (configuration and status register)
//****************************************************************************

//      interrupt_a
//          [7]         non-existent address
//          [6]         reserved
//          [5]         command parity error
//          [4]         data/address parity error
//          [3]         fbus protocol error
//          [2]         transaction timeout
//          [1]         split timeout
//          [0]         reserved //      interrupt_b
//          [7]         busy retry threshold exceeded
//          [6]         reserved
//          [5]         length error
//          [4]         arbitration error
//          [3]         arbitration compare error
//          [2]         arbitration timeout error
//          [1]         reserved
//          [0]         non-existent transaction ID //      interrupt_c
//          [7]         state resigter has been written
//          [6]         reset start register has been written
//          [5]         reserved
//          [4]         lock command received
//          [3]         message mailbox accessed
//          [2]         hbus parity error
//          [1]         test start register has been written
//          [0]         split response indication //      interrupt_d
//          [7:0]       reserved //****************************************************************************
// Define Parameters (optional)
//****************************************************************************

// changed the last 2 address bits

`define csr0a_addr      12'h000         // state_clear [7:0]
`define csr0b_addr      12'h001         // state_clear [15:8]
`define csr0c_addr      12'h002         // state_clear [23:16]
`define csr0d_addr      12'h003         // state_clear [31:24]

`define csr4a_addr      12'h004         // state_set [7:0]
`define csr4b_addr      12'h005         // state_set [15:8]
`define csr4c_addr      12'h006         // state_set [23:16]
`define csr4d_addr      12'h007         // state_set [31:24]

`define csr12a_addr     12'h00c         // reset_start [7:0]
`define csr12b_addr     12'h00d         // reset_start [15:8]
`define csr12c_addr     12'h00e         // reset_start [23:16]
`define csr12d_addr     12'h00f         // reset_start [31:24]

`define csr28a_addr     12'h01c         // split_timeout [7:0]
`define csr28b_addr     12'h01d         // split_timeout [15:8]
`define csr28c_addr     12'h01e         // split_timeout [23:16]
`define csr28d_addr     12'h01f         // split_timeout [31:24]

`define csr40a_addr     12'h028         // test start [7:0]
`define csr40b_addr     12'h029         // test start [15:8]
`define csr40c_addr     12'h02a         // test start [23:16]
`define csr40d_addr     12'h02b         // test start [31:24]

`define csr44a_addr     12'h02c         // test status [7:0]
`define csr44b_addr     12'h02d         // test status [15:8]
`define csr44c_addr     12'h02e         // test status [23:16]
`define csr44d_addr     12'h02f         // test status [31:24]

`define csr384a_addr    12'h180         // error_hi [7:0]
`define csr384b_addr    12'h181         // error_hi [15:8]
`define csr384c_addr    12'h182         // error_hi [23:16]
`define csr384d_addr    12'h183         // error_hi [31:24]

`define csr388a_addr    12'h184         // error_lo [7:0]
`define csr388b_addr    12'h185         // error_lo [15:8]
`define csr388c_addr    12'h186         // error_lo [23:16]
```

```
//node_27ea0/cadence/tifb/dcc/b/hbc_csr.v                              modified 03/30/92 5:02 PM `define csr388d_addr      12'h187        // error_lo [31:24]

`define csr512a_addr      12'h200        // logical_common_control [7:0]
`define csr512b_addr      12'h201        // logical_common_control [15:8]
`define csr512c_addr      12'h202        // logical_common_control [23:16]
`define csr512d_addr      12'h203        // logical_common_control [31:24]

`define csr516a_addr      12'h204        // logical_module_control [7:0]
`define csr516b_addr      12'h205        // logical_module_control [15:8]
`define csr516c_addr      12'h206        // logical_module_control [23:16]
`define csr516d_addr      12'h207        // logical_module_control [31:24]

`define csr520a_addr      12'h208        // bus_propagation_delay [7:0]
`define csr520b_addr      12'h209        // bus_propagation_delay [15:8]
`define csr520c_addr      12'h20a        // bus_propagation_delay [23:16]
`define csr520d_addr      12'h20b        // bus_propagation_delay [31:24]

`define csr528a_addr      12'h210        // transaction_timeout [7:0]
`define csr528b_addr      12'h211        // transaction_timeout [15:8]
`define csr528c_addr      12'h212        // transaction_timeout [23:16]
`define csr528d_addr      12'h213        // transaction_timeout [31:24]

`define csr540a_addr      12'h21c        // busy_retry [7:0]
`define csr540b_addr      12'h21d        // busy_retry [15:8]
`define csr540c_addr      12'h21e        // busy_retry [23:16]
`define csr540d_addr      12'h21f        // busy_retry [31:24]

`define csr544a_addr      12'h220        // busy_retry_delay [7:0]
`define csr544b_addr      12'h221        // busy_retry_delay [15:8]
`define csr544c_addr      12'h222        // busy_retry_delay [23:16]
`define csr544d_addr      12'h223        // busy_retry_delay [31:24]

`define air2a_addr        12'hfc0        // hbc_config [7:0]
`define air2b_addr        12'hfc1        // hbc_config [15:8]
`define air2c_addr        12'hfc2        // hbc_config [23:16]
`define air2d_addr        12'hfc3        // hbc_config [31:24]

`define air4a_addr        12'hfc4        // hbc_config [7:0]
`define air4b_addr        12'hfc5        // hbc_config [15:8]
`define air4c_addr        12'hfc6        // hbc_config [23:16]
`define air4d_addr        12'hfc7        // hbc_config [31:24]

`define air5a_addr        12'hfc8        // hbc_status_clr [7:0]
`define air5b_addr        12'hfc9        // hbc_status_clr [15:8]
`define air5c_addr        12'hfca        // hbc_status_clr [23:16]
`define air5d_addr        12'hfcb        // hbc_status_clr [31:24]

`define air6a_addr        12'hfcc        // hbc_status_set [7:0]
`define air6b_addr        12'hfcd        // hbc_status_set [15:8]
`define air6c_addr        12'hfce        // hbc_status_set [23:16]
`define air6d_addr        12'hfcf        // hbc_status_set [31:24]

`define air7a_addr        12'hfd0        // error_set [7:0]
`define air7b_addr        12'hfd1        // error_set [15:8]
`define air7c_addr        12'hfd2        // error_set [23:16]
`define air7d_addr        12'hfd3        // error_set [31:24]

`define air8a_addr        12'hfd4        // interrupt_mask [7:0]
`define air8b_addr        12'hfd5        // interrupt_mask [15:8]
`define air8c_addr        12'hfd6        // interrupt_mask [23:16]
`define air8d_addr        12'hfd7        // interrupt_mask [31:24]

`define air9a_addr        12'hfd8        // interrupt_id [7:0]
`define air9b_addr        12'hfd9        // interrupt_id [15:8]
`define air9c_addr        12'hfda        // interrupt_id [23:16]
`define air9d_addr        12'hfdb        // interrupt_id [31:24]

`define air10a_addr       12'hfdc        // command_extension [7:0]
`define air10b_addr       12'hfdd        // command_extension [15:8]
`define air10c_addr       12'hfde        // command_extension [23:16]
`define air10d_addr       12'hfdf        // command_extension [31:24]

`define air12a_addr       12'hff0        // busy rty counter [7:0]
`define air12b_addr       12'hff1        // busy rty counter [15:8]
`define air12c_addr       12'hff2        // busy rty counter [20:16]
`define air12d_addr       12'hff3        // not used `define air13a_addr       12'hff4        // splt timer [7:0]
`define air13b_addr       12'hff5        // splt timer [15:8]
`define air13c_addr       12'hff6        // splt timer [23:16]
`define air13d_addr       12'hff7        // not used
```

//node_27ea0/cadence/tifb/dcc/b/hbc_csr.v                                          modified 03/30/92 5:02 PM

```
'define air3a_addr     12'hff8        // reset counter [7:0]
'define air3b_addr     12'hff9        // reset counter [15:8]
'define air3c_addr     12'hffa        // reset counter [23:16]
'define air3d_addr     12'hffb        // reset counter [31:24]

'define air11a_addr    12'hffc        // tranaction timer [7:0]
'define air11b_addr    12'hffd        // tranaction timer [13:8]
'define air11c_addr    12'hffe        // st_reg_h [5:0]
'define air11d_addr    12'hfff        // csr oe, st_reg_f [4:0]

//*****************************************************************************
// Port Declarations
//***************************************************************************** input
                \lb_wr_i* ,\lb_cs_i* , \lb_oe_i* ,
                cmdprot_err ,cmdpar_err ,
                \tmr_clr* ,\bsy_rtry_dly_en* ,\bsy_rtry_dly_clr* ,
                \bsy_rtry_cnt_en* ,
                \bsy_rtry_cnt_clr* ,pd_split ,fb_master,fb_read,
                \lk_o* ,\hbgrant_i* , sys_mess,
                split_resp,
                ld_par_i ,\align_occ* , \st_ack* ,
                gr_i ,
                \reset* ,\reset_fb* ,\rst* ,clock_i ,ref_clk_i ;

input [1:0]
                phase_i ,dpc_err_i,arb_err_i ;

input [2:0]
                cap, count_en ;

input [4:0]
                st_reg_f;

input [5:0]
                st_reg_h;

input [7:0]
                st_i,cm_i,b_ld_i ;

input [11:0]
                b_la_i ;

output
                pkt_cap ,hdata64_cap,faddr64_cap ,
                par_rpt_en,fbmstr_en,
                wb_cache,slw_brst ,
                splt_tmout, bsy_tmout ,\fbc_err* ,adpar_err,
                berr , st_reset ,
                \int* ,ld_par_o, \csr_chip_oe* ;

output [1:0]
                fdata_wd, ln_siz ;

output [2:0]
                filtr_sel ,lk_ext ;

output [3:0]
                pktsiz_en, air2 ;

output [7:0]
                b_ld_o ;

output [31:0]
                air3 ;

//*****************************************************************************
// Net Assignments and Declarations
//*****************************************************************************

// *** Define internal wire nets
        wire [22:0]
                spl_tmr_in, spl_tmr ,spl_tmr_in2 ;
        wire [23:0]
                intrp ;
        wire [20:0]
                bsy_tmr_in,bsy_dly_tmr,bsy_tmr, bsy_tmr_in2 ;
        wire [15:0]
```

```
//node_27ea0/cadence/tifb/dcc/b/hbc_csr.v                            modified 03/30/92 5:02 PM rtry_cnt ;
        wire  [13:0]
                tr_tmr_in, tr_tmr, tr_tmr_in2 ;
        wire  [7:0]
                csr384a, csr384b, csr384c, csr384d,
                csr388c, csr388d, csr544b, csr512a, csr512b,
                csr512c, csr512d, csr516a, csr516b,
                csr516c, csr516d, csr540a, csr540b,
                csr540c, csr540d, csr40a, csr40b,
                csr40c, csr40d, csr44a, csr44b, csr44c, csr44d,
                cr_air4a, cr_air7a, cr_air7b, cr_air7c,
                cr_air8a, cr_air8b, cr_air8c,
                state_a, state_b, state_c, state_d,
                csr520a, csr520b, csr520c, csr520d,
                status, st_dl, st_d, cm_dl, cm_d ;

reg  [31:0]
                air3;

wire  [5:0]
                csr28a ;

wire  [4:0]
                cr_air9d ;
        wire  [3:0]
                csr528b, csr544a, cr_air2a ;
        wire  [2:0]
                cr_air10d, cap_dl, cap_d ;
        wire
                csr12d ,csr544c ,\spl_tmr_disable* ,
                \tran_tmr_disable* ,\bsy_dly_disable* ,
                bsy_dly_tmout ,tran_tmout ;

wire
                \air3a_en* ,\air3b_en* ,\air3c_en* ,\air3d_en* ;

wire[1:0]
                dpc_err_dl, dpc_err_d, phase_dl, phase_d ;

// *** Define tri-state buses trireg  [7:0]
                b_ld_o ;

// *** Define address decoders for csrs wire
                cr0a = (b_la_i == `csr0a_addr) ? 1 : 0 ,
                cr0b = (b_la_i == `csr0b_addr) ? 1 : 0 ,
                cr0c = (b_la_i == `csr0c_addr) ? 1 : 0 ,
                cr0d = (b_la_i == `csr0d_addr) ? 1 : 0 , cr4a = (b_la_i == `csr4a_addr) ? 1 : 0 ,
                cr4b = (b_la_i == `csr4b_addr) ? 1 : 0 ,
                cr4c = (b_la_i == `csr4c_addr) ? 1 : 0 ,
                cr4d = (b_la_i == `csr4d_addr) ? 1 : 0 , cr12a = (b_la_i == `csr12a_addr) ? 1 : 0 ,
                cr12b = (b_la_i == `csr12b_addr) ? 1 : 0 ,
                cr12c = (b_la_i == `csr12c_addr) ? 1 : 0 ,
                cr12d = (b_la_i == `csr12d_addr) ? 1 : 0 , cr28a = (b_la_i == `csr28a_addr) ? 1 : 0 ,
                cr28b = (b_la_i == `csr28b_addr) ? 1 : 0 ,
                cr28c = (b_la_i == `csr28c_addr) ? 1 : 0 ,
                cr28d = (b_la_i == `csr28d_addr) ? 1 : 0 , cr40a = (b_la_i == `csr40a_addr) ? 1 : 0 ,
                cr40b = (b_la_i == `csr40b_addr) ? 1 : 0 ,
                cr40c = (b_la_i == `csr40c_addr) ? 1 : 0 ,
                cr40d = (b_la_i == `csr40d_addr) ? 1 : 0 , cr44a = (b_la_i == `csr44a_addr) ? 1 : 0 ,
                cr44b = (b_la_i == `csr44b_addr) ? 1 : 0 ,
                cr44c = (b_la_i == `csr44c_addr) ? 1 : 0 ,
                cr44d = (b_la_i == `csr44d_addr) ? 1 : 0 , cr384a = (b_la_i == `csr384a_addr) ? 1 : 0 ,
                cr384b = (b_la_i == `csr384b_addr) ? 1 : 0 ,
                cr384c = (b_la_i == `csr384c_addr) ? 1 : 0 ,
                cr384d = (b_la_i == `csr384d_addr) ? 1 : 0 ,
```

```
//node_27ea0/cadence/tifb/dcc/b/hbc_csr.v                                    modified 03/30/92 5:02 PM cr388a = (b_la_i == `csr388a_addr) ? 1 : 0 ,
            cr388b = (b_la_i == `csr388b_addr) ? 1 : 0 ,
            cr388c = (b_la_i == `csr388c_addr) ? 1 : 0 ,
            cr388d = (b_la_i == `csr388d_addr) ? 1 : 0 , cr512a = (b_la_i == `csr512a_addr) ? 1 : 0 ,
            cr512b = (b_la_i == `csr512b_addr) ? 1 : 0 ,
            cr512c = (b_la_i == `csr512c_addr) ? 1 : 0 ,
            cr512d = (b_la_i == `csr512d_addr) ? 1 : 0 , cr516a = (b_la_i == `csr516a_addr) ? 1 : 0 ,
            cr516b = (b_la_i == `csr516b_addr) ? 1 : 0 ,
            cr516c = (b_la_i == `csr516c_addr) ? 1 : 0 ,
            cr516d = (b_la_i == `csr516d_addr) ? 1 : 0 , cr520a = (b_la_i == `csr520a_addr) ? 1 : 0 ,
            cr520b = (b_la_i == `csr520b_addr) ? 1 : 0 ,
            cr520c = (b_la_i == `csr520c_addr) ? 1 : 0 ,
            cr520d = (b_la_i == `csr520d_addr) ? 1 : 0 , cr528a = (b_la_i == `csr528a_addr) ? 1 : 0 ,
            cr528b = (b_la_i == `csr528b_addr) ? 1 : 0 ,
            cr528c = (b_la_i == `csr528c_addr) ? 1 : 0 ,
            cr528d = (b_la_i == `csr528d_addr) ? 1 : 0 , cr540a = (b_la_i == `csr540a_addr) ? 1 : 0 ,
            cr540b = (b_la_i == `csr540b_addr) ? 1 : 0 ,
            cr540c = (b_la_i == `csr540c_addr) ? 1 : 0 ,
            cr540d = (b_la_i == `csr540d_addr) ? 1 : 0 , cr544a = (b_la_i == `csr544a_addr) ? 1 : 0 ,
            cr544b = (b_la_i == `csr544b_addr) ? 1 : 0 ,
            cr544c = (b_la_i == `csr544c_addr) ? 1 : 0 ,
            cr544d = (b_la_i == `csr544d_addr) ? 1 : 0 , air2a = (b_la_i == `air2a_addr) ? 1 : 0 ,
            air2b = (b_la_i == `air2b_addr) ? 1 : 0 ,
            air2c = (b_la_i == `air2c_addr) ? 1 : 0 ,
            air2d = (b_la_i == `air2d_addr) ? 1 : 0 , air3a = (b_la_i == `air3a_addr) ? 1 : 0 ,
            air3b = (b_la_i == `air3b_addr) ? 1 : 0 ,
            air3c = (b_la_i == `air3c_addr) ? 1 : 0 ,
            air3d = (b_la_i == `air3d_addr) ? 1 : 0 , air4a = (b_la_i == `air4a_addr) ? 1 : 0 ,
            air4b = (b_la_i == `air4b_addr) ? 1 : 0 ,
            air4c = (b_la_i == `air4c_addr) ? 1 : 0 ,
            air4d = (b_la_i == `air4d_addr) ? 1 : 0 , air5a = (b_la_i == `air5a_addr) ? 1 : 0 ,
            air5b = (b_la_i == `air5b_addr) ? 1 : 0 ,
            air5c = (b_la_i == `air5c_addr) ? 1 : 0 ,
            air5d = (b_la_i == `air5d_addr) ? 1 : 0 , air6a = (b_la_i == `air6a_addr) ? 1 : 0 ,
            air6b = (b_la_i == `air6b_addr) ? 1 : 0 ,
            air6c = (b_la_i == `air6c_addr) ? 1 : 0 ,
            air6d = (b_la_i == `air6d_addr) ? 1 : 0 , air7a = (b_la_i == `air7a_addr) ? 1 : 0 ,
            air7b = (b_la_i == `air7b_addr) ? 1 : 0 ,
            air7c = (b_la_i == `air7c_addr) ? 1 : 0 ,
            air7d = (b_la_i == `air7d_addr) ? 1 : 0 , air8a = (b_la_i == `air8a_addr) ? 1 : 0 ,
            air8b = (b_la_i == `air8b_addr) ? 1 : 0 ,
            air8c = (b_la_i == `air8c_addr) ? 1 : 0 ,
            air8d = (b_la_i == `air8d_addr) ? 1 : 0 , air9a = (b_la_i == `air9a_addr) ? 1 : 0 ,
            air9b = (b_la_i == `air9b_addr) ? 1 : 0 ,
            air9c = (b_la_i == `air9c_addr) ? 1 : 0 ,
            air9d = (b_la_i == `air9d_addr) ? 1 : 0 , air10a = (b_la_i == `air10a_addr) ? 1 : 0 ,
            air10b = (b_la_i == `air10b_addr) ? 1 : 0 ,
            air10c = (b_la_i == `air10c_addr) ? 1 : 0 ,
            air10d = (b_la_i == `air10d_addr) ? 1 : 0 , air11a = (b_la_i == `air11a_addr) ? 1 : 0 ,
            air11b = (b_la_i == `air11b_addr) ? 1 : 0 ,
```

//node_27ea0/cadence/tifb/dcc/b/hbc_csr.v                                      modified 03/30/92 5:02 PM

```
                    air11c = (b_la_i == `air11c_addr) ? 1 : 0 ,
                    air11d = (b_la_i == `air11d_addr) ? 1 : 0 , air12a = (b_la_i == `air12a_addr) ? 1 : 0 ,
                    air12b = (b_la_i == `air12b_addr) ? 1 : 0 ,
                    air12c = (b_la_i == `air12c_addr) ? 1 : 0 ,
                    air12d = (b_la_i == `air12d_addr) ? 1 : 0 , air13a = (b_la_i == `air13a_addr) ? 1 : 0 ,
                    air13b = (b_la_i == `air13b_addr) ? 1 : 0 ,
                    air13c = (b_la_i == `air13c_addr) ? 1 : 0 ,
                    air13d = (b_la_i == `air13d_addr) ? 1 : 0 ;

// *** Define registers/latch elements dff_ce #(1)
            syn1  (\bsy_rtry_dly_en* ,\bsy_rtry_dly_en_d1* ,1'b0, ref_clk_i),
            syn2  (\bsy_rtry_dly_en_d1* ,\bsy_rtry_dly_en_d* ,1'b0, ref_clk_i), syn3  (\bsy_rtry_dly_clr* ,\bsy_rtry_dly_clr_d1* ,1'b0, ref_clk_i),
            syn4  (\bsy_rtry_dly_clr_d1* ,\bsy_rtry_dly_clr_d* ,1'b0, ref_clk_i), syn5  (\tmr_clr* ,\tmr_clr_d1* , 1'b0, ref_clk_i),
            syn6  (\tmr_clr_d1* ,\tmr_clr_d* , 1'b0, ref_clk_i), syn7  (pd_split ,pd_split_d1 , 1'b0, ref_clk_i),
            syn8  (pd_split_d1 ,pd_split_d , 1'b0, ref_clk_i), syn9  (\st_ack* ,st_ack_d1 , 1'b0, clock_i),
            syn10 (st_ack_d1, st_ack_d , 1'b0, clock_i), syn11 (sys_mess, sys_mess_d1 , 1'b0, clock_i),
            syn12 (sys_mess_d1, sys_mess_d , 1'b0, clock_i), syn13 (split_resp, split_resp_d1 , 1'b0, clock_i),
            syn14 (split_resp_d1, split_resp_d , 1'b0, clock_i), syn15 (\align_occ* , align_occ_d1 , 1'b0, clock_i),
            syn16 (align_occ_d1, align_occ_d , 1'b0, clock_i);

//      * hbc configuration csr (air2)
        dff_rs_ce #(1)
            air2_a0  (b_ld_i[0],cr_air2a[0],&{\reset_fb* ,\reset* } ,1'b1,\air2a_en* ,clock_i) ,
            air2_a1  (b_ld_i[1],cr_air2a[1],&{\reset_fb* ,\reset* } ,1'b1,\air2a_en* ,clock_i) ,
            air2_a2  (b_ld_i[2],cr_air2a[2],&{\reset_fb* ,\reset* } ,1'b1,\air2a_en* ,clock_i) ,
            air2_a3  (b_ld_i[3],cr_air2a[3],\rst* ,1'b1,\air2a_en* ,clock_i) ;

assign air2[3:0] = cr_air2a[3:0];

//      * hbc configuration csr (air4)
        dff_rs_ce #(8)
            air4_a  (b_ld_i,cr_air4a,\reset* ,1'b1,\air4a_en* ,clock_i) ;

//      * error_hi csr
        dff_rs_ce #(1)
            cr384_a7 (((\air7a_en* ) ? |(err_sum,csr384a[7]) : b_ld_i[7]),
                       csr384a[7],
                       \reset* ,1'b1,1'b0,clock_i) ,
            cr384_a6 (((\air7a_en* ) ? gr_1 : b_ld_i[6]),csr384a[6],
                       \reset* ,1'b1,&{csr384a[7],\air7a_en* },clock_i) ,
            cr384_a5 (((\air7a_en* ) ? &{err_sum,(phase_i == 2'b01)} :
                       b_ld_i[5]),csr384a[5],
                       \reset* ,1'b1, &{csr384a[7],\air7a_en* },clock_i) ,
            cr384_a4 (((\air7a_en* ) ? &{err_sum,(phase_i == 2'b11)} :
                       b_ld_i[4]),csr384a[4],
                       \reset* ,1'b1, &{csr384a[7],\air7a_en* },clock_i) ,
            cr384_a3 (((\air7a_en* ) ? &{err_sum,(phase_i == 2'b10)} :
                       b_ld_i[3]),csr384a[3],
                       \reset* ,1'b1,&{csr384a[7],\air7a_en* },clock_i) ,
            cr384_a2 (error_in(&(tran_tmout , ~st_i[2]),csr384a[2],
                       \csr384a_en* , \air7a_en* ,b_ld_i[2]),
                       csr384a[2],
                       \reset* , 1'b1,&{csr384a[7],\air7a_en* },clock_i) ,
            cr384_a1 (error_in(1'b0 ,csr384a[1],\csr384a_en* ,
                       \air7a_en* ,b_ld_i[1]),csr384a[1],\reset* ,1'b1,
                       &{csr384a[7],\air7a_en* },clock_i) ,
            cr384_a0 (error_in(cmdpar_err ,csr384a[0],\csr384a_en* ,
                       \air7a_en* ,b_ld_i[0]),csr384a[0],\reset* ,1'b1,
                       &{csr384a[7],\air7a_en* },clock_i) ,
            cr384_b7 (error_in(adpar_err ,csr384b[7],\csr384b_en* ,
```

//node_27ea0/cadence/tifb/dcc/b/hbc_csr.v                                              modified 03/30/92 5:02 PM

```
                             \air7b_en* ,b_ld_i[7]),csr384b[7],\reset* ,1'b1,
                             &(csr384a[7],\air7b_en* ),clock_1) ,
            cr384_b6  (error_in(cmdprot_err ,csr384b[6],\csr384b_en* ,
                             \air7b_en* ,b_ld_i[6]),csr384b[6],\reset* ,1'b1,
                             &(csr384a[7],\air7b_en* ),clock_1) ,
            cr384_b5  (error_in(&{tran_tmout ,st_i[2]},csr384b[5],
                             \csr384b_en* ,
                             \air7b_en* ,b_ld_i[5]),csr384b[5],\reset* ,1'b1,
                             &(csr384a[7],\air7b_en* ),clock_1) ,
            cr384_b4  (error_in(splt_tmout ,csr384b[4],\csr384b_en* ,
                             \air7b_en* ,b_ld_i[4]),csr384b[4],\reset* ,1'b1,
                             &(csr384a[7],\air7b_en* ),clock_1) ,
            cr384_b3  (error_in(1'b0 ,csr384b[3],\csr384b_en* ,
                             \air7b_en* ,b_ld_i[3]),csr384b[3],\reset* ,1'b1,
                             &(csr384a[7],\air7b_en* ),clock_1) ;

dff_rs_ce #(3)
            cr384_b2_0 (error_in3((cap & {3{err_sum}}),csr384b[2:0],
                             b_ld_i[2:0],\csr384b_en* ),csr384b[2:0],
                             \reset* ,1'b1,
                             csr384a[7],clock_1) ;

dff_rs_ce #(8)
            cr384_c  (error_in8((st_i & {8{err_sum}}),csr384c,
                             b_ld_i,\csr384c_en* ),csr384c,\reset* ,1'b1,
                             csr384a[7],clock_1) , cr384_d  (error_in8((cm_i & {8{err_sum}}),csr384d,
                             b_ld_i,\csr384d_en* ),csr384d,\reset* ,1'b1,
                             csr384a[7],clock_1) ;

//      * error_lo register
    dff_rs_ce #(1)
            cr388_d7  (error_in(bsy_rtry_err,csr388d[7],\csr388d_en* ,
                             \air7d_en* ,b_ld_i[7]),csr388d[7],\reset* ,1'b1,
                             &(csr384a[7],\air7d_en* ),clock_1) , cr388_d6  (error_in(1'b0,csr388d[6],\csr388d_en* ,
                             \air7d_en* ,b_ld_i[6]),csr388d[6],\reset* ,1'b1,
                             &(csr384a[7],\air7d_en* ),clock_1) , cr388_d5  (error_in(packlen_err,csr388d[5],\csr388d_en* ,
                             \air7d_en* ,b_ld_i[5]),csr388d[5],\reset* ,1'b1,
                             &(csr384a[7],\air7d_en* ),clock_1) , cr388_d4  (error_in(arbit_err,csr388d[4],
                             \csr388d_en* ,
                             \air7d_en* ,b_ld_i[4]),csr388d[4],\reset* ,1'b1,
                             &(csr384a[7],\air7d_en* ),clock_1) , cr388_d3  (error_in(arbit_cmp_err,csr388d[3],
                             \csr388d_en* ,
                             \air7d_en* ,b_ld_i[3]),csr388d[3],\reset* ,1'b1,
                             &(csr384a[7],\air7d_en* ),clock_1) , cr388_d2  (error_in(arbit_tmrout_err,csr388d[2],
                             \csr388d_en* ,
                             \air7d_en* ,b_ld_i[2]),csr388d[2],\reset* ,1'b1,
                             &(csr384a[7],\air7d_en* ),clock_1) , cr388_d1  (error_in(1'b0,csr388d[1],
                             \csr388d_en* ,
                             \air7d_en* ,b_ld_i[1]),csr388d[1],\reset* ,1'b1,
                             &(csr384a[7],\air7d_en* ),clock_1) , cr388_d0  (error_in(1'b0,csr388d[0],
                             \csr388d_en* ,
                             \air7d_en* ,b_ld_i[0]),csr388d[0],\reset* ,1'b1,
                             &(csr384a[7],\air7d_en* ),clock_1) , cr388_c7  (error_in(1'b0,csr388c[7],\csr388c_en* ,
                             \air7c_en* ,b_ld_i[7]),csr388c[7],\reset* ,1'b1,
                             &(csr384a[7],\air7c_en* ),clock_1) , cr388_c6  (error_in(1'b0,csr388c[6],\csr388c_en* ,
                             \air7c_en* ,b_ld_i[6]),csr388c[6],\reset* ,1'b1,
                             &(csr384a[7],\air7c_en* ),clock_1) , cr388_c5  (error_in(1'b0,csr388c[5],\csr388c_en* ,
                             \air7c_en* ,b_ld_i[5]),csr388c[5],\reset* ,1'b1,
                             &(csr384a[7],\air7c_en* ),clock_1) ,
```

```
//node_27ea0/cadence/tifb/dcc/b/hbc_csr.v                                    modified 03/30/92 5:02 PM cr388_c4 (error_in(1'b0,csr388c[4]), \csr388c_en* ,
                                \air7c_en* ,b_ld_1[4]),csr388c[4],\reset* ,1'b1,
                                &(csr384a[7],\air7c_en* ),clock_1) , cr388_c3 (error_in(1'b0,csr388c[3], \csr388c_en* ,
                                \air7c_en* ,b_ld_1[3]),csr388c[3],\reset* ,1'b1,
                                &(csr384a[7],\air7c_en* ),clock_1) , cr388_c2 (error_in(1'b0,csr388c[2], \csr388c_en* ,
                                \air7c_en* ,b_ld_1[2]),csr388c[2],\reset* ,1'b1,
                                &(csr384a[7],\air7c_en* ),clock_1) , cr388_c1 (error_in(1'b0,csr388c[1], \csr388c_en* ,
                                \air7c_en* ,b_ld_1[1]),csr388c[1],\reset* ,1'b1,
                                &(csr384a[7],\air7c_en* ),clock_1) , cr388_c0 (error_in(1'b0,csr388c[0], \csr388c_en* ,
                                \air7c_en* ,b_ld_1[0]),csr388c[0],\reset* ,1'b1,
                                &(csr384a[7],\air7c_en* ),clock_1) ;

//      * transaction timer csr
        dff_rs_ce #(1)  //after reset csr528= 32'h80000
                cr528_b_3 (b_ld_1[3],csr528b[3],1'b1,\reset* ,\csr528b_en* ,
                                clock_1) ;
        dff_rs_ce #(3)
                cr528_b_2_0 (b_ld_1[2:0],csr528b[2:0],\reset* ,1'b1,\csr528b_en* ,
                                clock_1) ;

//      * split transaction timeout value csr
        dff_rs_ce #(6)
                cr28_a   (b_ld_1[5:0],csr28a,\reset* ,1'b1,\csr28a_en* ,
                                clock_1) ;

//      * busy retry delay value csr
        dff_rs_ce #(4)
                cr544_a (b_ld_1[3:0],csr544a,\reset* ,1'b1,\csr544a_en* ,
                                clock_1) ;

dff_rs_ce #(8)
                cr544_b (b_ld_1,csr544b,\reset* ,1'b1,\csr544b_en* ,
                                clock_1) ;

dff_rs_ce #(1)
                cr544_c (b_ld_1[7],csr544c,\reset* ,1'b1,\csr544c_en* ,
                                clock_1) ;

//      * logical common control csr
        dff_rs_ce #(8)

cr512_a (b_ld_1,csr512a,\reset* ,1'b1,\csr512a_en* ,
                                clock_1) , cr512_b (b_ld_1,csr512b,\reset* ,1'b1,\csr512b_en* ,
                                clock_1) , cr512_c (b_ld_1,csr512c,\reset* ,1'b1,\csr512c_en* ,
                                clock_1) , cr512_d (b_ld_1,csr512d,\reset* ,1'b1,\csr512d_en* ,
                                clock_1) , //      * logical module control csr cr516_a (b_ld_1,csr516a,\reset* ,1'b1,\csr516a_en* ,
                                clock_1) , cr516_b (b_ld_1,csr516b,\reset* ,1'b1,\csr516b_en* ,
                                clock_1) , cr516_c (b_ld_1,csr516c,\reset* ,1'b1,\csr516c_en* ,
                                clock_1) , cr516_d (b_ld_1,csr516d,\reset* ,1'b1,\csr516d_en* ,
                                clock_1) , //      * busy retry counter csr cr540_a (b_ld_1,csr540a,\reset* ,1'b1,\csr540a_en* ,
                                clock_1) , cr540_b (b_ld_1,csr540b,\reset* ,1'b1,\csr540b_en* ,
```

//node_27ea0/cadence/tifb/doc/b/hbc_csr.v                                    modified  03/30/92  5:02 PM

```
                        clock_1) , cr540_c ((((\csr540c_en* ) ? rtry_cnt[15:8] : b_ld_1),
                    csr540c,&{\reset* ,\bsy_rtry_cnt_clr* },1'b1,
                    &{\csr540c_en* ,\bsy_rtry_cnt_en* },
                        clock_1) , cr540_d ((((\csr540d_en* ) ? rtry_cnt[7:0] : b_ld_1),
                    csr540d,&{\reset* ,\bsy_rtry_cnt_clr* },1'b1,
                    &{\csr540d_en* ,\bsy_rtry_cnt_en* },
                        clock_1) ,
//      * test start csr
            cr40_a  (b_ld_1,csr40a,\reset* ,1'b1,\csr40a_en* ,
                        clock_1) , cr40_b  (b_ld_1,csr40b,\reset* ,1'b1,\csr40b_en* ,
                        clock_1) , cr40_c  (b_ld_1,csr40c,\reset* ,1'b1,\csr40c_en* ,
                        clock_1) , cr40_d  (b_ld_1,csr40d,\reset* ,1'b1,\csr40d_en* ,
                        clock_1) ,
//      * test status csr cr44_a  (b_ld_1,csr44a,\reset* ,1'b1,\csr44a_en* ,
                        clock_1) , cr44_b  (b_ld_1,csr44b,\reset* ,1'b1,\csr44b_en* ,
                        clock_1) , cr44_c  (b_ld_1,csr44c,\reset* ,1'b1,\csr44c_en* ,
                        clock_1) ;

dff_rs_ce #(3)

cr44_d1 (b_ld_1[7:5],csr44d[7:5],\reset* ,1'b1,
                    \csr44d_en* ,clock_1) ;

dff_rs_ce #(1)

cr44_d2 (((\csr44d_en* ) ? |{&{tst_cap,\csr40a_en* },
                                        &{tst_cap,csr44d[4]}} : b_ld_1[4]) ,
                    csr44d[4], \reset* ,1'b1,1'b0,clock_1) ;

dff_rs_ce #(4)

cr44_d3 (((\csr44d_en* ) ? {csr44d[3:0] & {4{\csr40a_en* }}} :
                                        b_ld_1[3:0]) ,
                    csr44d[3:0], \reset* ,1'b1,1'b0,clock_1) ;

//      * interrupt mask csr dff_rs_ce #(8)
            air8_a  (b_ld_1,cr_air8a,\reset* ,1'b1,\air8a_en* ,
                        clock_1) , air8_b  (b_ld_1,cr_air8b,\reset* ,1'b1,\air8b_en* ,
                        clock_1) , air8_c  (b_ld_1,cr_air8c,\reset* ,1'b1,\air8c_en* ,
                        clock_1) , //      * state register csr cr_state_a ((((\csr0a_en* ) ? b_ld_1 | state_a :
                        ~b_ld_1 & state_a),state_a,\reset* ,1'b1,
                        &{\csr0a_en* ,\csr4a_en* }),clock_1) , cr_state_b ((((\csr0b_en* ) ? b_ld_1 | state_b :
                        ~b_ld_1 & state_b),state_b,\reset* ,1'b1,
                        &{\csr0b_en* ,\csr4b_en* }),clock_1) , cr_state_c ((((\csr0c_en* ) ? b_ld_1 | state_c :
                        ~b_ld_1 & state_c),state_c,\reset* ,1'b1,
                        &{\csr0c_en* ,\csr4c_en* }),clock_1) ;

dff_rs_ce #(3)

cr_state_d_7_5 ((((\csr0d_en* ) ? b_ld_1[7:5] | state_d[7:5] :
```

```
//node_27ea0/cadence/tifb/dcc/b/hbc_csr.v                                    modified  03/30/92  5:02 PM -b_ld_i[7:5] & state_d[7:5]) ,state_d[7:5],
                            \reset* ,
                            1'b1,&(\csr0d_en* ,\csr4d_en* ),clock_i) ;

dff_rs_ce #(1)

cr_state_d4   (state_in(b_ld_i[4],state_d[4],err_sum,
                               \csr0d_en* ,\csr4d_en* ),state_d[4],\reset* ,
                               1'b1,1'b0,clock_i) ;

dff_rs_ce #(4)
                cr_state_d_3_0 (((\csr0d_en* ) ? b_ld_i[3:0] | state_d[3:0] :
                                -b_ld_i[3:0] & state_d[3:0]) ,state_d[3:0],
                                \reset* ,
                                1'b1,&(\csr0d_en* ,\csr4d_en* ),clock_i) ;

//      * interrupt vector csr dff_rs_ce #(5)
                air9_d   (iva(intrp),
                          cr_air9d,\reset* ,1'b1,1'b0,
                          clock_i) ;

//      * bus propagation csr dff_rs_ce #(6)

cr520_d_5_0 (b_ld_i[5:0],csr520d[5:0],1'b1,\reset* ,
                             \csr520d_en* ,clock_i) ;

//      * hbc status csr dff_rs_ce #(1)
                cr_stat_d7 (state_in(b_ld_i[7],status[7],state_status,
                             \air5d_en* ,\air6d_en* ),
                             status[7],\reset* ,1'b1,1'b0,
                             clock_i) , cr_stat_d6 (state_in(b_ld_i[6],status[6],~st_ack_d ,
                             \air5d_en* ,\air6d_en* ),
                             status[6],\reset* ,1'b1,1'b0,
                             clock_i) , cr_stat_d5 (state_in(b_ld_i[5],status[5],1'b0,
                             \air5d_en* ,\air6d_en* ),
                             status[5],\reset* ,1'b1,1'b0,
                             clock_i) , cr_stat_d4 (state_in(b_ld_i[4],status[4],lock_status,
                             \air5d_en* ,\air6d_en* ),
                             status[4],\reset* ,1'b1,1'b0,
                             clock_i) , cr_stat_d3 (state_in(b_ld_i[3],status[3],mess_status,
                             \air5d_en* ,\air6d_en* ),
                             status[3],\reset* ,1'b1,1'b0,
                             clock_i) , cr_stat_d2 (state_in(b_ld_i[2],status[2],hbpar_err,
                             \air5d_en* ,\air6d_en* ),
                             status[2],\reset* ,1'b1,1'b0,
                             clock_i) , cr_stat_d1 (state_in(b_ld_i[1],status[1],tststrt_status,
                             \air5d_en* ,\air6d_en* ),
                             status[1],\reset* ,1'b1,1'b0,
                             clock_i) , cr_stat_d0 (state_in(b_ld_i[0],status[0],spl_rsp,
                             \air5d_en* ,\air6d_en* ),
                             status[0],\reset* ,1'b1,1'b0,
                             clock_i) , cr_stat_c1 (state_in(b_ld_i[1],status_c,~align_occ_d ,
                             \air5c_en* ,\air6c_en* ),
                             status_c,\reset* ,1'b1,1'b0,
                             clock_i) ;

//      * reset start csr dff_rs_ce #(1)
```

//node_27ea0/cadence/tifb/dcc/b/hbo_csr.v                                    modified 03/30/92 5:02 PM

```
                cr12_d  (b_ld_i[0],csr12d,\reset* ,1'b1,\csr12d_en* ,
                        clock_i) ;
//      * lock command extension csr
        dff_rs_ce #(3)
                air10_d (b_ld_i[2:0],cr_air10d,\reset* ,1'b1,
                        \air10d_en* ,clock_i) ;
//      * extra csr output enable bit for core csr's
        dff_rs_ce #(1)
                air11_d (b_ld_i[7],extra_oe,1'b1, \reset* ,
                        \air11d_en* ,clock_i) ;
//      * transaction timeout timer
        dff_rs_ce #(8)
                trantmrc (tr_tmr_in2[7:0],tr_tmr[7:0],&(\reset* ,\tmr_clr_d* ),
                        1'b1,&(~\tmr_clr_d* ,\air11a_en* ),ref_clk_i) ;
        dff_rs_ce #(6)
                trantmrd (tr_tmr_in2[13:8],tr_tmr[13:8],&(\reset* ,\tmr_clr_d* ),
                        1'b1,&(~\tmr_clr_d* ,\air11b_en* ) ,ref_clk_i) ;
//      * split timeout timer
        dff_rs_ce #(8)
                spltmra (spl_tmr_in2[7:0],spl_tmr[7:0],&(\reset* ,pd_split_d ),
                        1'b1,&(~pd_split_d,\air13a_en* ),ref_clk_i)  ;
        dff_rs_ce #(8)
                spltmrb (spl_tmr_in2[15:8],spl_tmr[15:8],&(\reset* ,pd_split_d ),
                        1'b1,&(~pd_split_d,\air13b_en* ),ref_clk_i)  ;
        dff_rs_ce #(7)
                spltmrc (spl_tmr_in2[22:16],spl_tmr[22:16],&(\reset* ,pd_split_d ),
                        1'b1,&(~pd_split_d,\air13c_en* ),ref_clk_i)  ;
//      * busy retry timeout timer
        dff_rs_ce #(8)
                bsytmra (bsy_tmr_in2[7:0],bsy_dly_tmr[7:0],&(\reset* ,\bsy_rtry_dly_clr_d* ),
                        1'b1,&(\bsy_rtry_dly_en_d* ,\air12a_en* ),ref_clk_i)  ;
        dff_rs_ce #(8)
                bsytmrb (bsy_tmr_in2[15:8],bsy_dly_tmr[15:8],&(\reset* ,\bsy_rtry_dly_clr_d* ),
                        1'b1,&(\bsy_rtry_dly_en_d* ,\air12b_en* ),ref_clk_i)  ;
        dff_rs_ce #(5)
                bsytmrc (bsy_tmr_in2[20:16],bsy_dly_tmr[20:16],&(\reset* ,\bsy_rtry_dly_clr_d* ),
                        1'b1,&(\bsy_rtry_dly_en_d* ,\air12c_en* ),ref_clk_i)  ;
        always @ ( posedge ref_clk_i ) begin
            if (|((count_en == 3'b000)}) air3 = 32'b0;
            else begin
                if (&{\air3a_en* ,\air3b_en* ,\air3c_en* ,\air3d_en* })
                    begin
                        if ( count_en[0] )
                            air3[23:0] = air3[23:0] + 1'b1;

if ( count_en[2] )
                            air3[31:24] = air3[31:24] + 1'b1;
                        else if ( ((count_en[1] && (air3[15:0] == 16'hffff))) )
                            air3[31:24] = air3[31:24] + 1'b1;
                    end
                else begin
                    if (!\air3a_en* ) air3[7:0]   = b_ld_i;
                    if (!\air3b_en* ) air3[15:8]  = b_ld_i;
                    if (!\air3c_en* ) air3[23:16] = b_ld_i;
                    if (!\air3d_en* ) air3[31:24] = b_ld_i;
                end
            end
        end
```

```
//*****************************************************************
// Pre-defined Module Instantiations
//*****************************************************************

// Not applicable

//*****************************************************************
// Gate and Structural Declarations
//*****************************************************************
```

```
//node_27ea0/cadence/tifb/dcc/b/hbq_csr.v                          modified 03/30/92 5:02 PM // *** Define error_summary line -> this line also sets
//     the elog bit in the state csr or
                100     (err_sum, tran_tmout, cmdpar_err, adpar_err, cmdprot_err,
                         splt_tmout, bsy_rtry_err, packlen_err, arbit_err,
                         arbit_cmp_err, arbit_tmrout_err,csr388d[1], csr388d[0] ) ;

// *** Define csr reg write and read enables
//     cs* =0 /wr* = 1 outputs csr's to internal bus
//     cs* =0 /wr* = 0 enables writing into csr's nand
                10a     (\csr0a_en* ,cr0a,~|{\lb_wr_1* ,\lb_cs_1* }) ,
                10b     (\csr0b_en* ,cr0b,~|{\lb_wr_1* ,\lb_cs_1* }) ,
                10c     (\csr0c_en* ,cr0c,~|{\lb_wr_1* ,\lb_cs_1* }) ,
                10d     (\csr0d_en* ,cr0d,~|{\lb_wr_1* ,\lb_cs_1* }) , 11a     (\csr4a_en* ,cr4a,~|{\lb_wr_1* ,\lb_cs_1* }) ,
                11b     (\csr4b_en* ,cr4b,~|{\lb_wr_1* ,\lb_cs_1* }) ,
                11c     (\csr4c_en* ,cr4c,~|{\lb_wr_1* ,\lb_cs_1* }) ,
                11d     (\csr4d_en* ,cr4d,~|{\lb_wr_1* ,\lb_cs_1* }) , 11aa    (\csr12a_en* ,cr12a,~|{\lb_wr_1* ,\lb_cs_1* }) ,
                11ba    (\csr12b_en* ,cr12b,~|{\lb_wr_1* ,\lb_cs_1* }) ,
                11ca    (\csr12c_en* ,cr12c,~|{\lb_wr_1* ,\lb_cs_1* }) ,
                11da    (\csr12d_en* ,cr12d,~|{\lb_wr_1* ,\lb_cs_1* }) , 12a     (\csr28a_en* ,cr28a,~|{\lb_wr_1* ,\lb_cs_1* }) ,
                12b     (\csr28b_en* ,cr28b,~|{\lb_wr_1* ,\lb_cs_1* }) ,
                12c     (\csr28c_en* ,cr28c,~|{\lb_wr_1* ,\lb_cs_1* }) ,
                12d     (\csr28d_en* ,cr28d,~|{\lb_wr_1* ,\lb_cs_1* }) , 13aaa   (\air2a_en* ,air2a,~|{\lb_wr_1* ,\lb_cs_1* }) ,
                13aab   (\air2b_en* ,air2b,~|{\lb_wr_1* ,\lb_cs_1* }) ,
                13aac   (\air2c_en* ,air2c,~|{\lb_wr_1* ,\lb_cs_1* }) ,
                13aad   (\air2d_en* ,air2d,~|{\lb_wr_1* ,\lb_cs_1* }) , 13aba   (\air3a_en* ,air3a,~|{\lb_wr_1* ,\lb_cs_1* }) ,
                13abb   (\air3b_en* ,air3b,~|{\lb_wr_1* ,\lb_cs_1* }) ,
                13abc   (\air3c_en* ,air3c,~|{\lb_wr_1* ,\lb_cs_1* }) ,
                13abd   (\air3d_en* ,air3d,~|{\lb_wr_1* ,\lb_cs_1* }) , 13a     (\air4a_en* ,air4a,~|{\lb_wr_1* ,\lb_cs_1* }) ,
                13b     (\air4b_en* ,air4b,~|{\lb_wr_1* ,\lb_cs_1* }) ,
                13c     (\air4c_en* ,air4c,~|{\lb_wr_1* ,\lb_cs_1* }) ,
                13d     (\air4d_en* ,air4d,~|{\lb_wr_1* ,\lb_cs_1* }) , 13aa    (\air5a_en* ,air5a,~|{\lb_wr_1* ,\lb_cs_1* }) ,
                13ba    (\air5b_en* ,air5b,~|{\lb_wr_1* ,\lb_cs_1* }) ,
                13ca    (\air5c_en* ,air5c,~|{\lb_wr_1* ,\lb_cs_1* }) ,
                13da    (\air5d_en* ,air5d,~|{\lb_wr_1* ,\lb_cs_1* }) , 13ab    (\air6a_en* ,air6a,~|{\lb_wr_1* ,\lb_cs_1* }) ,
                13bb    (\air6b_en* ,air6b,~|{\lb_wr_1* ,\lb_cs_1* }) ,
                13cb    (\air6c_en* ,air6c,~|{\lb_wr_1* ,\lb_cs_1* }) ,
                13db    (\air6d_en* ,air6d,~|{\lb_wr_1* ,\lb_cs_1* }) , 13ac    (\air7a_en* ,air7a,~|{\lb_wr_1* ,\lb_cs_1* }) ,
                13bc    (\air7b_en* ,air7b,~|{\lb_wr_1* ,\lb_cs_1* }) ,
                13cc    (\air7c_en* ,air7c,~|{\lb_wr_1* ,\lb_cs_1* }) ,
                13dc    (\air7d_en* ,air7d,~|{\lb_wr_1* ,\lb_cs_1* }) , 13ad    (\air8a_en* ,air8a,~|{\lb_wr_1* ,\lb_cs_1* }) ,
                13bd    (\air8b_en* ,air8b,~|{\lb_wr_1* ,\lb_cs_1* }) ,
                13cd    (\air8c_en* ,air8c,~|{\lb_wr_1* ,\lb_cs_1* }) ,
                13dd    (\air8d_en* ,air8d,~|{\lb_wr_1* ,\lb_cs_1* }) , 13ae    (\air9a_en* ,air9a,~|{\lb_wr_1* ,\lb_cs_1* }) ,
                13be    (\air9b_en* ,air9b,~|{\lb_wr_1* ,\lb_cs_1* }) ,
                13ce    (\air9c_en* ,air9c,~|{\lb_wr_1* ,\lb_cs_1* }) ,
                13de    (\air9d_en* ,air9d,~|{\lb_wr_1* ,\lb_cs_1* }) , 13af    (\air10a_en* ,air10a,~|{\lb_wr_1* ,\lb_cs_1* }) ,
                13bf    (\air10b_en* ,air10b,~|{\lb_wr_1* ,\lb_cs_1* }) ,
                13cf    (\air10c_en* ,air10c,~|{\lb_wr_1* ,\lb_cs_1* }) ,
                13df    (\air10d_en* ,air10d,~|{\lb_wr_1* ,\lb_cs_1* }) , 13ag    (\air11a_en* ,air11a,~|{\lb_wr_1* ,\lb_cs_1* }) ,
                13bg    (\air11b_en* ,air11b,~|{\lb_wr_1* ,\lb_cs_1* }) ,
```

```
//node_27ea0/cadence/tifb/dcc/b/hbc_csr.v                                    modified 03/30/92 5:02 PM 13dg       (\air11d_en* ,air11d,~|(\lb_wr_i* ,\lb_cs_i* )) , 13ah       (\air12a_en* ,air12a,~|(\lb_wr_i* ,\lb_cs_i* )) ,
       13bh       (\air12b_en* ,air12b,~|(\lb_wr_i* ,\lb_cs_i* )) ,
       13ch       (\air12c_en* ,air12c,~|(\lb_wr_i* ,\lb_cs_i* )) , 13ai       (\air13a_en* ,air13a,~|(\lb_wr_i* ,\lb_cs_i* )) ,
       13bi       (\air13b_en* ,air13b,~|(\lb_wr_i* ,\lb_cs_i* )) ,
       13ci       (\air13c_en* ,air13c,~|(\lb_wr_i* ,\lb_cs_i* )) , 14aa       (\csr40a_en* ,cr40a,~|(\lb_wr_i* ,\lb_cs_i* )) ,
       14ba       (\csr40b_en* ,cr40b,~|(\lb_wr_i* ,\lb_cs_i* )) ,
       14ca       (\csr40c_en* ,cr40c,~|(\lb_wr_i* ,\lb_cs_i* )) ,
       14da       (\csr40d_en* ,cr40d,~|(\lb_wr_i* ,\lb_cs_i* )) , 14ab       (\csr44a_en* ,cr44a,~|(\lb_wr_i* ,\lb_cs_i* )) ,
       14bb       (\csr44b_en* ,cr44b,~|(\lb_wr_i* ,\lb_cs_i* )) ,
       14cb       (\csr44c_en* ,cr44c,~|(\lb_wr_i* ,\lb_cs_i* )) ,
       14db       (\csr44d_en* ,cr44d,~|(\lb_wr_i* ,\lb_cs_i* )) , 14a        (\csr384a_en* ,cr384a,~|(\lb_wr_i* ,\lb_cs_i* )) ,
       14b        (\csr384b_en* ,cr384b,~|(\lb_wr_i* ,\lb_cs_i* )) ,
       14c        (\csr384c_en* ,cr384c,~|(\lb_wr_i* ,\lb_cs_i* )) ,
       14d        (\csr384d_en* ,cr384d,~|(\lb_wr_i* ,\lb_cs_i* )) , 15a        (\csr388a_en* ,cr388a,~|(\lb_wr_i* ,\lb_cs_i* )) ,
       15b        (\csr388b_en* ,cr388b,~|(\lb_wr_i* ,\lb_cs_i* )) ,
       15c        (\csr388c_en* ,cr388c,~|(\lb_wr_i* ,\lb_cs_i* )) ,
       15d        (\csr388d_en* ,cr388d,~|(\lb_wr_i* ,\lb_cs_i* )) , 16a        (\csr512a_en* ,cr512a,~|(\lb_wr_i* ,\lb_cs_i* )) ,
       16b        (\csr512b_en* ,cr512b,~|(\lb_wr_i* ,\lb_cs_i* )) ,
       16c        (\csr512c_en* ,cr512c,~|(\lb_wr_i* ,\lb_cs_i* )) ,
       16d        (\csr512d_en* ,cr512d,~|(\lb_wr_i* ,\lb_cs_i* )) , 17a        (\csr516a_en* ,cr516a,~|(\lb_wr_i* ,\lb_cs_i* )) ,
       17b        (\csr516b_en* ,cr516b,~|(\lb_wr_i* ,\lb_cs_i* )) ,
       17c        (\csr516c_en* ,cr516c,~|(\lb_wr_i* ,\lb_cs_i* )) ,
       17d        (\csr516d_en* ,cr516d,~|(\lb_wr_i* ,\lb_cs_i* )) , 17aa       (\csr520a_en* ,cr520a,~|(\lb_wr_i* ,\lb_cs_i* )) ,
       17ba       (\csr520b_en* ,cr520b,~|(\lb_wr_i* ,\lb_cs_i* )) ,
       17ca       (\csr520c_en* ,cr520c,~|(\lb_wr_i* ,\lb_cs_i* )) ,
       17da       (\csr520d_en* ,cr520d,~|(\lb_wr_i* ,\lb_cs_i* )) , 18a        (\csr528a_en* ,cr528a,~|(\lb_wr_i* ,\lb_cs_i* )) ,
       18b        (\csr528b_en* ,cr528b,~|(\lb_wr_i* ,\lb_cs_i* )) ,
       18c        (\csr528c_en* ,cr528c,~|(\lb_wr_i* ,\lb_cs_i* )) ,
       18d        (\csr528d_en* ,cr528d,~|(\lb_wr_i* ,\lb_cs_i* )) , 19a        (\csr540a_en* ,cr540a,~|(\lb_wr_i* ,\lb_cs_i* )) ,
       19b        (\csr540b_en* ,cr540b,~|(\lb_wr_i* ,\lb_cs_i* )) ,
       19c        (\csr540c_en* ,cr540c,~|(\lb_wr_i* ,\lb_cs_i* )) ,
       19d        (\csr540d_en* ,cr540d,~|(\lb_wr_i* ,\lb_cs_i* )) , 100a       (\csr544a_en* ,cr544a,~|(\lb_wr_i* ,\lb_cs_i* )) ,
       100b       (\csr544b_en* ,cr544b,~|(\lb_wr_i* ,\lb_cs_i* )) ,
       100c       (\csr544c_en* ,cr544c,~|(\lb_wr_i* ,\lb_cs_i* )) ,
       100d       (\csr544d_en* ,cr544d,~|(\lb_wr_i* ,\lb_cs_i* )) , 110a       (\csr0a_oe* ,cr0a,~|(~\lb_wr_i* ,\lb_cs_i* )) ,
       110b       (\csr0b_oe* ,cr0b,~|(~\lb_wr_i* ,\lb_cs_i* )) ,
       110c       (\csr0c_oe* ,cr0c,~|(~\lb_wr_i* ,\lb_cs_i* )) ,
       110d       (\csr0d_oe* ,cr0d,~|(~\lb_wr_i* ,\lb_cs_i* )) , 111a       (\csr4a_oe* ,cr4a,~|(~\lb_wr_i* ,\lb_cs_i* )) ,
       111b       (\csr4b_oe* ,cr4b,~|(~\lb_wr_i* ,\lb_cs_i* )) ,
       111c       (\csr4c_oe* ,cr4c,~|(~\lb_wr_i* ,\lb_cs_i* )) ,
       111d       (\csr4d_oe* ,cr4d,~|(~\lb_wr_i* ,\lb_cs_i* )) , 111aa      (\csr12a_oe* ,cr12a,~|(~\lb_wr_i* ,\lb_cs_i* )) ,
       111ba      (\csr12b_oe* ,cr12b,~|(~\lb_wr_i* ,\lb_cs_i* )) ,
       111ca      (\csr12c_oe* ,cr12c,~|(~\lb_wr_i* ,\lb_cs_i* )) ,
       111da      (\csr12d_oe* ,cr12d,~|(~\lb_wr_i* ,\lb_cs_i* )) , 112a       (\csr28a_oe* ,cr28a,~|(~\lb_wr_i* ,\lb_cs_i* )) ,
       112b       (\csr28b_oe* ,cr28b,~|(~\lb_wr_i* ,\lb_cs_i* )) ,
       112c       (\csr28c_oe* ,cr28c,~|(~\lb_wr_i* ,\lb_cs_i* )) ,
       112d       (\csr28d_oe* ,cr28d,~|(~\lb_wr_i* ,\lb_cs_i* )) , 113aaa     (\air2a_oe* ,air2a,~|(~\lb_wr_i* ,\lb_cs_i* )) ,
       113aab     (\air2b_oe* ,air2b,~|(~\lb_wr_i* ,\lb_cs_i* )) ,
```

`//node_27ea0/cadence/tifb/dcc/b/hbc_csr.v`                                                                                      modified 03/30/92 5:02 PM

```
113aac   (\air2c_oe* ,air2c,~|{~\lb_wr_i* ,\lb_cs_i* }) ,
113aad   (\air2d_oe* ,air2d,~|{~\lb_wr_i* ,\lb_cs_i* }) , 113aba   (\air3a_oe* ,air3a,~|{~\lb_wr_i* ,\lb_cs_i* }) ,
113abb   (\air3b_oe* ,air3b,~|{~\lb_wr_i* ,\lb_cs_i* }) ,
113abc   (\air3c_oe* ,air3c,~|{~\lb_wr_i* ,\lb_cs_i* }) ,
113abd   (\air3d_oe* ,air3d,~|{~\lb_wr_i* ,\lb_cs_i* }) , 113a     (\air4a_oe* ,air4a,~|{~\lb_wr_i* ,\lb_cs_i* }) ,
113b     (\air4b_oe* ,air4b,~|{~\lb_wr_i* ,\lb_cs_i* }) ,
113c     (\air4c_oe* ,air4c,~|{~\lb_wr_i* ,\lb_cs_i* }) ,
113d     (\air4d_oe* ,air4d,~|{~\lb_wr_i* ,\lb_cs_i* }) , 113aa    (\air5a_oe* ,air5a,~|{~\lb_wr_i* ,\lb_cs_i* }) ,
113ba    (\air5b_oe* ,air5b,~|{~\lb_wr_i* ,\lb_cs_i* }) ,
113ca    (\air5c_oe* ,air5c,~|{~\lb_wr_i* ,\lb_cs_i* }) ,
113da    (\air5d_oe* ,air5d,~|{~\lb_wr_i* ,\lb_cs_i* }) , 113ab    (\air6a_oe* ,air6a,~|{~\lb_wr_i* ,\lb_cs_i* }) ,
113bb    (\air6b_oe* ,air6b,~|{~\lb_wr_i* ,\lb_cs_i* }) ,
113cb    (\air6c_oe* ,air6c,~|{~\lb_wr_i* ,\lb_cs_i* }) ,
113db    (\air6d_oe* ,air6d,~|{~\lb_wr_i* ,\lb_cs_i* }) , 113ac    (\air7a_oe* ,air7a,~|{~\lb_wr_i* ,\lb_cs_i* }) ,
113bc    (\air7b_oe* ,air7b,~|{~\lb_wr_i* ,\lb_cs_i* }) ,
113cc    (\air7c_oe* ,air7c,~|{~\lb_wr_i* ,\lb_cs_i* }) ,
113dc    (\air7d_oe* ,air7d,~|{~\lb_wr_i* ,\lb_cs_i* }) , 113ad    (\air8a_oe* ,air8a,~|{~\lb_wr_i* ,\lb_cs_i* }) ,
113bd    (\air8b_oe* ,air8b,~|{~\lb_wr_i* ,\lb_cs_i* }) ,
113cd    (\air8c_oe* ,air8c,~|{~\lb_wr_i* ,\lb_cs_i* }) ,
113dd    (\air8d_oe* ,air8d,~|{~\lb_wr_i* ,\lb_cs_i* }) , 113ae    (\air9a_oe* ,air9a,~|{~\lb_wr_i* ,\lb_cs_i* }) ,
113be    (\air9b_oe* ,air9b,~|{~\lb_wr_i* ,\lb_cs_i* }) ,
113ce    (\air9c_oe* ,air9c,~|{~\lb_wr_i* ,\lb_cs_i* }) ,
113de    (\air9d_oe* ,air9d,~|{~\lb_wr_i* ,\lb_cs_i* }) , 113af    (\air10a_oe* ,air10a,~|{~\lb_wr_i* ,\lb_cs_i* }) ,
113bf    (\air10b_oe* ,air10b,~|{~\lb_wr_i* ,\lb_cs_i* }) ,
113cf    (\air10c_oe* ,air10c,~|{~\lb_wr_i* ,\lb_cs_i* }) ,
113df    (\air10d_oe* ,air10d,~|{~\lb_wr_i* ,\lb_cs_i* }) , 114aa    (\csr40a_oe* ,cr40a,~|{~\lb_wr_i* ,\lb_cs_i* }) ,
114ba    (\csr40b_oe* ,cr40b,~|{~\lb_wr_i* ,\lb_cs_i* }) ,
114ca    (\csr40c_oe* ,cr40c,~|{~\lb_wr_i* ,\lb_cs_i* }) ,
114da    (\csr40d_oe* ,cr40d,~|{~\lb_wr_i* ,\lb_cs_i* }) , 114ab    (\csr44a_oe* ,cr44a,~|{~\lb_wr_i* ,\lb_cs_i* }) ,
114bb    (\csr44b_oe* ,cr44b,~|{~\lb_wr_i* ,\lb_cs_i* }) ,
114cb    (\csr44c_oe* ,cr44c,~|{~\lb_wr_i* ,\lb_cs_i* }) ,
114db    (\csr44d_oe* ,cr44d,~|{~\lb_wr_i* ,\lb_cs_i* }) , 114a     (\csr384a_oe* ,cr384a,~|{~\lb_wr_i* ,\lb_cs_i* }) ,
114b     (\csr384b_oe* ,cr384b,~|{~\lb_wr_i* ,\lb_cs_i* }) ,
114c     (\csr384c_oe* ,cr384c,~|{~\lb_wr_i* ,\lb_cs_i* }) ,
114d     (\csr384d_oe* ,cr384d,~|{~\lb_wr_i* ,\lb_cs_i* }) , 115a     (\csr388a_oe* ,cr388a,~|{~\lb_wr_i* ,\lb_cs_i* }) ,
115b     (\csr388b_oe* ,cr388b,~|{~\lb_wr_i* ,\lb_cs_i* }) ,
115c     (\csr388c_oe* ,cr388c,~|{~\lb_wr_i* ,\lb_cs_i* }) ,
115d     (\csr388d_oe* ,cr388d,~|{~\lb_wr_i* ,\lb_cs_i* }) , 116a     (\csr512a_oe* ,cr512a,~|{~\lb_wr_i* ,\lb_cs_i* }) ,
116b     (\csr512b_oe* ,cr512b,~|{~\lb_wr_i* ,\lb_cs_i* }) ,
116c     (\csr512c_oe* ,cr512c,~|{~\lb_wr_i* ,\lb_cs_i* }) ,
116d     (\csr512d_oe* ,cr512d,~|{~\lb_wr_i* ,\lb_cs_i* }) , 117a     (\csr516a_oe* ,cr516a,~|{~\lb_wr_i* ,\lb_cs_i* }) ,
117b     (\csr516b_oe* ,cr516b,~|{~\lb_wr_i* ,\lb_cs_i* }) ,
117c     (\csr516c_oe* ,cr516c,~|{~\lb_wr_i* ,\lb_cs_i* }) ,
117d     (\csr516d_oe* ,cr516d,~|{~\lb_wr_i* ,\lb_cs_i* }) , 117aa    (\csr520a_oe* ,cr520a,~|{~\lb_wr_i* ,\lb_cs_i* }) ,
117ba    (\csr520b_oe* ,cr520b,~|{~\lb_wr_i* ,\lb_cs_i* }) ,
117ca    (\csr520c_oe* ,cr520c,~|{~\lb_wr_i* ,\lb_cs_i* }) ,
117da    (\csr520d_oe* ,cr520d,~|{~\lb_wr_i* ,\lb_cs_i* }) , 117ab    (\csr528a_oe* ,cr528a,~|{~\lb_wr_i* ,\lb_cs_i* }) ,
117bb    (\csr528b_oe* ,cr528b,~|{~\lb_wr_i* ,\lb_cs_i* }) ,
117cb    (\csr528c_oe* ,cr528c,~|{~\lb_wr_i* ,\lb_cs_i* }) ,
```

`//node_27ea0/cadence/tifb/dcc/b/hba_csr.v`                                                    modified 03/30/92  5:02 PM

```
           117db    (\csr528d_oe* ,cr528d,~|{~\lb_wr_i* ,\lb_cs_i* }) , 118a     (\csr540a_oe* ,cr540a,~|{~\lb_wr_i* ,\lb_cs_i* }) ,
           118b     (\csr540b_oe* ,cr540b,~|{~\lb_wr_i* ,\lb_cs_i* }) ,
           118c     (\csr540c_oe* ,cr540c,~|{~\lb_wr_i* ,\lb_cs_i* }) ,
           118d     (\csr540d_oe* ,cr540d,~|{~\lb_wr_i* ,\lb_cs_i* }) , 119a     (\csr544a_oe* ,cr544a,~|{~\lb_wr_i* ,\lb_cs_i* }) ,
           119b     (\csr544b_oe* ,cr544b,~|{~\lb_wr_i* ,\lb_cs_i* }) ,
           119c     (\csr544c_oe* ,cr544c,~|{~\lb_wr_i* ,\lb_cs_i* }) ,
           119d     (\csr544d_oe* ,cr544d,~|{~\lb_wr_i* ,\lb_cs_i* }) , 120af    (\air11a_oe* ,air11a,~|{~\lb_wr_i* ,\lb_cs_i* }) ,
           120bf    (\air11b_oe* ,air11b,~|{~\lb_wr_i* ,\lb_cs_i* }) ,
           120cf    (\air11c_oe* ,air11c,~|{~\lb_wr_i* ,\lb_cs_i* }) ,
           120df    (\air11d_oe* ,air11d,~|{~\lb_wr_i* ,\lb_cs_i* }) , 121af    (\air12a_oe* ,air12a,~|{~\lb_wr_i* ,\lb_cs_i* }) ,
           121bf    (\air12b_oe* ,air12b,~|{~\lb_wr_i* ,\lb_cs_i* }) ,
           121cf    (\air12c_oe* ,air12c,~|{~\lb_wr_i* ,\lb_cs_i* }) ,
           121df    (\air12d_oe* ,air12d,~|{~\lb_wr_i* ,\lb_cs_i* }) , 122af    (\air13a_oe* ,air13a,~|{~\lb_wr_i* ,\lb_cs_i* }) ,
           122bf    (\air13b_oe* ,air13b,~|{~\lb_wr_i* ,\lb_cs_i* }) ,
           122cf    (\air13c_oe* ,air13c,~|{~\lb_wr_i* ,\lb_cs_i* }) ,
           122df    (\air13d_oe* ,air13d,~|{~\lb_wr_i* ,\lb_cs_i* }) ;

// *** Define tri-state drivers and controls for b_ld_i bus assign
               b_ld_o = (\csr0a_oe* == 0) ? state_a : 8'bz ,
               b_ld_o = (\csr0b_oe* == 0) ? state_b : 8'bz ,
               b_ld_o = (\csr0c_oe* == 0) ? state_c : 8'bz ,
               b_ld_o = (\csr0d_oe* == 0) ? state_d : 8'bz , b_ld_o = (\csr4a_oe* == 0) ? state_a : 8'bz ,
               b_ld_o = (\csr4b_oe* == 0) ? state_b : 8'bz ,
               b_ld_o = (\csr4c_oe* == 0) ? state_c : 8'bz ,
               b_ld_o = (\csr4d_oe* == 0) ? state_d : 8'bz , b_ld_o = (\csr12a_oe* == 0) ? 8'b0 : 8'bz ,
               b_ld_o = (\csr12b_oe* == 0) ? 8'b0 : 8'bz ,
               b_ld_o = (\csr12c_oe* == 0) ? 8'b0 : 8'bz ,
               b_ld_o = (\csr12d_oe* == 0) ? {7'b0,csr12d} : 8'bz , b_ld_o = (\csr28a_oe* == 0) ? {2'b0,csr28a} : 8'bz ,
               b_ld_o = (\csr28b_oe* == 0) ? 8'b0 : 8'bz ,
               b_ld_o = (\csr28c_oe* == 0) ? 8'b0 : 8'bz ,
               b_ld_o = (\csr28d_oe* == 0) ? 8'b0 : 8'bz , b_ld_o = (\csr40a_oe* == 0) ? csr40a : 8'bz ,
               b_ld_o = (\csr40b_oe* == 0) ? csr40b : 8'bz ,
               b_ld_o = (\csr40c_oe* == 0) ? csr40c : 8'bz ,
               b_ld_o = (\csr40d_oe* == 0) ? csr40d : 8'bz , b_ld_o = (\csr44a_oe* == 0) ? csr44a : 8'bz ,
               b_ld_o = (\csr44b_oe* == 0) ? csr44b : 8'bz ,
               b_ld_o = (\csr44c_oe* == 0) ? csr44c : 8'bz ,
               b_ld_o = (\csr44d_oe* == 0) ? csr44d : 8'bz , b_ld_o = (\air2a_oe* == 0) ? {4'b0,cr_air2a[3:0]} : 8'bz ,
               b_ld_o = (\air2b_oe* == 0) ? 8'b0 : 8'bz ,
               b_ld_o = (\air2c_oe* == 0) ? 8'b0 : 8'bz ,
               b_ld_o = (\air2d_oe* == 0) ? 8'b0 : 8'bz , b_ld_o = (\air3a_oe* == 0) ? air3[7:0]   : 8'bz ,
               b_ld_o = (\air3b_oe* == 0) ? air3[15:8]  : 8'bz ,
               b_ld_o = (\air3c_oe* == 0) ? air3[23:16] : 8'bz ,
               b_ld_o = (\air3d_oe* == 0) ? air3[31:24] : 8'bz , b_ld_o = (\air4a_oe* == 0) ? {1'b0,cr_air4a[6:0]} : 8'bz ,
               b_ld_o = (\air4b_oe* == 0) ? 8'b0 : 8'bz ,
               b_ld_o = (\air4c_oe* == 0) ? 8'b0 : 8'bz ,
               b_ld_o = (\air4d_oe* == 0) ? 8'b0 : 8'bz , b_ld_o = (\csr384a_oe* == 0) ? csr384a : 8'bz ,
               b_ld_o = (\csr384b_oe* == 0) ? csr384b : 8'bz ,
               b_ld_o = (\csr384c_oe* == 0) ? csr384c : 8'bz ,
               b_ld_o = (\csr384d_oe* == 0) ? csr384d : 8'bz , b_ld_o = (\csr388a_oe* == 0) ? 8'b0 : 8'bz ,
```

```
//node_27ea0/cadence/tifb/dcc/b/hbc_csr.v                                          modified 03/30/92 5:02 PM b_ld_o = (\csr388b_oe* == 0) ? 8'b0 : 8'bz ,
            b_ld_o = (\csr388c_oe* == 0) ? csr388c : 8'bz ,
            b_ld_o = (\csr388d_oe* == 0) ? csr388d : 8'bz , b_ld_o = (\csr512a_oe* == 0) ? csr512a : 8'bz ,
            b_ld_o = (\csr512b_oe* == 0) ? csr512b : 8'bz ,
            b_ld_o = (\csr512c_oe* == 0) ? csr512c : 8'bz ,
            b_ld_o = (\csr512d_oe* == 0) ? csr512d : 8'bz , b_ld_o = (\csr516a_oe* == 0) ? csr516a : 8'bz ,
            b_ld_o = (\csr516b_oe* == 0) ? csr516b : 8'bz ,
            b_ld_o = (\csr516c_oe* == 0) ? csr516c : 8'bz ,
            b_ld_o = (\csr516d_oe* == 0) ? csr516d : 8'bz , b_ld_o = (\csr520a_oe* == 0) ? 8'b0 : 8'bz ,
            b_ld_o = (\csr520b_oe* == 0) ? 8'b0 : 8'bz ,
            b_ld_o = (\csr520c_oe* == 0) ? 8'b0 : 8'bz ,
            b_ld_o = (\csr520d_oe* == 0) ? {2'b0,csr520d[5:0]} : 8'bz , b_ld_o = (\csr528a_oe* == 0) ? 8'b0 : 8'bz ,
            b_ld_o = (\csr528b_oe* == 0) ? {4'b0,csr528b} : 8'bz ,
            b_ld_o = (\csr528c_oe* == 0) ? 8'b0 : 8'bz ,
            b_ld_o = (\csr528d_oe* == 0) ? 8'b0 : 8'bz , b_ld_o = (\csr540a_oe* == 0) ? csr540a : 8'bz ,
            b_ld_o = (\csr540b_oe* == 0) ? csr540b : 8'bz ,
            b_ld_o = (\csr540c_oe* == 0) ? csr540c : 8'bz ,
            b_ld_o = (\csr540d_oe* == 0) ? csr540d : 8'bz , b_ld_o = (\csr544a_oe* == 0) ? {4'b0,csr544a} : 8'bz ,
            b_ld_o = (\csr544b_oe* == 0) ? csr544b : 8'bz ,
            b_ld_o = (\csr544c_oe* == 0) ? {csr544c,7'b0} : 8'bz ,
            b_ld_o = (\csr544d_oe* == 0) ? 8'b0 : 8'bz , b_ld_o = (\air5a_oe* == 0) ? 8'b0 : 8'bz ,
            b_ld_o = (\air5b_oe* == 0) ? 8'b0 : 8'bz ,
            b_ld_o = (\air5c_oe* == 0) ? {6'b0,status_c,1'b0} : 8'bz ,
            b_ld_o = (\air5d_oe* == 0) ? status : 8'bz , b_ld_o = (\air7a_oe* == 0) ? csr384a : 8'bz ,
            b_ld_o = (\air7b_oe* == 0) ? csr384b : 8'bz ,
            b_ld_o = (\air7c_oe* == 0) ? csr388d : 8'bz ,
            b_ld_o = (\air7d_oe* == 0) ? 8'b0 : 8'bz , b_ld_o = (\air8a_oe* == 0) ? cr_air8a : 8'bz ,
            b_ld_o = (\air8b_oe* == 0) ? cr_air8b : 8'bz ,
            b_ld_o = (\air8c_oe* == 0) ? cr_air8c : 8'bz ,
            b_ld_o = (\air8d_oe* == 0) ? 8'b0 : 8'bz , b_ld_o = (\air9a_oe* == 0) ? 8'b0 : 8'bz ,
            b_ld_o = (\air9b_oe* == 0) ? 8'b0 : 8'bz ,
            b_ld_o = (\air9c_oe* == 0) ? 8'b0 : 8'bz ,
            b_ld_o = (\air9d_oe* == 0) ? {3'b0,cr_air9d} : 8'bz , b_ld_o = (\air10a_oe* == 0) ? 8'b0 : 8'bz ,
            b_ld_o = (\air10b_oe* == 0) ? 8'b0 : 8'bz ,
            b_ld_o = (\air10c_oe* == 0) ? 8'b0 : 8'bz ,
            b_ld_o = (\air10d_oe* == 0) ? {5'b0,cr_air10d[2:0]} : 8'bz , b_ld_o = (\air11a_oe* == 0) ? tr_tmr[7:0] : 8'bz ,
            b_ld_o = (\air11b_oe* == 0) ? {2'b0, tr_tmr[13:8]} : 8'bz ,
            b_ld_o = (\air11c_oe* == 0) ? {2'b0,st_reg_h} : 8'bz ,
            b_ld_o = (\air11d_oe* == 0) ? {extra_oe,2'b0,st_reg_f} : 8'bz , b_ld_o = (\air12a_oe* == 0) ? bsy_dly_tmr[7:0] : 8'bz ,
            b_ld_o = (\air12b_oe* == 0) ? bsy_dly_tmr[15:8] : 8'bz ,
            b_ld_o = (\air12c_oe* == 0) ? {3'b0, bsy_dly_tmr[20:16]} : 8'bz ,
            b_ld_o = (\air12d_oe* == 0) ? 8'b0 : 8'bz , b_ld_o = (\air13a_oe* == 0) ? spl_tmr[7:0] : 8'bz ,
            b_ld_o = (\air13b_oe* == 0) ? spl_tmr[15:8] : 8'bz ,
            b_ld_o = (\air13c_oe* == 0) ? {1'b0, spl_tmr[22:16]} : 8'bz ,
            b_ld_o = (\air13d_oe* == 0) ? 8'b0 : 8'bz , // * Define csr parity generator ld_par_o = ~^(b_ld_o) , // * Define hbus data parity error berr = hbpar_err ,
```

```
//node_27ea0/cadence/tifb/dcc/b/hbc_csr.v                              modified 03/30/92 5:02 PM // *** Define split response timeout indication \spl_tmr_disable* = |(csr28a) ,
            splt_tmout = &(\spl_tmr_disable* ,
                           &(|(~csr28a[0],
                                &(csr28a[0],spl_tmr[17],spl_tmr[14])),
                             |(~csr28a[1],
                                &(csr28a[1],spl_tmr[18],spl_tmr[15])),
                             |(~csr28a[2],
                                &(csr28a[2],spl_tmr[19],spl_tmr[16])),
                             |(~csr28a[3],
                                &(csr28a[3],spl_tmr[20],spl_tmr[17])),
                             |(~csr28a[4],
                                &(csr28a[4],spl_tmr[21],spl_tmr[18])),
                             |(~csr28a[5],
                                &(csr28a[5],spl_tmr[22],spl_tmr[19])))) , // *** Define transaction timeout indication \tran_tmr_disable* = |(csr528b) , tran_tmout = &(\tran_tmr_disable* ,
                           &(|(~csr528b[0],
                                &(csr528b[0],tr_tmr[10],tr_tmr[7],tr_tmr[6])),
                             |(~csr528b[1],
                                &(csr528b[1],tr_tmr[11],tr_tmr[8],tr_tmr[7])),
                             |(~csr528b[2],
                                &(csr528b[2],tr_tmr[12],tr_tmr[9],tr_tmr[8])),
                             |(~csr528b[3],
                                &(csr528b[3],tr_tmr[13],tr_tmr[10],tr_tmr[9])))), \fbc_err* = ~tran_tmout , // *** Define busy retry delay time indication \bsy_dly_disable* = |(csr544a,csr544b,csr544c) , bsy_tmout = |(~\bsy_dly_disable* ,
                          &(|(~csr544c,
                               &(csr544c,bsy_dly_tmr[8],bsy_dly_tmr[5],
                                 bsy_dly_tmr[4])),
                            |(~csr544b[0],
                               &(csr544b[0],bsy_dly_tmr[9],bsy_dly_tmr[6],
                                 bsy_dly_tmr[5])),
                            |(~csr544b[1],
                               &(csr544b[1],bsy_dly_tmr[10],bsy_dly_tmr[7],
                                 bsy_dly_tmr[6])),
                            |(~csr544b[2],
                               &(csr544b[2],bsy_dly_tmr[11],bsy_dly_tmr[8],
                                 bsy_dly_tmr[7])),
                            |(~csr544b[3],
                               &(csr544b[3],bsy_dly_tmr[12],bsy_dly_tmr[9],
                                 bsy_dly_tmr[8])),
                            |(~csr544b[4],
                               &(csr544b[4],bsy_dly_tmr[13],bsy_dly_tmr[10],
                                 bsy_dly_tmr[9])),
                            |(~csr544b[5],
                               &(csr544b[5],bsy_dly_tmr[14],bsy_dly_tmr[11],
                                 bsy_dly_tmr[10])),
                            |(~csr544b[6],
                               &(csr544b[6],bsy_dly_tmr[15],bsy_dly_tmr[12],
                                 bsy_dly_tmr[11])),
                            |(~csr544b[7],
                               &(csr544b[7],bsy_dly_tmr[16],bsy_dly_tmr[13],
                                 bsy_dly_tmr[12])),
                            |(~csr544a[0],
                               &(csr544a[0],bsy_dly_tmr[17],bsy_dly_tmr[14],
                                 bsy_dly_tmr[13])),
                            |(~csr544a[1],
                               &(csr544a[1],bsy_dly_tmr[18],bsy_dly_tmr[15],
                                 bsy_dly_tmr[14])),
                            |(~csr544a[2],
                               &(csr544a[2],bsy_dly_tmr[19],bsy_dly_tmr[16],
                                 bsy_dly_tmr[15])),
                            |(~csr544a[3],
                               &(csr544a[3],bsy_dly_tmr[20],bsy_dly_tmr[17],
                                 bsy_dly_tmr[16])))), // *** Define busy_rtry threshold exceeded error bsy_rtry_err = ((csr540a,csr540b) == (csr540c,csr540d)) ,
```

//node_27ea0/cadence/tifb/dcc/b/hbc_csr.v                                      modified  03/30/92  5:02 PM

```
// *** Define incrementor inputs for timeout counters tr_tmr_in = tr_tmr + 1'b1 ,
        spl_tmr_in = spl_tmr + 1'b1 ,
        bsy_tmr_in = bsy_dly_tmr + 1'b1 ,
        rtry_cnt = {csr540c,csr540d} + 1'b1 ,
        tr_tmr_in2[7:0]   = (~\air11a_en* ) ? b_ld_i[7:0] : tr_tmr_in[7:0] ,
        tr_tmr_in2[13:8]  = (~\air11b_en* ) ? b_ld_i[5:0] : tr_tmr_in[13:8] ,
        spl_tmr_in2[7:0]  = (~\air13a_en* ) ? b_ld_i[7:0] : spl_tmr_in[7:0] ,
        spl_tmr_in2[15:8] = (~\air13b_en* ) ? b_ld_i[7:0] : spl_tmr_in[15:8] ,
        spl_tmr_in2[22:16]= (~\air13c_en* ) ? b_ld_i[6:0] : spl_tmr_in[22:16] ,
        bsy_tmr_in2[7:0]  = (~\air12a_en* ) ? b_ld_i[7:0] : bsy_tmr_in[7:0] ,
        bsy_tmr_in2[15:8] = (~\air12b_en* ) ? b_ld_i[7:0] : bsy_tmr_in[15:8] ,
        bsy_tmr_in2[20:16]= (~\air12c_en* ) ? b_ld_i[4:0] : bsy_tmr_in[20:16] , // *** Define logical common control bits //      pktsiz_en indicates packet length that the module can use
//      when becoming a fbus master.
//      NOTE: packet lengths of 64 and 32 will never be used since
//      hbus can only perform 64 byte transfers pktsiz_en = {csr512c[1:0],csr512d[7:6]} , // *** Define logical module control bits pkt_cap = csr516c[0] ,
        fdata_wd = {1'b0,&{csr516a[3],csr516b[7]}} ,
        faddr64_cap = csr516d[7] , par_rpt_en = csr516d[2] ,
        fbmstr_en = csr516d[0] , // *** Define hbc configuration bits wb_cache = cr_air4a[0] ,
        slw_brst = cr_air4a[1] ,
        ln_siz = cr_air4a[3:2] ,
        hdata64_cap = cr_air4a[5] ,
        tst_cap = cr_air4a[6] , // *** Define arbitration error encodings arbit_err = &{~arb_err_i[1],arb_err_i[0]} ,
        arbit_cmp_err = &{arb_err_i[1],~arb_err_i[0]} ,
        arbit_tmrout_err = &{arb_err_i[1],arb_err_i[0]} , // *** Define dpc parity error encodings
//      dpc_err -> 00  no error
//                 01  b_ad parity error
//                 10  packet longitudinal parity error
//                 11  hbus parity error adpar_err = &{~dpc_err_i[1],dpc_err_i[0],~st_i[3]} ,
        packlen_err = &{dpc_err_i[1],~dpc_err_i[0]} ,
        hbpar_err = &{dpc_err_i[1],dpc_err_i[0]} , // * Define reset_start output to reset block st_reset = csr12d , // * Define lock command extension lk_ext = cr_air10d[2:0] , // *** Define hbc status bits //      * state register written
             state_status = ~\csr4a_en* , //      * lock command received
             lock_status = ~|{\lk_o* ,\hbgrant_i* } , //      * mailbox message received
             mess_status = ~\hbgrant_i* & sys_mess_d , //      * test start register written
             tststrt_status = ~\csr40a_en* , //      * split response indication
```

//node_27ea0/cadence/tifb/dcc/b/hbc_csr.v                                            modified 03/30/92 5:02 PM

```verilog
            spl_rsp = &{split_resp_d,pd_split} ,
// *** Define interrupts intrp = {cr_air8a,cr_air8b,cr_air8c} &
                {csr384a[2:0],csr384b[7:3],csr388d[7:0],
                 status[7:0]} , \int* = ~|(intrp) , // *** Define glitch filter encoding filtr_sel = {~cr_air4a[4],filt_enc(csr520d[5:0])} , \csr_chip_oe* = |({\lb_oe_1* ,&( |{~extra_oe,
                &{\csr0a_oe* ,\csr0b_oe* ,\csr0c_oe* ,\csr0d_oe* ,
                  \csr4a_oe* ,\csr4b_oe* ,\csr4c_oe* ,\csr4d_oe* ,
                  \csr12a_oe* ,\csr12b_oe* ,\csr12c_oe* ,\csr12d_oe* ,
                  \csr28a_oe* ,\csr28b_oe* ,\csr28c_oe* ,\csr28d_oe* ,
                  \csr40a_oe* ,\csr40b_oe* ,\csr40c_oe* ,\csr40d_oe* ,
                  \csr44a_oe* ,\csr44b_oe* ,\csr44c_oe* ,\csr44d_oe* ,
                  \csr384a_oe* ,\csr384b_oe* ,\csr384c_oe* ,\csr384d_oe* ,
                  \csr388a_oe* ,\csr388b_oe* ,\csr388c_oe* ,\csr388d_oe* ,
                  \csr512a_oe* ,\csr512b_oe* ,\csr512c_oe* ,\csr512d_oe* ,
                  \csr516a_oe* ,\csr516b_oe* ,\csr516c_oe* ,\csr516d_oe* ,
                  \csr520a_oe* ,\csr520b_oe* ,\csr520c_oe* ,\csr520d_oe* ,
                  \csr528a_oe* ,\csr528b_oe* ,\csr528c_oe* ,\csr528d_oe* ,
                  \csr540a_oe* ,\csr540b_oe* ,\csr540c_oe* ,\csr540d_oe* ,
                  \csr544a_oe* ,\csr544b_oe* ,\csr544c_oe* ,\csr544d_oe* }), \air2a_oe* ,\air2b_oe* ,\air2c_oe* ,\air2d_oe* ,
                  \air3a_oe* ,\air3b_oe* ,\air3c_oe* ,\air3d_oe* ,
                  \air4a_oe* ,\air4b_oe* ,\air4c_oe* ,\air4d_oe* ,
                  \air5a_oe* ,\air5b_oe* ,\air5c_oe* ,\air5d_oe* ,
                  \air6a_oe* ,\air6b_oe* ,\air6c_oe* ,\air6d_oe* ,
                  \air7a_oe* ,\air7b_oe* ,\air7c_oe* ,\air7d_oe* ,
                  \air8a_oe* ,\air8b_oe* ,\air8c_oe* ,\air8d_oe* ,
                  \air9a_oe* ,\air9b_oe* ,\air9c_oe* ,\air9d_oe* ,
                  \air10a_oe* ,\air10b_oe* ,\air10c_oe* ,\air10d_oe* ,
                  \air11a_oe* ,\air11b_oe* ,\air11c_oe* ,\air11d_oe* ,
                  \air12a_oe* ,\air12b_oe* ,\air12c_oe* ,\air12d_oe* ,
                  \air13a_oe* ,\air13b_oe* ,\air13c_oe* ,\air13d_oe* });

//**********************************************************************
// Procedural Assignments
//**********************************************************************

// Not applicable

//**********************************************************************
// Task and Function Definitions
//********************************************************************** function error_in ;
    input   error ,error_out, \wr_en* ,\air_en* ,
            b_ld_i ;

begin
        casez ({\wr_en* ,\air_en* })
            2'b11 :  error_in = |(error ,error_out) ;
            2'b00,
            2'b01 :  error_in = &{~b_ld_i,error_out} ;
            2'b10 :  error_in = b_ld_i ;
            default  error_in = |(error,error_out) ;
        endcase
    end
endfunction function [2:0] error_in3 ;
    input [2:0] error ,error_out,b_ld_i ;
    input       \wr_en* ;

begin
        casez (\wr_en* )
            1'b1 :  error_in3 = error | error_out ;
            1'b0 :  error_in3 = ~b_ld_i & error_out ;
            default  error_in3 = 3'b0 ;
```

//node_27ea0/cadence/tifb/dcc/b/hbo_csr.v                                           modified 03/30/92 5:02 PM

```verilog
                endcase
            end
endfunction function [7:0] error_in8 ;
        input [7:0] error ,error_out,b_ld_i ;
        input  \wr_en* ;

begin
            casez (\wr_en* )
                1'b1 : error_in8= error | error_out ;
                1'b0 : error_in8= ~b_ld_i & error_out ;
                default error_in8= 8'b0 ;
            endcase
        end
endfunction function state_in ;
        input b_ld_i ,state ,err_sum, \csr0_en* ,\csr4_en* ;

begin
            casez ({\csr0_en* ,\csr4_en* })

2'b01 : state_in = &{~b_ld_i,state} ;
                2'b10 : state_in = |{b_ld_i,state} ;
                2'b11 : state_in = |{state,err_sum} ; //hold status value until
                default state_in = |{state,err_sum} ; //clear
            endcase
        end
endfunction function [1:0] filt_enc ;
        input [5:0] csr520 ;

begin
            casez (csr520)
                6'h3f : filt_enc = 2'b11 ;
                6'h2f : filt_enc = 2'b10 ;
                6'h1f : filt_enc = 2'b01 ;
                6'h0f : filt_enc = 2'b00 ;
                default filt_enc = 2'b11 ;
            endcase
        end
endfunction function [4:0] iva ;
        input [23:0] intrp ;

begin
            casez (intrp)

24'b????????_????????_???????1 : iva = 5'h01 ;
                24'b????????_????????_??????10 : iva = 5'h02 ;
                24'b????????_????????_?????100 : iva = 5'h03 ;
                24'b????????_????????_????1000 : iva = 5'h04 ;
                24'b????????_????????_???10000 : iva = 5'h05 ;
                24'b????????_????????_??100000 : iva = 5'h06 ;
                24'b????????_????????_?1000000 : iva = 5'h07 ;
                24'b????????_????????_10000000 : iva = 5'h08 ;
                24'b????????_???????1_00000000 : iva = 5'h09 ;
                24'b????????_??????10_00000000 : iva = 5'h0a ;
                24'b????????_?????100_00000000 : iva = 5'h0b ;
                24'b????????_????1000_00000000 : iva = 5'h0c ;
                24'b????????_???10000_00000000 : iva = 5'h0d ;
                24'b????????_??100000_00000000 : iva = 5'h0e ;
                24'b????????_?1000000_00000000 : iva = 5'h0f ;
                24'b????????_10000000_00000000 : iva = 5'h10 ;
                24'b???????1_00000000_00000000 : iva = 5'h11 ;
                24'b??????10_00000000_00000000 : iva = 5'h12 ;
                24'b?????100_00000000_00000000 : iva = 5'h13 ;
                24'b????1000_00000000_00000000 : iva = 5'h14 ;
                24'b???10000_00000000_00000000 : iva = 5'h15 ;
                24'b??100000_00000000_00000000 : iva = 5'h16 ;
                24'b?1000000_00000000_00000000 : iva = 5'h17 ;
                24'b10000000_00000000_00000000 : iva = 5'h18 ;
                default iva = 5'h00 ;
            endcase
        end
endfunction `endprotect
```

```
//node_27ea0/cadence/t1fb/dcc/b/bbq_cer.v                                          modified  03/30/92  5:02 PM
//****************************************************************************
// End of Model
//****************************************************************************
endmodule
```

```
//node_27ea0/cadence/tifb/dcc/b/hb_ctl.v                                    modified 09/02/92 11:11 AM //*********************************************************************************
//
//      Model Name       : hb_ctl.v
//      Revision         : $Revision: 2.36 $
//      Date             : $Date: 92/09/02 12:23:15 $
//      Author           : Bill Saperstein
//      Description      : hbc sequencer including tr_mode
//                         encoder and burst counter
//
//*********************************************************************************

//*********************************************************************************
// Module Definition
//*********************************************************************************
`protect module hb_ctl
        (
        // Inputs
                st_i ,          // fbus input status
                f_write ,       // fbus write command
                cap ,           // fbus input capability mast_sl,        // fbus master with selected slave
                mast_bs,        // fbus master was busied by slave
                phase_i ,       // fbus transaction phase (from fbc)
                \fbc_err* ,     // fbus time-out error gr_i ,          // fbus grant acknowledge
                \prempt_i* ,    // fbus premption of fbus master fadec_i ,       // fbus address compare encoding
                hadec_i ,       // hbus address compare encoding \data_av_i* ,   // data available in fifo
                \sp_av_i* ,     // space available in fifo \selected_i* ,  // module selected for fbus trans.

\cpyrq_i* ,     // store cache copyback request
                \cfull_i* ,     // store cache full \hbg_i* ,       // hbus grant
                \ignore_i* ,    // hbc chip select \request* ,     // pre-fetch request
                \pref_end* ,    // pre-fetch counter compare output
                \tran_end* ,    // fbus mastered trans. complete \gbl* ,         // hbus cache coherent indication
                \coherent* ,    // coherent hbus transaction indication
                wr_inv_l ,      // write_invalid indicator when fbus slave
                h_mode_o ,      // hbus transaction encoding
                hb_read ,       // direction of hbus transaction berr ,          // hbus data parity error
                cmd_perr ,      // fbus command parity error
                cmd_proterr ,   // fbus protocol error splt_cmd ,      // split response
                unrstrd ,       // unrestricted fbus transfer
                restart ,       // end-of-data restart indication
                mem_addr ,      // hbus master mode hadec decode
                \dma* ,         // the signal for dma mode
                \dma_l* ,       // the signal for dma mode hb_dlen ,       // data length hbus transaction
                \w64* ,         // 64 bit data request as hbus slave
                \hb_brst* ,     // hbus burst request
                hdata64_cap ,   // 64 bit hbus data capable
                slw_brst ,      // slow hbus burst protocol enable
                wb_cache ,      // write-back cache
                fbmstr_en ,     // fbus master enable
                splt_tmout ,    // fbus split time out
                bsy_tmout ,     // fbus busy time out
                \lock* ,        // indivisible cycle indication
                                //      latched input
                \lk_o* ,        // indivisible cycle indication
                                //      output to hbus clock_i ,       // hbus clock
                \reset* ,       // hbc chip reset
```

//node_27ea0/cadence/tifb/dcc/b/hb_ctl.v                                    modified 09/02/92 11:11 AM

```verilog
        // Bi-directional Inputs

\has_i* ,       // hbus address strobe
                \hds_i* ,       // hbus data strobe
                \hip_i* ,       // hbus transaction in progress
                \dsack_i* ,     // hbus data strobe acknowledge
                \bstrdy_i* ,    // hbus burst ready \snack_i* ,     // snoop acknowledge \share_i* ,     // share/private* cache attribute \bstat_i* ,     // hbus status lines \hbgack_i* ,    // hbus bus grant acknowledge
        // Outputs
                tr_mode_o ,     // fbus mode encoding to fbc rq_o ,          // fbus request
                fbc_gr_o ,      //fbus grant to fbc
                \bstat_en* ,    // bstat output enable \fifo_rst_o* ,  // fifo and lb_ptr pointer reset
                \fb_grant_o* ,  // fbus granted to module
                \new_addr_o* ,  // select inc_addr for addreg
                \sel_en* ,      // selected_o one cycle pulse \h_strb_o* ,    // hbus transaction strobe \hbr_o* ,       // hbus request
                grnt2 ,         // synchronized gr_i
                cmd_enc ,       // copyback transaction indication
                \tran_en* ,     // transaction latch enable
                \brst_inc* ,    // pre-fetch cntr. increment enable
                brstcnt_dec ,   // burst counter decrement enable
                dec_sel ,       // decrement selector for burst cntr
                \brst_clr* ,    // fbus slave transaction cntr. clear \hbc_err* ,     // hbc parity or protocol error
                pd_split ,      // pending split indication
                \bsy_rtry_dly_en* ,  // busy retry count enable
                \bsy_rtry_dly_clr* ,// busy retry count clear
                \bsy_rtry_cnt_en* , // busy retry count enable
                \bsy_rtry_cnt_clr* ,// busy retry count clear
                st_reg ,        // hbc state machine output to csr
        // Bi-directional Outputs \has_o* ,       // hbus address strobe
                \hds_o* ,       // hbus data strobe
                \hip_o* ,       // hbus transaction in progress
                \dsack_o* ,     // hbus data strobe acknowledge
                \bstrdy_o* ,    // hbus burst ready \snack_o* ,     // snoop acknowledge \share_o* ,     // share/private* cache attribute \bstat_o* ,     // htbus status lines \hbgack_o*      // hbus bus grant acknowledge
                ) ;

//*********************************************************************
// Define Parameters (optional)
//*********************************************************************

// Not Applicable

//*********************************************************************
// Port Declarations
//********************************************************************* input   \fbc_err* ,gr_i ,\prempt_i* ,
                \data_av_i* ,\sp_av_i* , f_write,
                \selected_i* ,\cpyrq_i* ,\cfull_i* ,
                clock_i ,\reset* ,\hbg_i* ,\ignore_i* ,
                \has_i* ,\hds_i* ,\hip_i* ,\bstrdy_i* ,
```

//node_27ea0/cadence/t1fb/dcc/b/hb_ctl.v                               modified 09/02/92 11:11 AM.

```verilog
            \lock* ,\lk_o* ,\snack_i* ,mast_sl,mast_bs,
            \share_i* ,\hbgack_i* , \dma* ,\dma_l* ,
            \request* ,\pref_end* ,\tran_end* ,
            \gbl* ,\coherent* ,wr_inv_l ,\w64* ,
            hb_read,\hb_brst* ,hdata64_cap ,unrstrd , splt_cmd ,
            berr ,cmd_perr ,cmd_proterr ,mem_addr,
            restart, slw_brst, wb_cache ,fbmstr_en,splt_tmout,
            bsy_tmout;

input  [1:0]    phase_i ,\dsack_i* ,
                    \bstat_i* ,hb_dlen ;

input  [2:0]    h_mode_o ,cap ;

input  [3:0]    fadec_i ,hadec_i ;

input  [7:0]    st_i ;

output          \fifo_rst_o* , \fb_grant_o* ,\new_addr_o* ,
                    \hbr_o* ,\has_o* ,\hds_o* ,
                    \hip_o* ,\bstrdy_o* , \sel_en* ,
                    \snack_o* ,\share_o*   , grnt2,
                    \hbc_err* , fbc_gr_o,pd_split,
                    \hbgack_o* ,\h_strb_o* ,dec_sel ,\brst_inc* ,
                    \brst_clr* ,brstcnt_dec ,\tran_en* ,
                    \bsy_rtry_dly_en* , \bsy_rtry_dly_clr* ,
                    \bsy_rtry_cnt_en* , \bsy_rtry_cnt_clr* ,\bstat_en* ;

output [1:0]    \dsack_o* ,\bstat_o* ,rq_o ;

output [2:0]    tr_mode_o ,cmd_enc ;

output [5:0]    st_reg ;

//****************************************************************************
// Net Assignments and Declarations
//****************************************************************************

// *** Define internal wire nets wire
            tran_strt ,fbreql,copyback ,\dsack_kill* ,
            \brst_end* ,hbc_idle ,tran_flg,wait_cnt ,
            \snoop_hit* ,\snoop_miss* ,\sel_en* ,grant ,
            hberr,h_retry,hbus_err, \hip_l* ,
            \data_av_l* ,\sp_av_l* ;

wire [1:0]
            dsac,phase_l,phase_d, \dsack_l* ;

wire [1:0] \dsack_d* ,\bstat_d* , \bstat_l* ;

wire [3:0]
            hadec_in ;

wire [4:0]
            dat_decr, data_cnt, data_rmd ;

wire [5:0]
            st_reg ;

wire [1:0] \bstat_int* ;

// *** Define internal registers for state machine reg
            \fb_gnt_en* ,\new_addr_en* ,
            \fifo_reset* ,\dsack_en* ,\hbgack_en* ,
            \cyc_dec* ,\has_en* ,fb_busy ,
            \pd_split_en* , \pd_split_clr* ,
            \rtry_en* ,\spl_resp_en* ,\busy_rtry_en* ,
            \brst_inc* ,\h_strb_o* ,\hip_en* ,\hbreq_en* ,
            \ds_en* ,dec_sel ,brstcnt_dec, \brst_clr* ,
            fbtmo_err ,\wait_en* , \wait_clr* ,has_msk,
            \bsy_rtry_dly_clr* , \bsy_rtry_cnt_en* ,
            \bsy_rtry_cnt_clr* ,\request_en* ,
            boff_flg ;

reg     \dma_dat_lo* ;
```

-61-

```
//node_27aa0/cadence/tifb/dcc/b/hb_ctl.v                          modified 09/02/92 11:11 AM reg [2:0] cmd_enc ;

reg [5:0]
                nx_st ;

reg asyn_end ; // indicate finish whole transaction in asyn. mode
   wire #1 \dsack_en_d* = \dsack_en* ;
   wire #1 \ds_en_d* = \ds_en* ;

wire st_d;
   wire #1 st_d2 = st_d;
// *** Define register/latch elements

//      * transaction attribute latches lch_rs #(1)
               rel_gr (1'b1,gr_rel,fb_req,1'b1,|{~fb_req_del,gr_i}) ;
assign  #1 fb_req_del = fb_req;

lch_rs #(1)
              syncro (1'b1 ,\sync* ,\has_i* ,1'b1,\tran_en* ) , sync_st_l ( st_i[1], st_ll, &{\reset* , ~&{(phase_i == 2'b00 ), st_d}},
                        1'b1, (phase_i != 2'b11) ), //      * new_addr set/reset latch
              nad_rs  (1'b1,nw_addr_set,&{\reset* ,
                        ~&{nw_addr_l, ~phase_i[1] },
                        1'b1,~&{st_d2, fbc_gr, ~phase_i[0] } ) , trflg   (~\share_i* ,tran_flg,1'b1,~stm_idle,
                        \snack_i* ) , snp     (\coherent* ,\snoop* ,1'b1,~stm_idle,
                        \snack_i* ) , snphit  (&{\bstrdy_i* ,(\bstat_i* != 2'b00)},\snoop_hit* ,1'b1,
                        ~stm_idle,\snack_i* ) , //      * dsack_kill and ds_strb* set/reset latches
//              when hbus read ds asserted when sp_av
//              when hbus write ds asserted when data_av dsack_rs (1'b1,\dsack_kill* ,&{\reset* ,~\dsack_en* },1'b1,
                        ~&{~\dsack_en_d* ,~\hds_i* ,
                        |{&{hb_read,~\data_av_i* },
                        &{~hb_read,~\sp_av_i* }} }) , dsstrb_rs (1'b0,\ds_strb* ,1'b1,&{\reset* ,~\ds_en* },
                        |{\ds_en_d* ,&{ |{~hb_read,\sp_av_i* },
                        |{~hb_read,~unrstrd, phase_i[0] },
                        |{hb_read,\data_av_i* }}} ) ;

lch_rs #(1)
              wait_st (1'b0 ,\sy_wait* ,1'b1, \fifo_rst_o* , \bstrdy_i* );

dff_rs_ce #(2)
              ds_l ( \dsack_i* , \dsack_d* ,1'b1, \sy_wait* , 1'b0,clock_i),
              ds_l2 ( \dsack_d* , \dsack_l* ,1'b1, \sy_wait* ,1'b0,clock_i), bst_l ( \bstat_i* , \bstat_d* ,1'b1,\has_o* ,1'b0,clock_i),
              bst_l2 ( \bstat_d* , \bstat_l* ,1'b1,\has_o* ,1'b0,clock_i);

dff_ce #(2)
              ph_l1 ( phase_i, phase_d,1'b0,~clock_i),
              ph_l ( phase_d, phase_i,1'b0,clock_i);

dff_rs_ce #(1)
              hbck_l ( \hbgack_i* , \hbgack_d* ,|{\hip_i* ,~\hbgack_o* },1'b1 ,1'b0,~clock_i),
              hbgk_l2 ( \hbgack_d* , \hbgack_l* ,|{\hip_i* ,~\hbgack_o* } ,1'b1 ,1'b0,clock_i);

dff_ce #(1)
              hds_l ( \hds_i* , \hds_d* ,1'b0,clock_i),
              hds_l2 ( \hds_d* , \hds_l* ,1'b0,clock_i),
              hbg_l ( \hbg_i* , \hbg_l* ,1'b0,clock_i);
```

//node_27ea0/cadence/tifb/dcc/b/hb_ctl.v                                                    modified 09/02/92 11:11 A).

```
        lch #(1)
              dat_av_l ( \data_av_i* , \data_av_l* ,~clock_i),
              sp_av_l ( \sp_av_i* , \sp_av_l* ,~clock_i);

//    * synchronization flip-flops for tran_en* -> equivalent
//      to logic in dpc_ctl dff_rs_ce #(1)
              sync1    (\hip_i* ,syn1,1'b1,~\hip_i* ,1'b0,clock_i) , sync_st (st_l1 , st_d, \reset* ,1'b1, 1'b0, clock_i) ;

dff_ce #(1)
              sync2    (syn1,syn2,1'b0,clock_i) , sync4    (syn2,syn4,1'b0,clock_i) ,
              sync3    (\has_i* ,syn3,1'b0,clock_i) ,
              ms_bs_s1 (mast_bs_s1,mast_bs_s2,1'b0,~clock_i),
              ms_sl_s1 (mast_sl_s1,mast_sl_s2,1'b0,~clock_i),
              ms_bs_s2 (mast_bs_s2,mast_bs_sy,1'b0,clock_i),
              ms_sl_s2 (mast_sl_s2,mast_sl_sy,1'b0,clock_i);

lch_rs #(1)
              ms_bs_rs (1'b1,mast_bs_s1,&{\reset* ,
                       ~&{~mast_bs,mast_bs_sy}},~mast_bs,1'b1),
              ms_sl_rs (1'b1,mast_sl_s1,&{\reset* ,
                       ~&{~mast_sl,mast_sl_sy}},~mast_sl,1'b1);

//    * state machine state register dff_rs_ce #(6)
              streg    (nx_st,st_reg,\reset* ,1'b1,1'b0,clock_i) ;

//    * new_addr pulse-generating flip-flop dff_rs_ce #(1)
              nw_addr (nw_addr_set,nw_addr_l,\reset* ,1'b1,1'b0,~clock_i) ;

//    * burst counter flip-flops dff_rs_ce #(5)
              bcntr    (data_cnt,data_rmd,\reset* ,1'b1,
                       &{|{\has_en* ,has_msk},\fb_grant_o* ,\cyc_dec* ,\spl_resp_en* ,
                       \dma_dat_lo* }, clock_i) ;       // added has_msk //    * fbus request latch dff_rs_ce #(1)
              fbreq    (1'b1,fb_req,\fbreq_clr* ,1'b1,\fbreq_en* ,clock_i) ;

//    * hbus request latch lch_rs #(1)

hbreq    (1'b1,hb_req,\hbreq_clr* ,1'b1,\hbr_en* ) ,

//    * pending split latch
              pd_spl  (1'b1,pd_split,
                       &{\pd_split_clr* ,\reset* ,~splt_tmout_d},
                       1'b1,\pd_split_en* ) , bs_rty  (1'b1,busy_rtry,&{\reset* ,~bsy_tmout_d},
                       1'b1,\busy_rtry_en* ) ;

dff_rs_ce #(1)
              wt_cnt  (1'b1,wait_cnt,&{\wait_clr* ,\reset* },
                       1'b1,\wait_en* ,clock_i) ;

//    * pulse generating flip-flops to cause a one clock
//      pulse on sel_en* and grant dff_ce #(1)
              s_tmout_sy (splt_tmout, splt_tmout_d,1'b0,clock_i),
              b_tmout_sy (bsy_tmout, bsy_tmout_d,1'b0,clock_i),
              sel_syn1d (\selected_i* ,\selected_d* ,1'b0,~clock_i) ,
              sel_syn1  (~\selected_d* ,s_syn1,1'b0,clock_i) ,
              gnt1      (gr_i,grnt1,1'b0,clock_i) ,
              hp1       (\hip_i* ,\hip_1* ,1'b0,clock_i) ;
```

```
//node_27ea0/cadence/tifb/dcc/b/hb_ctl.v                          modified 09/02/92 11:11 AM dff_rs_ce #(1)
                sel_syn2 (s_syn1,sl_syn2,1'b1,\reset* ,1'b0,clock_1) , gnt2     (grnt1,grnt2,\reset* ,1'b1,1'b0,clock_1) , sl_syn (1'b1,sl_syn1,\fifo_rst_o* ,1'b1, 1'b0,s_syn1);

//      * transaction start delay trstrt   (tran_strt,tran_strt_d,~\rtry_en* ,
                          1'b1,\rtry_en* ,clock_1) ;

lch_rs #(1)
                bs0 ( 1'b1, \bstat_o* [0],|{\bstat_int* [0],\hip_1* },~\hip_1* ,1'b1),
                bs1 ( 1'b1, \bstat_o* [1],|{\bstat_int* [1],\hip_1* },~\hip_1* ,1'b1),
                bs_en ( 1'b1, \bstat_en* ,~tran_strt, ~\hip_1* ,1'b1),
                lk_hld ( 1'b1, \lk_hold* ,|{\hbgack_en* ,\lk_o* }, ~\lk_o* ,1'b1);

dff_rs_ce #(1)
                tr_ip  (1'b1,trip ,\fbreq_clr* ,1'b1,
                          1'b0,&{tran_strt, gr_1, (phase_1 == 2'b01) }) ;
        lch #(1)
                rqst ( \request* , \request_1* , \request_en* );

//*******************************************************************************
// Pre-defined Module Instantiations
//*******************************************************************************

// Not applicable

//*******************************************************************************
// Gate and Structural Declarations
//*******************************************************************************

// Define fbus request
//    when hbus bus transaction is locked, hbc continues to
//    assert fb_req until lock is released
//    otherwise request is deasserted during last transaction
//    or disconnection (address only transaction)

assign
         \has_o* = \has_en* ;
        assign
         \hip_o* = \hip_en* ;
        assign
         \hds_o* = \ds_strb* ;

wire #2 \sel_en_d* = \sel_en* ;
        wire #2 gr_rel_d = gr_rel ;

assign
        \bsy_rtry_dly_en* = ~busy_rtry ,
        tran_strt   = &{\ignore_i* ,~\hip_1* , \hbgack_o* ,
                        |{(hadec_in == 4'b0000),(hadec_in == 4'b0111),
                          (hadec_in == 4'b0100),(hadec_in == 4'b0110),
                          (hadec_in == 4'b1101),(hadec_in == 4'b1001)}}, copyback = |{(cmd_enc == 3'b001),(cmd_enc == 3'b010),
                     (cmd_enc == 3'b011)} , \fbreq_en* = ~&{fbmstr_en ,|{fbreq1,copyback}} , fbreq1 = &{\ignore_i* ,~|{syn2,~syn4} ,\hbgack_o* ,~busy_rtry, ~&{\dma* , ~\dma_1* ,hb_read},
                   |{(hadec_in == 4'b0000),(hadec_in == 4'b0111),
                     (hadec_in == 4'b1001),(hadec_in == 4'b0100),
                     (hadec_in == 4'b1000)}}, //add mailbox address \fbreq_clr* = ~|{~\reset* ,
                         &{gr_rel_d, gr_1,|{
                            &{mast_sl, cap[2]},
                            &{ ~restart ,\lock* ,~\tran_end* , \dma* ,
                               |{&{(phase_1 == 2'b11),~st_1[1]},(phase_1 == 2'b10) }},
                            mast_bs }}}, // next gen.    rq_o[1] = &{gr_rel,|{copyback,~\coherent* }} ,
// next gen.    rq_o[0] = &{gr_rel,~|{copyback,~\coherent* }} ,
        rq_o[1] = 1'b0,
        rq_o[0] = gr_rel, fbc_gr_o = &{|{&{ gr_1, gr_rel,~busy_rtry, tran_strt, \rtry_en* ,\bstat_o* [1], \bstat_o* [0] },
                       trip },~st_11,~st_d, ~nw_addr_1 },
```

//node_27ea0/cadence/tifb/dcc/b/hb_ctl.v                                    modified 09/02/92 11:11 AM

```
        fbc_gr = |{&( gr_i, gr_rel,~busy_rtry, tran_strt, \rtry_en* ,\bstat_o* [1], \bstat_o* [0] ),
                    trip }, // Define dsack_o and bstrdy_o output encoders
//      dsack_cod is the encoded dsack bits that
//      are determined by the configuration register
//      for hbus64 capability and slow/fast burst speed dsac = dsack_cod(\hb_brst* ,hdata64_cap,slw_brst,\w64* ) ,
        \dsack_o* [1]= ~&(~dsac[1],\dsack_kill* ) ,
        \dsack_o* [0]= ~&(~dsac[0],\dsack_kill* ) ,
        \bstrdy_o* = |(\sync* , ~\dsack_kill* ) , // Define tr_mod output
        // tr_mode =>   000   -> normal transfer
        //              001      hbc idle
        //              010      disconnect master
        //              011      reserved
        //              100      snoop miss (shared not asserted)
        //              101      snoop miss (shared  asserted)
        //              110      snoop hit  (shared not asserted)
        //              111      snoop hit  (shared  asserted)

hbc_idle = |{(st_reg == 6'b000000),(st_reg == 6'b000001),
                     &{(pd_split,boff_flg), (st_reg == 6'b010010)},
                     (st_reg == 6'b000111),
                     (st_reg == 6'b001001),
                     (st_reg == 6'b010111),(st_reg == 6'b011000)} , tr_mode_o = trmod_enc(\tran_end* ,\snoop* ,
                    \snoop_miss* ,\snoop_hit* ,tran_flg,hbc_idle,
                    phase_i) , // Define tran_en* latch enable for hbc_dec block
// to latch in hbus attributes (same logic as in
// the dpc_ctl)

\tran_en* = &{ |(~syn3,\has_i* ),
                       |(syn1,~syn2,~syn3) } , // Define hadec qualification strobe which is the
// delayed version of tran_en* hadec_in = (&(~syn1,~syn2,\bstat_o* [1], \bstat_o* [0] ) ) ? hadec_i : 4'b1111,

// Define new_addr enable strobe
//      new_addr* is asserted when the slave ed's a fbus
//      mastered transaction by the module (slave uses
//      st_i[1])

//      or when multiple hbus transactions are required
//      when the module is a fbus slave (hbc s.m. used
//      new_addr_en* )

\new_addr_o* = &{\new_addr_en* ,~nw_addr_l) ,

// Define hbus status lines
//      bstat   2'b11   -> normal
//              2'b10   -> reserved
//              2'b01   -> bus error
//              2'b00   -> retry transaction hberr = |(berr,fbtmo_err) ,
        \bstat_int* = bstat_enc(\rtry_en* ,hberr ,tran_strt_d ) ,
        (h_retry,hbus_err) = bstat_dec(\bstat_l* ) , // Define fb_grant enable strobe
//      fb_grant* is asserted when the fbus is granted to
//      the module as a result of a fbus request //      or when the dpc is selected to source data
//      as a hbus slave e.g. read/write csr or s.c.
//      in which case the hbc asseted the fb_grant to
//      latch the address in the addreg \fb_grant_o* = &{\fb_gnt_en* ,~&(grant, tran_strt, ~boff_flg)} , // Define hbus request and hbgack
//      hbr* is asserted when the module is selected and the
//      transaction points to the hbus (via fadec)
```

//node_27ea0/cadence/tifb/dcc/b/hb_ctl.v                                modified 09/02/92 11:11 AM

```
//      hbr* is released when hip* is asserted, unless the
//      transaction is a lock in which case it is held
//      until lk_o* is deasserted.

//      lk_o* is determined from the incoming fbus transaction
//      and the cm_i[0] in the hbc_dec block //      hbgack* is asserted when the state machine recognizes
//      it has hbus and is released by the s.m. between
//      hbus transactions ; if a lock transaction is in
//      progress on fbus, hbgack* is continually asserted
//      due to the lk_o* line (unless hbg* is released by the
//      arbiter)

// sel_en enables the splt_cmd bit so we must delay sel_en

// do not request hbus for dpc csr's,
             // store cache or split responses
        \hbr_en* = &(|{\sel_en_d*,
                      ~&((fadec_i != 4'b0101),
                      ~&(|{(fadec_i == 4'b1101),(fadec_i == 4'b1111)},~f_write ),
                      (fadec_i != 0110),~splt_cmd} ),\hbreq_en* }, \hbreq_clr* = &{\reset*,\hip_o* } , \hbr_o* = ~hb_req , \hbgack_o* = &{\hbgack_en*,|{\lk_hold*,\hbg_i* }} , // Define one clock selected pulse and grant pulse \sel_en* =  |{~s_syn1,s1_syn2} , grant = &{gr_i,~grnt2} , // Define burst counter input mux and decrementor
//      hbus dlength (dl) determines initial counter
//      value at beginning of burst transaction data_cnt = (\cyc_dec* ) ? datlen_dec(\hb_brst*,hb_dlen) :
                                  dat_decr , dat_decr = data_rmd - (5'b01 << &{~\hb_brst*,((\hbgack_o* ) ? \dsack_o* [1] : \dsack_i* [1] )} ) , \brst_end* = |(dat_decr) , // Define hbus snoop responses stm_idle = ~|(st_reg) ,
        \snoop_miss* = ~&(\snoop_hit*,\snack_i* ) , // Define fifo_ptr reset \fifo_rst_o* = &{\reset*,\fifo_reset* } , // Define hbc_err* to fb_ctl
//      hbc_err* -- fbus command parity error or
//                  fbus protocol error \hbc_err* = ~|{cmd_perr,cmd_proterr} ;

//*******************************************************************************
// Procedural Assignments
//*******************************************************************************

// Define synchronous state machine
//      state register is clocked on the rising edge of clock_i
//      outputs are valid immediately during the current state //      state machine enables hbus strobes with the following
//      outputs -> the strobes are further qualified outside
//      the state machine :
//              has_en* ,hip_en* ,ds_en* ,dsack_en* ,rtry_en* ,
//
//      dpc addreg latch enables are generated either from the
//      state machine or external input signals
```

```
//node_27ms0/cadence/tifb/dcc/b/hb_ctl.v                          modified 09/02/92 11:11 AM.
//          i.e. new_addr_en* ,fb_gnt_en*   (come from s.m.)
//    clock edge qualified always statement is to generate
//    state dependent outputs which are pulses for enables always @ (posedge clock_1)
       begin : reset_pulses
              #2;
              \cyc_dec* = 1'b1 ;
              \has_en* = 1'b1 ;
              \fb_gnt_en* = 1'b1 ;
              \new_addr_en* = 1'b1 ;

\busy_rtry_en* = 1'b1 ;
              \bsy_rtry_dly_clr* = 1'b1 ;
              \bsy_rtry_cnt_en* = 1'b1;
              \bsy_rtry_cnt_clr* = 1'b1;

\pd_split_en* = 1'b1 ;
              \pd_split_clr* = 1'b1 ;
              \spl_resp_en* = 1'b1 ;
              brstcnt_dec = 1'b0 ;
              \brst_inc* = 1'b1 ;
              \brst_clr* = 1'b1;

\dma_dat_lo* = 1'b1; // the signal is for load data_rmd during dma mode
              \wait_clr* = 1'b1 ;
              \request_en* = 1'b1;

boff_flg = 1'b0;
       end always
       begin : sm case (st_reg)

6'b000000 :
                  begin : idle            // idle state
                        \fifo_reset* = 1'b1 ;
                        \h_strb_o* = 1'b1 ;
                        \has_en* = 1'b1 ;
                        \hip_en* = 1'b1 ;
                        \ds_en* = 1'b1 ;
                        \dsack_en* = 1'b1 ;
                        \hbgack_en* = 1'b1 ;
                        cmd_enc = 3'b000 ;

\hbreq_en* = 1'b1 ;
                        \rtry_en* = 1'b1 ;
                              fbtmo_err = 1'b0 ;
                        fb_busy = 1'b0 ;
                        \pd_split_en* = 1'b1 ;

\new_addr_en* = 1'b1 ;
                        \fb_gnt_en* = 1'b1 ;

dec_sel = 1'b0 ;

\wait_en* = 1'b1 ;
                        \wait_clr* = 1'b0 ;
                        has_msk = 1'b0 ;
                        asyn_end = 1'b0;  // not finish whole transaction in
                                          // asyn. mode // *** hbus slave if ((tran_strt == 1'b1) && (\cfull_1* == 1'b1) &&
                            (sl_syn1 != 1'b1))

begin : hbus_slv    // selected hbus slave
                                 case ({hadec_in,\gbl* })
                                    5'b0000_1,     // hbus <-> fbus
                                    5'b1000_1,     //mailbox address
                                    5'b0111_1,     // non-coherent
                                    5'b1001_1,
                                    5'b0100_1 :
                                         begin
                                            if (grnt1 & rq_o[0] & ~busy_rtry )
                                                 nx_st = 6'b000010 ;
```

```
//node_27ea0/cadence/t1fb/dcc/b/hb_ctl.v                              modified 09/02/92 11:11 AM else if (busy_rtry) begin
                                    \rtry_en* = 1'b0 ;
                                    nx_st = 6'b000000 ;
                                end
                            else begin
                                    nx_st = 6'b000001 ;
                                end
                        end 5'b1101_1 :       // hbus <-> dpc
                        if ( ~busy_rtry )
                                nx_st = 6'b001000 ;
                        else if (busy_rtry) begin
                                \rtry_en* = 1'b0 ;
                                nx_st = 6'b000000 ;
                            end 5'b0110_1 :       // split response
                        begin
                                // pending split
                            if (pd_split) begin
                                nx_st = 6'b010010 ;
                                \rtry_en* = 1'b0 ;
                            end
                            else begin
                            if (grnt1 & rq_o[0])
                                    nx_st = 6'b000010 ;
                            else
                                    nx_st = 6'b010010 ;
                                    \rtry_en* = 1'b0 ;
                                end
                        end
                    5'b0000_0 :       // hbus <-> fbus coherent
                        nx_st = 6'b000000 ; // default return
                                          // to idle default nx_st = 6'b000000 ;

endcase
            end else if ((\cpyrq_i* == 1'b0) && (sl_syn1 != 1'b1))

begin : cpy_bck    // store cache copyback
                nx_st = 6'b000001 ;
            end // *** hbus master
        else if (sl_syn1 == 1'b1)
            begin : hbus_mstr   // selected fbus slave
                case (fadec_i)
                                        // fbus <-> hbus
                    4'b0000,           // snoop
                    4'b0001,4'b1001,   // memory
                    4'b0010,           // i/o
                    4'b0011,4'b0100,
                    4'b1000,4'b1110 :   // csr
                        begin if ( (fadec_i == 4'b0011) && (splt_cmd == 1'b1))
                                begin
                                    nx_st = 6'b010111 ;   // split response
                                end
                        else begin
        // module is already master of hbus and
        // may already have hbgack* asserted
        // because of a lock trans. on fbus
        // module asserts hbgack* if not already
                        if ((~\hbgack_o* ) ||
                            (~\hbg_1* & \hbgack_1* )) begin \hbgack_en* = 1'b0 ;

if (
                                (phase_1 == 2'b00) ||
                                (phase_1 == 2'b11) ||
                                (phase_1 == 2'b10))

// hbus command already set-up
                                    nx_st = 6'b001010 ;
```

//node_27ea0/cadence/tifb/dcc/b/hb_ctl.v                                    modified 09/02/92 11:11 AM

```verilog
                                        else
                                        // wait for hbus command set-up
                                                begin
                                                    \rtry_en* = 1'b0 ;
                                                    nx_st = 6'b001001 ;
                                                end
                                        end
                                // module needs to request hbus and wait
                                // for hbgack*
                                        else begin
                                                nx_st = 6'b001001 ;
                                                \rtry_en* = 1'b0 ;
                                        end
                                    end
                                end
                            4'b1101,4'b1111 :           // dpc csr
                                begin
                                    nx_st = 6'b010011 ;
                                    \rtry_en* = 1'b0 ;
                                end 4'b0110 :           // split response
                                begin
                                    nx_st = 6'b010111 ;
                                end
                        endcase
                    end else
                    nx_st = 6'b000000 ;             // return to idle if no
                                                    // decode
            end //*********************************************************************
// hbus slave - fbus master - non-coherent transactions
//*********************************************************************
            6'b000001 :
                begin : fb_request    // request fbus wait for gr_i
                    \bsy_rtry_dly_clr* = 1'b0 ;
                    if ( sl_syn1 )    // module selected as
                                      // or not fbus master
                                      // enabled
                        begin
                            nx_st = 6'b010010 ;
                            boff_flg = 1'b1;
                            \rtry_en* = 1'b0 ;
                        end else
                        begin
                            if (! \cpyrq_i* ) begin     // copyback request
                                if (\cfull_i* ) begin
                                    \rtry_en* = 1'b0 ;
                                    cmd_enc = 3'b001 ;
                                end
                                else if (! tran_strt ) begin
                                    \rtry_en* = 1'b0 ;
                                    cmd_enc = 3'b001 ;
                                end
                                else
                                    cmd_enc = 3'b000 ;
                            end if ((|((grntl & (rq_o[1] | rq_o[0])),&{\dma* , ~\dma_l* }} )
                                    nx_st = 6'b000010 ; // fbus granted
                            else
                                    nx_st = 6'b000001 ; // wait for fbus gr
                        end
                end 6'b000010 :
                begin : fbus_grant    // fbus granted to module dac_sel = 1'b1 ;
                    if (\dma_l* == 1'b1 ) // we want the first one to
                                          // clock in only
                        \fb_gnt_en* = 1'b0 ;    // latch addr. in addreg else
                        \dma_dat_lo* = 1'b0;    // enable load data_rmd when
```

//node_27ea0/cadence/tifb/dcc/b/hb_ctl.v                                    modified 09/02/92 11:11 AM

```
                        // \cyc_dec* = 1 during dma mode
        \h_strb_o* = 1'b0 ;      // signal dpc to rec. hmode
        if ( mast_sl_sy && ~mast_bs_sy && (~&(cap[2],hb_read)) ||
             (hadec_in == 4'b1101) || (\dma* && ~\dma_1* ) ) // slave selected
                                                  // or dpc <-> hbus
            nx_st = 6'b000011 ;
        else if (mast_sl_sy && hb_read && cap(2)) // split response
                                                  // by slv
            begin
                nx_st = 6'b010110 ;
                \rtry_en* = 1'b0 ;
            end
        else if ( mast_sl_sy && mast_bs_sy ) begin
                \rtry_en* = 1'b0 ;
                \busy_rtry_en* = 1'b0 ;
                \bsy_rtry_cnt_en* = 1'b0 ;
                nx_st = 6'b000000 ;
            end else if (! \fbc_err* )       // fbus trans. timeout
            begin
                nx_st = 6'b010010 ;
                \rtry_en* = 1'b0 ;
            end
        else
            nx_st = 6'b000010 ;  // wait
    end 6'b000011 :
    begin : dat_strb_ack            // data strobe acknowledge \dsack_en* = 1'b0 ;     // enable dsack strobe
        \bsy_rtry_cnt_clr* = 1'b0;

if ( \dsack_kill* ) begin casez ({dsac,\bstrdy_o* ,\hb_brst* })

4'b00_0_1,
                4'b01_0_0 : begin // 32 bit hbus fast mode
                        \cyc_dec* = 1'b0 ;
                        if (! \brst_end* ) begin
                                nx_st = 6'b000110 ;   // wait for fbus
                            end
                        else
                            nx_st = 6'b000011 ;
                    end 4'b1?_0_0 : begin // 64 bit hbus
                        nx_st = 6'b011110 ;
                    end 4'b00_0_0 : begin // 32 bit hbus slow
                        nx_st = 6'b000101 ;
                    end 4'b00_1_? : begin // 32 bit hbus asynchronous
                        nx_st = 6'b000111 ;
                    end default nx_st = 6'b000011 ;
            endcase
        end else if ( \hip_1* )
            nx_st = 6'b000000 ;           // hbus timeout
        else
            nx_st = 6'b000011 ;           // wait
    end 6'b011110 :
    begin : hbus_slv_64bit_wait           // wait for evaluation
        nx_st = 6'b000100 ;
    end 6'b000100 :
    begin : hbus_slv_64bit         // 64 bit hbus transaction
        casez (dsac)
            2'b11 : begin          // fast 64 bit
                \cyc_dec* = 1'b0 ;
                if (! \brst_end* ) begin
```

//node_27ea0/cadence/tifb/dcc/b/hb_ct1.v               modified 09/02/92 11:11 AM

```
                            nx_st = 6'b000110 ;      // wait
                        end                          //for fbus
                    else
                        nx_st = 6'b000100 ;   // continue burst
                    end 2'b10 : begin           // slow 64 bit
                    nx_st = 6'b000101 ;                // wait state
                    end default nx_st = 6'b000100 ;
            endcase
        end 6'b000101 :
        begin : hbus_slv_slow           // 32/64 bit slow hbus trans
            casez ({dsac,\bstrdy_o* })
                3'b?0_1 : begin
                    nx_st = 6'b000101 ;       // wait state
                    end 3'b00_0 : begin         // 32 bit slow
                    \cyc_dec* = 1'b0 ;
                    if (! \brst_end* ) begin
                        nx_st = 6'b000110 ;      // wait
                        end                      //for fbus
                    else
                        nx_st = 6'b000011 ;      // continue burst
                    end 3'b10_0 : begin         // 64 bit slow
                    \cyc_dec* = 1'b0 ;
                    if (! \brst_end* ) begin
                        nx_st = 6'b000110 ;      // wait
                        end                      //for fbus
                    else
                        nx_st = 6'b000100 ;      // continue burst
                    end
            endcase
        end 6'b000111 :
        begin : hbus_slv_asyn
            if (\hds_1* ) begin
                \h_strb_o* = 1'b1 ;
                \dsack_en* = 1'b1 ;
                nx_st = 6'b000110 ;   // wait for fbus disconnect
                end
            else
                nx_st = 6'b000111 ;   // wait
        end 6'b000110 :
        begin : slv_disconnect
            \h_strb_o* = 1'b1 ;
            \dsack_en* = 1'b1 ;
            if (hb_read || ((phase_1 != 2'b11) &&
                (phase_1 != 2'b10) && (~restart) ) ||
                ~!{\dma* , hb_read} )
                begin
                    nx_st = 6'b010101 ;
                end
            else begin
                \rtry_en* = 1'b0;
                if (tran_strt_d) begin
                    fb_busy = 1'b1 ;
                    nx_st = 6'b010010 ;
                    end
                else
                    nx_st = 6'b000110 ;
                    end
        end 6'b010110 :
        begin : splt_resp_disc          // slv splt resp. disc
            \rtry_en* = 1'b0 ;
            \pd_split_en* = 1'b0 ;
            if (\hip_i* )
                nx_st = 6'b000000 ;   // return to idle
```

//node_27aa0/cadence/tifb/dco/b/hb_ctl.v                                    modified 09/02/92 11:11 AM.

```verilog
                else
                    nx_st = 6'b010110 ;    // wait
            end //***************************************************************
// hbus slave - address -> split response
//***************************************************************

6'b010111 :
            begin : splt_resp_str      // splt. resp. re-connection
                if (tran_strt == 1'b1) begin
                    if (hadec_in == 4'b0110) begin
                        \pd_split_clr* = 1'b0;
                        \fb_gnt_en* = 1'b0 ;
                        nx_st = 6'b011000 ;     // split connection
                        end                     // on hbus
                    else begin
                        nx_st = 6'b011001 ;
                        \rtry_en* = 1'b0 ;
                        end
                    end
                else
                    nx_st = 6'b010111 ;    // wait
            end 6'b011000 :
            begin : splt_resp_ack      // splt. resp. ack
                \pd_split_clr* = 1'b0 ;
                \spl_resp_en* = 1'b0 ;  // enable burst cnt. lch.
                \h_strb_o* = 1'b0 ;
                nx_st = 6'b000011 ;     // go to dat_strb_ack
            end 6'b011001 :
            begin : splt_resp_rtry     // splt. resp. hbus rtry
                \rtry_en* = 1'b0 ;
                if (\hip_1* ) begin
                    nx_st = 6'b010111 ;  // wait for connection
                    \rtry_en* = 1'b1 ;
                    end
                else
                    nx_st = 6'b011001 ;    // wait
            end //***************************************************************
// hbus slave - address -> dpc - not fbus master
//***************************************************************

6'b001000 :
            begin : hbus_slv_dpc1      // hbus slave address points to
                                       // dpc csr
                if (sl_syn1 )
                    begin
                        nx_st = 6'b010010 ;    // module selected
                                               // as fbus slave
                        \rtry_en* = 1'b0 ;
                    end
                else if (wait_cnt == 1'b0)
                    begin
                        \wait_en* = 1'b0 ;      // increment wait cntr
                        nx_st = 6'b001000 ;     // wait state to avoid
                                                // metastability
                    end
                else begin
                    \wait_en* = 1'b1 ;
                    nx_st = 6'b000010 ;    // continue with hbus
                    end                    // transaction
            end 6'b010010 :
        begin : hbus_mstr_retry1       // retry current hbus master
            \rtry_en* = 1'b0 ;
            if (( \hip_1* ) && (! fb_busy))
                nx_st = 6'b000000 ;
            else if (( \hip_1* ) && (fb_busy))
                nx_st = 6'b000110 ;
            else
                nx_st = 6'b010010 ;
        end
```

```
//****************************************************************
// hbus master - fbus slave - non-coherent transaction
//****************************************************************
            6'b001001 :
              begin : hbus_request        // module needs to receive hbus
                if ((~\hbgack_o* ) ||
                   (~\hbg_1* & \hbgack_1* )) begin \hbreq_en* = 1'b1 ;
                   \hbgack_en* = 1'b0 ;

if (
                      (phase_1 == 2'b00) ||
                      (phase_1 == 2'b11) ||
                      (phase_1 == 2'b10))

// hbus command already set-up
                         nx_st = 6'b001010 ;

else
                   // wait for hbus command set-up
                         nx_st = 6'b001001 ;
                end
              end 6'b001010 :
              begin : hbus_strb_en        // enable hbus strobes
                   \has_en* = 1'b0 ;
                   \hip_en* = 1'b0 ;
                   if (hb_read)
                    \ds_en* = 1'b0 ;
                   dec_sel = 1'b1 ;          // select decrementor for
                                             // burst count
                   \h_strb_o* = 1'b0 ;       // qualify hmode to dpc nx_st = 6'b001011 ;       // begin transaction cycle
              end 6'b001011 :
              begin : hbus_mstr_strt       // start hbus tran. cycle \ds_en* = 1'b0 ;

if ( h_retry || hbus_err ) begin
                   \hip_en* = 1'b1 ;
                   \ds_en* = 1'b1 ;
                   dec_sel = 1'b0 ;
                   \h_strb_o* = 1'b1 ;
                   \hbgack_en* = 1'b1 ; // release hbus if (h_retry) begin
                      \hbreq_en* = 1'b0 ;
                      nx_st = 6'b001001 ;
                   end
                   else if (hbus_err) begin
                      nx_st = 6'b010101 ;
                   end
                end else if (\bstrdy_i* == 1'b0) begin
                     casez ((\dsack_i* ,\hb_brst* ))
                     3'b?0_1,
                     3'b0?_1,
                     3'b01_0 : begin    // fast 32 bit
                          \cyc_dec* = 1'b0 ;
                          if ( \brst_end* )
                             nx_st = 6'b001011 ;
                          else begin      // burst complete on hbus
                             nx_st = 6'b011010 ;
                          end end 3'b11_0 : begin    // 64 bit fast
                          nx_st = 6'b011101 ;
                       end 3'b10_0 : begin    // 64 bit slow
```

```
//node_27ea0/cadence/tifb/dcc/b/hb_ctl.v                                    modified 09/02/92 11:11 AM nx_st = 6'b001100 ;// added this state
                        end 3'b00_0 : begin    // slow 32/64 bit
                              nx_st = 6'b001101 ;
                        end
                  default  nx_st = 6'b001011 ;
                  endcase
            end else begin                    // bstrdy_1* != 1'b0
                  if (\dsack_1* != 2'b11)
                        nx_st = 6'b001110 ;      // async. slave
                  else
                        nx_st = 6'b001011 ;      // wait
                  end
            end 6'b011101 :
            begin : hbus_mstr_64bit_wait        // wait for evaluation
                  nx_st = 6'b001100 ;
            end 6'b001100 :
            begin : hbus_mstr_64bit       // 64 bit hbus transaction
                  casez (\dsack_1* )
                  2'b11 : begin           // fast 64 bit
                              \cyc_dec* = 1'b0 ;
                              if ( \brst_end* )
                                    nx_st = 6'b001100 ;
                              else begin
                                                            // burst amt
                                    nx_st = 6'b011010 ;
                                    end
                              end 2'b10 : begin           // slow 64 bit
                              nx_st = 6'b001101 ;
                              end
                  endcase
            end 6'b001101 :
            begin : hbus_mstr_slow         // 32/64 bit slow hbus trans
                  casez (\dsack_1* )
                  2'b00 : begin            // 32 bit slow if (\bstrdy_1* ) begin
                                    \cyc_dec* = 1'b1 ;    // if wait, set \cyc_dec*
                                    nx_st = 6'b001101 ;   // wait
                                    end else begin
                                    \cyc_dec* = 1'b0 ;
                                    if ( \brst_end* )
                                          nx_st = 6'b001011 ;
                                    else begin
                                                                  // by brst amt
                                          nx_st = 6'b011010 ;
                                                                  // go to burst_finish
                                          end
                                    end
                              end 2'b10 : begin            // 64 bit slow
                              if (\bstrdy_1* ) begin
                                    \cyc_dec* = 1'b1 ;
                                    nx_st = 6'b001101 ;         // wait
                                    end
                              else begin
                                    \cyc_dec* = 1'b0 ;
                                    if ( \brst_end* )
                                          nx_st = 6'b001100 ;
                                    else begin
                                                                  // by brst amt.
                                          nx_st = 6'b011010 ;    // go to burst_finish
                                          end
                                    end
                              end
                        endcase
                  end
```

//node_27ea0/cadence/tifb/dcc/b/hb_ctl.v                                        modified 09/02/92 11:11 AM

```
                 6'b001110 :

begin : hbus_mstr_asyn1      // asynchronous hbus trans
                        \cyc_dec* = 1'b0 ;
                        if ( \brst_end* ) begin
                           has_msk = 1'b1; // mask the reload of data decr
                           end
                        else begin
                           brstcnt_dec = 1'b1 ;   // dec. byte cnt by brst amt
                           asyn_end = 1'b1;
                        end
                        nx_st = 6'b001111 ;

end

6'b001111 :
                    begin : hbus_mstr_asyn2      // asynchronous hbus trans
                        \hip_en* = 1'b1 ;
                        \ds_en* = 1'b1 ;

if(asyn_end == 1'b1)
                           begin
                              \request_en* = 1'b0;
                              nx_st = 6'b010000;
                           end
                        else
                           nx_st = 6'b011011 ;    // start new hbus trans
                     end 6'b011011 :
                    begin : hbus_mstr_asyn3      // asynchronous hbus trans
                        \h_strb_o* = 1'b1 ;
                        \new_addr_en* = 1'b0 ;        // inc. next address
\request_en* = 1'b0;
                        nx_st = 6'b010000 ;       // start new hbus trans
                     end 6'b011010 :
                    begin : burst_finish         // deassert hbus strobes
                        brstcnt_dec = 1'b1 ;
                        \h_strb_o* = 1'b1 ;
                        \hip_en* = 1'b1 ;
                        \ds_en* = 1'b1 ;
                        \request_en* = 1'b0;

nx_st = 6'b010000 ;
                    end

6'b010001 :
                    begin : inc_new_addr         // incr. new address if(~mem_addr)
                         begin
                          \hbgack_en* = 1'b1;
                          nx_st = 6'b010101;    // if not mem or unit go to idle
                         end
                        else
                         begin
                                    // deassert hbus strobes nx_st = 6'b001010 ;
                         end
                     end 6'b010000 :
                    begin : hbus_mstr_end        // end burst read/write
                        asyn_end = 1'b0; // clear asyn_end for hbus asyn handshake
                                       // it was set at 6'b001110
                                       // we can not put check and clear asyn_end
                                       // at state 6'b001111

\new_addr_en* = 1'b0 ;  // inc. next address

//***********************************************************

// For hbus master (fbus slave) disconnection, the hbc
// determines the remaining transfers required on the
// hbus by using the prefetch counter and request indicators //     hbus read (hb_read = 1'b1)
//             packet ->
//                     when pref_end* = 0 and request* = 0
```

```
//                      prefetch next packet and toggle
//                      prefetch toggle latch reset burst
//                      counter
//
//                      when pref_end* = 0 and request* = 1
//                      wait to see if fbus disconnection
//                      if so no further data requested,
//                      disconnect ,otherwise, wait for
//                      master to retreive data (eventually
//                      causing request* = 0) then continue
//
//                      when pref_end* = 1 and request* = ?
//                      packet not completely prefetched
//                      inc address and continue
//
//              compelled ->
//                      when pref_end* = 0 and request* = ?
//                      and unrstrd = 0
//                      no further data requested, disconnect
//
//                      when pref_end* = 0 and unrstrd = 1
//                      and request* = 1 wait to see if
//                      fbus disconnection, if so no further
//                      data requested, disconnect, otherwise,
//                      wait for master to retreive data then
//                      continue
//
//                      when pref_end* = 0 and unrstrd = 1
//                      and request* = 0 prefetch next
//                      datum and toggle prefetch toggle
//                      latch
//
//                      when pref_end* = 1 and request* = 1
//                      requested data crosses boundary
//                      disconnect
//
//                      when pref_end* = 1 and request* = 0
//                      continue prefetching data into fifo
//                      decrement burst count by burst amt
//
//      hbus write (hb_read = 1'b0)
//              packet ->
//                      when pref_end* = 0 and data_av* = 0
//                      write another packet to hbus reset
//                      burst counter
//
//                      when pref_end* = 0 and data_av* = 1
//                      wait to see if fbus disconnection,
//                      if so, not further data writes,
//                      disconnect, otherwise, wait for
//                      master to write data into fifo,continue
//
//                      when pref_end* = 1 and data_av* = ?
//                      continue writing data from fifo
//                      dec burst counter by burst amount
//
//              compelled ->
//                      when pref_end* = 0 and request* = ?
//                      and unrstrd = 0 no further data to
//                      transfer, disconnect
//
//                      when pref_end* = 0 and request* = 0
//                      and unrstrd = 1 wait to see if fbus
//                      disconnect and data_av* = 1 then
//                      disconnect, if data_av* = 0 then reset
//                      burst counter and write next work
//
//                      when pref_end* = 1 and request* = 0
//                      dec burst counter by burst amt and
//                      write next burst
//
//                      when pref_end* = 1 and request* = 1
//                      write crosses boundary, disconnect

//********************************************************* if (hb_read) begin               // hbus read
casez (({cap[1] ,\pref_end* ,\request_1* ,unrstrd })

// packet reads
        4'b0_0_0_? :   begin
           \brst_inc* = 1'b0 ;
```

`//node_27ea0/cadence/tifb/dcc/b/hb_ctl.v`                                    modified 09/02/92 11:11 AM

```verilog
                    dec_sel = 1'b0 ;
                    \request_en* = 1'b0 ;
                    nx_st = 6'b010001 ;
                end 4'b0_0_1_? :    begin
                if (phase_1 != 2'b11)
                    begin
                        \brst_clr* = 1'b0;
                        \hbgack_en* = 1'b1 ;
                        \request_en* = 1'b1 ;
                        nx_st = 6'b010101 ;       // return to idle
                    end
                else begin
                        \request_en* = 1'b0 ;
                        nx_st = 6'b010000 ;       // wait
                    end
                end 4'b0_1_?_? :    begin
                \request_en* = 1'b0 ;
                nx_st = 6'b010001 ;
            end // compelled reads
            4'b1_0_1_1 ,4'b1_0_?_0,
            4'b1_1_1_? : begin
                if (phase_1 != 2'b11)
                    begin
                        \request_en* = 1'b1 ;
                        \hbgack_en* = 1'b1 ;
                        nx_st = 6'b010101 ;       // return to idle
                    end
                else begin
                        \request_en* = 1'b0 ;
                        nx_st = 6'b010000 ;       // wait
                    end
                end 4'b1_0_0_1 :    begin
                \request_en* = 1'b0 ;
                \brst_inc* = 1'b0 ;
                dec_sel = 1'b0 ;
                nx_st = 6'b010001 ;   // next datum
            end 4'b1_1_0_? : begin
                \request_en* = 1'b0 ;
                nx_st = 6'b010001 ;   // next datum
            end
        endcase
    end else begin              // hbus write
        casez ({cap[1],\pref_end* ,\request_1* ,unrstrd,\data_av_1* })
                    // packet writes
            5'b0_0_?_?_0 : begin
                \request_en* = 1'b0 ;
                nx_st = 6'b011100 ;   // changed this
            end 5'b0_0_?_?_1 : begin
                if (phase_1 != 2'b11)
                    begin
                        \request_en* = 1'b1 ;
                        \hbgack_en* = 1'b1 ;
                        nx_st = 6'b010101 ;       // return to idle
                    end
                else begin
                        \request_en* = 1'b0 ;
                        nx_st = 6'b010000 ;       // wait
                    end
            end 5'b0_1_?_?_? : begin
                \request_en* = 1'b0 ;
                nx_st = 6'b010001 ;
            end // compelled writes
            5'b1_0_?_0_?,5'b1_1_1_?_? : begin
```

```verilog
                              if (phase_l != 2'b11)
                                begin
                                   \request_en* = 1'b1 ;
                                   \hbgack_en* = 1'b1 ;
                                   nx_st = 6'b010101 ;      // return to idle
                                end
                              else begin
                                   \request_en* = 1'b0 ;
                                   nx_st = 6'b010000 ;      // wait
                                end
                            end 5'b1_0_0_1_? : begin
                             if ((phase_l != 2'b11) && (\data_av_l* == 1'b1))
                                begin
                                   \request_en* = 1'b1 ;
                                   \hbgack_en* = 1'b1 ;
                                   nx_st = 6'b010101 ;      // return to idle
                                end
                              else if (\data_av_l* == 1'b0) begin
                                    \request_en* = 1'b0 ;
                                    nx_st = 6'b011100 ;
                                 end
                              else begin
                                    \request_en* = 1'b0 ;
                                    nx_st = 6'b010000 ;     // wait
                                 end
                          end 5'b1_1_0_?_? : begin
                             \request_en* = 1'b0 ;
                             nx_st = 6'b010001 ;
                          end
                       endcase
                    end
                 end 6'b011100 :
         begin : hbus_master_disc_restart_check
            if (\data_av_l* == 1'b0 ) begin
                    dec_sel = 1'b0 ;
                    nx_st = 6'b010001 ;
                 end
            else nx_st = 6'b010101 ;   // return to idle
         end 6'b010011 :
         begin : hbus_mstr_dpc_csr1    // fbus slave dpc csr
             if (((h_mode_o == 3'b001) && (! \sp_av_l* )))  // csr -> fifo
                begin
                    \h_strb_o* = 1'b0 ;
                    nx_st = 6'b010100 ;
                end
             else if (h_mode_o == 3'b010)
                  begin
                    if ((~\hbgack_o* ) ||
                        (~\hbg_l* & \hbgack_l* )) begin \hbgack_en* = 1'b0 ;

if (
                           (phase_l == 2'b00) ||
                           (phase_l == 2'b11) ||
                           (phase_l == 2'b10))

// hbus command already set-up
                           nx_st = 6'b001010 ;

else
                  // wait for hbus command set-up
                           nx_st = 6'b001001 ;

end
                  // module needs to request hbus and wait
                  // for hbgack*
                    else begin
                         nx_st = 6'b001001 ;
                         \rtry_en* = 1'b0 ;
                         end
                      end
             else
                 nx_st = 6'b010011 ;   // wait
```

```
//node_27es0/cadence/tifb/dcc/b/hb_ctl.v                          modified 09/02/92 11:11 AM end 6'b010100 :
            begin : hbus_mstr_dpc_csr2
                \h_strb_o* = 1'b1 ;
                if (phase_1 != 2'b11)
                    nx_st = 6'b010101 ;         // go to disconnect
                else
                    nx_st = 6'b010100 ;         // wait
            end 6'b010101 :
            begin : fifo_ptr_rst                // fifo ptr. reset
                \dsack_en* = 1'b1 ;
                \h_strb_o* = 1'b1 ;
                if(phase_1 == 2'b00 && \dma* == 1'b1)
                    begin
                        \fifo_reset* = 1'b0 ;
                        nx_st = 6'b000000;
                    end
                else if (\dma* == 1'b0)
                    nx_st = 6'b000000;
                else
                    nx_st = 6'b010101;
            end default         nx_st = 6'b000000 ;
    endcase
  #1;
end //*******************************************************************************
// Task and Function Definitions
//******************************************************************************* function [1:0] dsack_cod ;
            input   \hb_brst* ,hdata64_cap,slw_brst,
                    \w64* ;

//      dsac = dsack_cod(\hb_brst* ,hdata64_cap,slw_brst,\w64* ) ,

// dsack_cod -- dsack encoding of slave begin
                casez ({\hb_brst* ,hdata64_cap,slw_brst,\w64* })
                    4'b1_?_?_?     : dsack_cod = 2'b00 ;    // compelled 32 bits
                    4'b0_0_0_0,
                    4'b0_?_0_1     : dsack_cod = 2'b01 ;    // burst 32 bits fast
                    4'b0_1_0_0     : dsack_cod = 2'b11 ;    // burst 64 bits fast
                    4'b0_0_1_0,
                    4'b0_?_1_1     : dsack_cod = 2'b00 ;    // burst 32 bits slow
                    4'b0_1_1_0     : dsack_cod = 2'b10 ;    // burst 64 bits slow
                    default          dsack_cod = 2'b11 ;    // wait states
                endcase
            end
        endfunction function [2:0] trmod_enc ;
            input   \tran_end* ,\snoop* ,\snoop_miss* ,
                    \snoop_hit* ,tran_flg,hbc_idle ;
            input [1:0]     phase_i ;

// trmod_enc -- transfer encoding from hbc to fbc begin
                casez ({\tran_end* ,phase_i,\snoop* ,
                        \snoop_miss* ,\snoop_hit* ,tran_flg,hbc_idle})

8'b0_11_?_?_?_?_?    : trmod_enc = 3'b010 ;   // disconnect

8'b1_01_0_0_1_0_0    : trmod_enc = 3'b100 ;   // snoop miss w/oflg
                    8'b1_01_0_0_1_1_0    : trmod_enc = 3'b101 ;   // snoop miss w/ flg 8'b1_01_0_1_0_1_0    : trmod_enc = 3'b110 ;   // snoop hit w/o flg
                    8'b1_01_0_1_0_0_0    : trmod_enc = 3'b111 ;   // snoop hit w/ flg
                    8'b?_00_?_?_?_?_1    : trmod_enc = 3'b001 ;   // hbc idle
                    8'b?_01_?_?_?_?_1    : trmod_enc = 3'b001 ;   // hbc idle
                    8'b?_10_?_?_?_?_1    : trmod_enc = 3'b001 ;   // hbc idle
                    default          trmod_enc = 3'b000 ;          // normal transfer
```

//node_27ea0/cadence/tifb/dcc/b/hb_ctl.v                                                    modified 09/02/92 11:11 AM.

```verilog
            endcase
        end
    endfunction function [1:0] bstat_enc ;
        input \rtry_en* ,berr ,tran_strt_d ;

begin
            casez ({\rtry_en* ,berr ,tran_strt_d})
                3'b001 : bstat_enc = 2'b00 ;
                3'b?11 : bstat_enc = 2'b01 ;
                default bstat_enc = 2'b11 ;
            endcase
        end
    endfunction function [1:0] bstat_dec ;
        input [1:0] \bstat_i* ;

begin
            casez (\bstat_i* )
                2'b00 : bstat_dec = 2'b10 ;
                2'b01 : bstat_dec = 2'b01 ;
                default bstat_dec = 2'b00 ;
            endcase
        end
    endfunction function [4:0] datlen_dec ;
        input \hb_brst* ;
        input [1:0] hb_dlen ;
        begin
            casez ({\hb_brst* ,hb_dlen})
                3'b1_?? : datlen_dec = 5'h01 ;
                3'b0_00 : datlen_dec = 5'h10 ;
                3'b0_01 : datlen_dec = 5'h08 ;
                3'b0_10 : datlen_dec = 5'h04 ;
                3'b0_11 : datlen_dec = 5'h02 ;
                default  datlen_dec = 5'h01 ;
            endcase
        end
    endfunction `endprotect
//*********************************************************************
// End of Model
//*********************************************************************
endmodule
```

```
//node_27ea0/cadence/tifb/dcc/b/fb_ctl.v                          modified 09/02/92 11:14 AM
//*******************************************************************************
//
//      Model Name     : fb_ctl.v
//      Revision       : $Revision: 2.21 $
//      Date           : $Date: 92/09/02 12:27:58 $
//      Author         : Bill Saperstein
//      Description    : FB+ strobe control model
//
//*******************************************************************************

//*******************************************************************************
// Module Definition
//*******************************************************************************
`protect module fb_ctl (
    // Inputs tr_mode_i ,        // fbus transfer mode cm_i ,             // fbus command
            st_i ,             // fbus input status
            ca_i ,             // fbus capability as_i ,             // fbus  address strobe
            ak_f_i ,           // fbus address acknowledge filtered
            ai_f_i ,           // fbus addr. acknowledge inverse filtered ds_i ,             // fbus data strobe
            dk_i ,             // fbus data acknowledge
            di_i ,             // fbus data acknowledge inverse
            dk_f_i ,           // fbus data acknowledge filtered
            di_f_i ,           // fbus data ack. inverse filtered et_i ,             // fbus end of tenure indication \data_av_i* ,      // FIFO data available indication
            \sp_av_i* ,        // FIFO space available indication fadec_i ,          // fbus address compare encoding
            \sf_hit_i* ,       // snoop filter hit
            gr_i ,             // fbus grant acknowledge pack_cap_i ,       // module is packet capable
            \f_ack_i* ,        // dpu strobe acknowledge par_rpt_en ,       // enable fbus parity error reporting
            adpar_err ,        // dpc parity error
            \hbc_err* ,        // hbc command error
            \fbc_err* ,        // fbus timeout error
            \busi* ,           // fbc bus idle restart ,          // hbc restart \rst* ,            // power up module reset
            \binit* ,          // bus initialization
            \reset* ,          // fbc reset
            \lock_f* ,         // indivisible hbus transaction // Outputs \f_rd_o* ,         // direction of fbus transaction
            \f_strb_o* ,       // fbus to/from FIFO strobe
            f_mode_o ,         // fbus mode encoding
            \selected_o* ,     // module selected for fbus trans.

as_o ,             // fbus address strobe
            ak_o ,             // fbus address acknowledge
            ai_o ,             // fbus address acknowledge inverse ds_o ,             // fbus data strobe
            dk_o ,             // fbus data acknowledge
            di_o ,             // fbus data acknowledge inverse et_o ,             // fbus end of tenure indication st_o ,             // fbus output status
            ca_o ,             // fbus output capability
```

```
//node_27ea0/cadence/tifb/dcc/b/fb_ctl.v                                    modified 09/02/92 11:14 AM:

\ad_wr_o* ,      // btl ad bus driver direction
                \cm_wr_o* ,      // btl cmd driver direction mast_sl_o ,      // latched st_i[2]
                mast_bs_o ,      // latched st_i[1]
                phase_o ,        // fbus transaction phase
                \tmr_clr* ,      // transaction timer clear
                split_resp ,     // split response
                st_reg    ,      // fbc state machine fb_master        // module is fbus master
                ) ;

//*********************************************************************************
// Define Parameters (optional)
//*********************************************************************************

// Not applicable

//*********************************************************************************
// Port Declarations
//********************************************************************************* input   as_i, ak_f_i, ai_f_i,
                ds_i, dk_i, di_i,dk_f_i, di_f_i,
                et_i ,\data_av_i* ,\sp_av_i* ,
                \sf_hit_i* ,pack_cap_i ,
                gr_i ,\f_ack_i* ,\fbc_err* ,
                par_rpt_en,adpar_err ,\hbc_err* ,
                \busi* ,restart ,\rst* ,\binit* ,\reset* ,\lock_f* ;

input [2:0] ca_i ,tr_mode_i ;

input [3:0] fadec_i ;

input [7:0] st_i ;

input [4:0] cm_i ;

output  \f_rd_o* ,\f_strb_o* ,
                as_o ,ak_o ,ai_o ,
                ds_o ,dk_o ,di_o , et_o,
                \selected_o* ,
                mast_sl_o ,mast_bs_o ,
                fb_master ,\tmr_clr* ,
                \ad_wr_o* ,\cm_wr_o* , split_resp ;

output [1:0] phase_o ;

output [2:0] ca_o ;

output [2:0] f_mode_o ;

output [4:0] st_reg;

output [7:0] st_o ;

//*********************************************************************************
// Net Assignments and Declarations
//*********************************************************************************

// Define internal wires wire    iv, wt, bc, sl, be, te, tflag, bs, eod, pack,
                \mode_en* ,disc, data_end, ed_end, \snoop_req* ,
                \fread* , partial, resp , part_l,
                \grant* ,sel_dec ,coh_cmd ,sel, \align* ,selct,
                pack_l ;

wire [2:0] cap  ,tr_mode_l, con_sigs, data_sigs ;
        wire [2:0] tr_mode_l2 ;

wire [4:0] conn_cm ;

wire [7:0] st_o ;
```

```
//node_27ea0/cadence/tifb/dcc/b/fb_ctl.v                           modified 09/02/92 11:14 A // *** Define internal registers for state machine reg [4:0] st_reg ;

// *** Define internal registers for assignments in asm reg     \f_strb_o* ,\tmr_clr* ,
                as_o, ak_o, ai_o, ds_o, dk_o, di_o ;

reg [1:0] phase_o ;

wire [4:0] #1 st_reg_d = st_reg ;
        wire [1:0] #2 phase_o_d = phase_o;

dff_rs_ce #(2)
                mst_dff (st_i[2:1],{mast_sl_o,mast_bs_o},
                        &{\reset* ,(st_reg != 5'b00000)},1'b1,1'b0,~&{fb_master, ai_f_1} ) ;

// *** Define command latch lch_rs #(5)
                con_cm (cm_i[4:0],conn_cm,&{\reset* ,(st_reg != 5'b0)},
                        1'b1,|{st_reg_d[4],~st_reg_d[3],
                                st_reg_d[2],st_reg_d[1],st_reg_d[0]}) , //      * Define status output latch st_out ({wt,iv,bc,sl,&{sl,(tr_mode_12 != 3'b001)}},{st_o[7],st_o[5],
                        st_o[3],st_o[2],busy},
                        &{\reset* ,|{st_reg[4],st_reg[3],st_reg[2],
                                st_reg[1],st_reg[0]}}, 1'b1,
                                ~&{~phase_o[1],phase_o[0],~fb_master}) ;

// *** Define capability latch lch_rs #(3)
                capbility (ca_i,cap,&{\reset* ,(st_reg != 5'b00000)},1'b1,ai_f_1) ;

// *** Define fb_master latch lch_rs #(1)
                master (gr_i ,fb_master,\reset* ,1'b1,
                        |{st_reg[4],st_reg[3],st_reg[2],st_reg[1],
                          st_reg[0]}) , algn (1'b1 ,\align* ,&{\binit* ,\busi* ) ,\rst* , 1'b0), slt (1'b1,sel,&{\reset* ,(st_reg != 5'b00000)},1'b1,~selct ), et_l (1'b1,et_o,&{\reset* ,~&{(phase_o == 2'b00),~restart,\lock_f* }},
                1'b1,~&{(phase_o_d != 2'b00),fb_master} ) ;

lch #(3)
                tr_m_12 (tr_mode_i ,tr_mode_12, ~&{(phase_o == 2'b00),as_i} );

lch_rs #(1)
                pakl (pack,pack_1,1'b1,&{\reset* ,(st_reg != 5'b00000)},
                        (phase_o != 2'b01) ) ;

// *** Define selected latch
//      selected_o* should be a continuous signal during the
//      fbus transaction which generates a one clock cycle
//      pulse inside the dpc
//      to latch address into addreg lch_rs #(1)
                slct   ( ~sel,\selected_o* ,1'b1,&{\reset* ,|{(phase_o != 2'b10),
                        conn_cm[4]},|{st_reg[4],st_reg[3],st_reg[2],st_reg[1],
                                st_reg[0]},|{\f_ack_i* ,ai_o}} ) , //      * Define bus_error latch (st_o[6])

b_err ( be,st_o[6],&{\reset* ,|{st_reg[4],st_reg[3],
                                st_reg[2],st_reg[1],st_reg[0]}},
                        1'b1,~&{ ~fb_master ,
                                |{(st_reg == 5'b11010),(st_reg == 5'b11100),
                                  (st_reg == 5'b01011),(st_reg == 5'b10101),
```

//node_27ea0/cadence/tifb/dcc/b/fb_ctl.v                                    modified 09/02/92 11:14 AM

```verilog
                           {st_reg == 5'b10110},(st_reg == 5'b01111}}}) , //      * Define trans_error latch (st_o[0])

t_err ( te,st_o[0],&{\reset* ,|{~st_reg[4],~st_reg[3],
                                           st_reg[2],st_reg[1],st_reg[0]}},
                    1'b1,~|{ &{phase_o[1],phase_o[0],~fb_master},
                             &{phase_o[1],~phase_o[0],~fb_master}}) , //      * Define end_of_data latch (st_o[1])

e_data (eod,ed,&{\reset* ,|{st_reg[4],st_reg[3],
                                        st_reg[2],st_reg[1],st_reg[0]}},
                    1'b1,~&{phase_o[1],phase_o[0],~fb_master}) , //      * Define transaction_flag latch (st_o[4])

t_flag (tflag,st_o[4],&{\reset* ,|{st_reg[4],st_reg[3],
                                               st_reg[2],st_reg[1],st_reg[0]}},
                    1'b1,~&{phase_o[1],phase_o[0],~fb_master}) ;

// *** Define f_mode and f_rd signal latches lch #(3)
              con_ph ({partial,resp,\fread* },
                      con_sigs,~ai_f_1) ;
        lch_rs #(3)
              data_ph(con_sigs,data_sigs,
                      &{\reset* ,
                        |{st_reg[4],st_reg[3],st_reg[2],st_reg[1],st_reg[0]}},
                      1'b1,~&{~ai_f_1,|{fb_master,sl}}) ;

// *** Define tr_mode latches for disc and data_end lch_rs #(3)
              t_mode (tr_mode_i,tr_mode_l,&{\reset* ,
                      |{st_reg[4],st_reg[3],st_reg[2],st_reg[1],st_reg[0]}},
                      1'b1,\mode_en* ) ;

//******************************************************************************
// Pre-defined Module Instantiations
//******************************************************************************

//******************************************************************************
// Gate and Structural Declarations
//******************************************************************************

// * Define tri-state control for ca_o
        assign
        // dpc never initiates a split (cap(2) = 0)
        // dpc responds with packet capable if space/data is
        //    available and mode bit is set
        // dpc only recognizes one transfer speed (cap[0] = 0)
              ca_o = {1'b0,~pack_1,1'b0) ;

// * Define qualified grant with released et and restart assign
              \grant* = |{~gr_i ,&{et_i,~restart,\lock_f* }} ;

// * Define output status lines

// intervention - when coherent trans. and hit in sc or
        // via snoop filter
        assign
              coh_cmd = |{&{conn_cm[3],~conn_cm[2],~conn_cm[1]},
                          &{conn_cm[3],~conn_cm[2],conn_cm[0]}}, iv = &{coh_cmd,
                     |{~|{\sf_hit_i* ,~tr_mode_i[2],~tr_mode_i[1] },
                        &{~fadec_i[3],fadec_i[2],~fadec_i[1],fadec_i[0]}}} , // wait and broadcast not asserted by fbc wt = 1'b0 ,
```

//node_27es0/cadence/tifb/dcc/b/fb_ctl.v                                    modified 09/02/92 11:14 AM.

```
                bc = |{{(fadec_i == 4'b0100),(fadec_i == 4'b1110),
                       (fadec_i == 4'b1111)}} , // selected - hbc can assert busy to prevent fbc from being
//            selected e.g. when hbus writes to dpc csr sel_dec = |{ &{~fadec_i[3],~fadec_i[2],fadec_i[0]},
                             &{~fadec_i[3],~fadec_i[2],fadec_i[1]},
                             &{~fadec_i[3],fadec_i[2],~fadec_i[1],~fadec_i[0]},
                             &{~fadec_i[3],fadec_i[2],fadec_i[1],~fadec_i[0],
                                 |{(conn_cm[3:0] == 4'b1111),
                                   (conn_cm[3:0] == 4'b1100)}},
                             &{fadec_i[3],~fadec_i[1],fadec_i[0]},
                             &{fadec_i[3],~fadec_i[2],~fadec_i[1]},
                             &{fadec_i[3],fadec_i[2],fadec_i[1]}}, sl = |{sel_dec,iv}, // beat_error results from dpc parity error or hbc error
// during connection be = &{par_rpt_en,|{adpar_err,&{~\hbc_err* ,sl}}} , // transaction_error results from beat_error and continues
// thru disconnection te = st_o[6] , // transaction_flag is signalled by hbc via tr_mode during
// data phase tflag = &{tr_mode_i[2],tr_mode_i[0]} , // end_of_data status from fadec in compelled and packet
// mode to check for boundary overflow eod = |{ &{st_o[2],~fadec_i[3],~fadec_i[2],~fadec_i[1],
                           ~fadec_i[0]}, &{st_o[2],~cap[1],
                           ~fadec_i[3],~fadec_i[2],~fadec_i[1],fadec_i[0]} } , // st_o[1] bs during connection and disconnect phase and
// ed during data st_o[1] = |{busy,ed} , // Define ca_o[1] for packet/compelled capability as slave pack = |{&{pack_cap_i,|{(fadec_i == 4'b1001),(fadec_i == 4'b0000),
                          (fadec_i == 4'b0010) ,(fadec_i == 4'b0101),
                          (fadec_i == 4'b0110) ,(fadec_i == 4'b1000)}},
                          ~sl}, // Define mode_en* latch enable for tr_mode to determine
// f_mode during disconnet phase and data_end during
// data phase \mode_en* = ~|{ (st_reg == 5'b11111),
                                (st_reg == 5'b11110),
                                (st_reg == 5'b00110)} , // Define f_mode disc input
// hbc signals disconnect during last data transfer and fbc
// waits til data acknowledge before sending disc disc = &{fb_master,phase_o[1],~phase_o[0]} , // Define data_end indication from hbc
// hbc signals disconnect during last data transfer data_end = &{fb_master,~tr_mode_i[2],tr_mode_i[1],
                             ~tr_mode_i[0]} , // Define ed_end indication from fbus slave
// fbus slave signals ed during last data acknowledge ed_end = &{fb_master,st_i[1]} ,
```

//node_27ea0/cadance/tifb/dcc/b/fb_ctl.v                                modified 09/02/92  11:14 AM.

// Define snoop_req to hbus

\snoop_req* = ~&(coh_cmd,~\sf_hit_i* ) ,

// Define sel to latch faddr into addreg
// sel is asserted for snoop requests on hbus selct = &| &(\grant* ,~et_o),                    // selct will be
                      (tr_mode_i == 3'b001) , ~st_o[1],      // active when hbc
                    |(sel_dec, &(coh_cmd ,                   // is not busy
                      |(&(~fadec_i[3],fadec_i[2],~fadec_i[1],fadec_i[0]),
                        ~\snoop_req* )}}} , // Define addr_only command decode
// addr_only commands currently not defined since they conflict
// with read/write unlocked //          addr_only = ~|(conn_cm[3],conn_cm[2],conn_cm[1]) , // Define fread* signal to dpc to indicate direction of fbus
// transaction to fifo \fread* = &(~^(fb_master,conn_cm[4]},
                       |(~^(st_i[5],st_o[5]},fb_master}} , // Define decoded signals for f_mode encoding, i.e. partial and
// resp for partial and coherent response partial = &(~conn_cm[3],~conn_cm[2],conn_cm[1]) , resp = &(conn_cm[3],conn_cm[2],|(&(conn_cm[1],conn_cm[0]),
                                            ~|(conn_cm[1],conn_cm[0])}} , //    * Define latched versions of partial,response, and capability (part_l,split_resp,\f_rd_o* ) = data_sigs , // Define f_mode encoding from fbc to dpc f_mode_o = fmod_enc(cap[2],cap[1],disc,split_resp,
                       part_l) , // Define btl ad and cm bus driver direction controls \ad_wr_o* = ~|(&((phase_o == 2'b11),
                         |(&(fb_master,conn_cm[4]},
                         &(~fb_master,~conn_cm[4],|(st_o[5],~st_i[5]},
                           ~&(partial,(st_reg == 5'b01011)}}}},
                         &(fb_master,partial,
                           (st_reg != 5'b01110),(st_reg != 5'b00110)},
                         &(fb_master,|((phase_o == 2'b01),
                           (phase_o == 2'b10)}} ) , \cm_wr_o* = &(\grant* ,~et_o) ;

//*********************************************************************
// Procedural Assignments
//*********************************************************************

// Define tr_mode_i transfer encoding from hbc
//      tr_mode_i => 000  -> normal transfer
//                   001     hbc idle
//                   010     disconnect master
//                   011     reserved
//                   100     snoop miss (shared not asserted)
//                   101     snoop miss (shared asserted)
//                   110     snoop hit (shared not asserted)
//                   111     snoop hit (shared asserted)

// Define asynchronous state machine for connection,data and
// disconnection phases on Futurebus+

//      phase == 00 -> idle
//               01 -> connection

```
//node_27aa0/cadence/tifb/dcc/b/fb_ctl.v                              modified 09/02/92 11:14 AM
//              10 -> data
//              11 -> disconnect // Initialize state register on reset always @(negedge \reset* )
                begin : reset
                        st_reg = 5'b00000 ;
                end always
                begin : asm case ({fb_master,st_reg})

6'bx_00000,
                                6'b1_00000,
                                6'b0_00000 :
                                        begin : idle             // idle state
                                                phase_o = 2'b00 ;
                                                \f_strb_o* = 1'b1 ;
                                                as_o = 1'b0 ;
                                                ak_o = 1'b0 ;
                                                ds_o = 1'b0 ;
                                                dk_o = 1'b0 ;
                                                di_o = 1'b0 ;
                                                \tmr_clr* = 1'b0 ;

ai_o = 1'b0 ;    // initialize ai_o wait (! \align* )

ai_o = 1'b1 ;

wait ( ! \grant* || as_i ) ;
                                                if (as_i == 1'b1)
                                                   wait (fb_master == 1'b0) ;
                                                else
                                                   wait (tr_mode_i != 3'b001) ; // wait for dpc not idle st_reg = 5'b01000 ;

end

6'b1_01000,
                                6'b0_01000 :
                                        begin : connection_begin   // begin conn. phase
                                                if (fb_master == 1'b1)
                                                   begin
                                                        wait (tr_mode_i != 3'b001) ;
                                                        \f_strb_o* = 1'b0 ;    // enable address
                                                        phase_o = 2'b01 ;
                                                        \tmr_clr* = 1'b1 ;     // start timer
                                                   end
                                                else
                                                   begin
                                                        \f_strb_o* = 1'b0 ;    // latch address
                                                        ak_o = 1'b1 ;
                                                   end wait (! \f_ack_i* ) ;    // addr enabled or decoded
                                                st_reg = 5'b11000 ;
                                        end 6'b1_11000,
                                6'b0_11000 :
                                        begin : connection_end      // end conn. phase
                                                if (fb_master == 1'b1)
                                                   begin
                                                        as_o = 1'b1 ;
                                                        ak_o = 1'b1 ;
                                                        ai_o = 1'b0 ;
                                                        wait (! ai_f_i || ! \fbc_err* ) ;
                                                                        // slave acknowledge
                                                                        // or trans. time_out
                                                   end
                                                else
                                                        phase_o = 2'b01 ;
                                                        // change of state must be delayed
                                                        // until fadec and conn_cmd decode
```

```
                        // logic has time to evaluate
            st_reg = 5'b11010 ;
        end 6'b1_11010,
6'b0_11010 :
    begin : status_capability        // stat cap for slave
        if (fb_master == 1'b1)    // fbus master
            begin
                if (data_end || ed_end ||
                    &(~conn_cm[4],cap[2]) ||// cap[2] = split
                    st_i[7] || st_i[1] ||   // st_i[7]= wait
                    ! \fbc_err* ||          // st_i[1]= busy
                                            // fbc_err* = time
                    st_i[6] || ~st_i[2])    //          out
                                            // st_i[6] = be
                                            // st_i[2] = sl
                    begin
                        phase_o = 2'b10 ;   // signal disc
                        wait (\f_ack_i* ) ; // wait for
                                            // disc ack
                        st_reg = 5'b10010 ; // go to disc
                    end else begin phase_o = 2'b11 ;// indicate data phase if (partial) begin
                        wait (\f_ack_i* ) ; // wait for byte lanes
                                            // to be put on bus
                        st_reg = 5'b01010 ; // go to partial
                                            //    state
                    end else begin
                        if (cap[1] == 1'b0)       // pack mode
                            \f_strb_o* = 1'b1 ;   // assert
                                                  // f_strb*
                                                  // for pack if (conn_cm[4] == 1'b1)   // fbus write
                            wait (! \data_av_i* ) ;
                        else                      // fbus read
                            wait (! \sp_av_i* ) ;

st_reg = 5'b11011 ;
                    end
                end
            end else                        // fbus slave
            begin
                if (sel == 1'b1) begin
                    if (\snoop_req* == 1'b0) // snoop request
                        wait ( tr_mode_i[2] ) ;  // get tr_mode
                    if ((st_o[2] == 1'b1) ||
                        (tr_mode_i == 3'b111) ||
                        (tr_mode_i == 3'b110)) // selected slave
                        di_o = 1'b1 ;       // assert di for
                                            // later use
                    ai_o = 1'b0 ;           // deassert ai w/ status
                    wait (! ai_f_i) ;       // get cap/st from
                                            // others
                    if (partial)
                        st_reg = 5'b01010 ; // go to partial st.
                    else
                        st_reg = 5'b11110 ;
                end
                else
                    begin
                        ai_o = 1'b0 ;       // deassert ai w/ status
                        wait (! ai_f_i) ;   // get cap/st from
                                            // others
                        st_reg = 5'b11110 ; // unselected
                    end
            end
    end // *** fbus master
```

//node_27ea0/cadence/tifb/dcc/b/fb_ctl.v                                    modified 09/02/92 11:14 AM

```
        6'b1_11011 :
          begin : data_odd_begin            // fbus master
              if (cap[1] == 1'b1)           // begin odd data phase
                  \f_strb_o* = 1'b1 ;       // assert f_strb for comp if ((conn_cm[4] == 1'b0 ) ||
                  (cap[1] == 1'b0))
                  ds_o = 1'b1 ;             // do not assert ds for
                                            // compel writes wait (\f_ack_i* ) ;

st_reg = 5'b11111 ;
          end

6'b1_11111 :                        // fbus master
          begin : data_odd
              ds_o = 1'b1 ;                 // assert ds for compel wr if (st_1[5] || st_1[3])
                  wait (! di_f_1 ) ;        // sample filtered
                                            // strobes
              else
                  wait ( ! di_1 ) ;         // sample un-filter
                                            // strobes st_reg = 5'b10111 ;
          end 6'b1_10111 :
          begin : end_test                  // test for end
              if (data_end || ed_end || !\fbc_err* )
                  begin
                          phase_o = 2'b10 ; // signal disc
                          wait (! \f_ack_i* ) ;// wait for disc
                                            // acknowledge
                          st_reg = 5'b10011 ; // go to disc
                                            // via null
                  end else begin
                  if (cap[1] == 1'b0)       // packet mode
                      \f_strb_o* = 1'b0 ;   // assert f_strb*
                                            // for pack if (conn_cm[4] == 1'b1)   // fbus write
                      wait (! \data_av_i* ) ;
                  else
                      wait (! \sp_av_i* ) ;

st_reg = 5'b10110 ;
              end end
        6'b1_10110 :
          begin : data_even_begin           // fbus master
              if (cap[1] == 1'b1)           // begin even data phase
                  \f_strb_o* = 1'b0 ;       // compelled mode if ((conn_cm[4] == 1'b0 ) ||
                  (cap[1] == 1'b0))
                  ds_o = 1'b0 ;             // do not assert ds for
                                            // compel writes wait (! \f_ack_i* ) ;

st_reg = 5'b11110 ;
          end

6'b1_11110 :                        // fbus master
          begin : data_even
              ds_o = 1'b0 ;                 // assert ds for compel wr if (st_1[5] || st_1[3])
                  wait (! dk_f_1 ) ;        // sample filtered
                                            // strobes
              else
                  wait (! dk_1 ) ;          // sample un-filter
                                            // strobes st_reg = 5'b11010 ;
```

//node_27ea0/cadence/tifb/dcc/b/fb_ctl.v                                          modified 09/02/92  11:14 AS

```
                end

6'b1_01010 :                        // fbus master
          begin : partial_begin_mstr         // begin partial phase ds_o = 1'b1 ;               // byte lane enables if (st_i[3])
                   wait (! di_f_i) ;
                else
                   wait (! di_i ) ;         // sample strobe if (conn_cm[4] == 1'b1)     // fbus write
                   wait (! \data_av_i* ) ;
                else                         // fbus read
                   wait (! \sp_av_i* ) ;

st_reg = 5'b01110 ;
          end

6'b1_01110 :                        // fbus master
          begin : partial_data_mstr          // partial data transfer
                \f_strb_o* = 1'b1 ;

if (conn_cm[4] == 1'b0 || cap[1] == 1'b0)
                   ds_o = 1'b0 ;            // do not assert ds for
                                             // compel writes wait (\f_ack_i* ) ;

st_reg = 5'b00110 ;
          end

6'b1_00110 :                        // fbus master
          begin : partial_end                // end partial phase
                ds_o = 1'b0 ;               // fbus parital write if (st_i[3])
                   wait (! dk_f_i) ;
                else
                   wait (! dk_i ) ;

phase_o = 2'b10 ;           // signal disc
                wait (! \f_ack_i* );        // wait for disc ack
                st_reg = 5'b00010 ;         // go to disc
                                             // via null
          end 6'b1_10011 :                        // fbus master
          begin : null0                      // null to disc
                st_reg = 5'b10010 ;
          end 6'b1_00010 :                        // fbus master
          begin : null1                      // null to disc
                st_reg = 5'b10010 ;
          end 6'b1_10010 :                        // fbus master
          begin : disc_mstr                  // disconnect phase as_o = 1'b0 ;               // deassert addr strobe
                if (! ds_o)                  // rev2 should delete this
                   ak_o = 1'b0 ;            // deassert addr ack strb and this
                ai_o = 1'b1 ;               // assert addr inv strobe
                \f_strb_o* = 1'b1 ;

// treat packet and compelled the same
                        // for release of ds+ even though packet
                        // does not have to wait for di/dk if (st_i[5] || st_i[3])
                   wait (dk_f_i == 1'b0 && di_f_i == 1'b0) ;
                else
                   wait (dk_i == 1'b0 && di_i == 1'b0) ;

ds_o = 1'b0 ;               // deassert data strobe if
                                             // necessary
                ak_o = 1'b0 ;               // deassert addr ack strb
```

//node_27ea0/cadence/tifb/dcc/b/fb_ctl.v                                  modified 09/02/92 11:14 AM

```
                        wait (! ak_f_i || !\fbc_err* ) ;
                                                // wait for slave to disc
                                                // or time_out
                        st_reg = 5'b10000 ;     // go to idle
                                                // via null
                end 6'b1_10000 :                            // fbus master
                begin : null3                   // null to idle
                        if (\lock_f* == 1'b0)   // to avoid busy and sel are not asserted
                        begin                   // when in state 1a, because hbus is moving
                                                // data from fifo to hbus(multiple independent
                                                // fbus write transaction)

phase_o = 2'b00 ;       // signal idle
                                wait(tr_mode_i == 3'b001) ; // wait for dpc idle
                        end st_reg = 5'b00000 ;
                end // *** fbus slave 6'b0_11110 :                            // fbus slave
                begin : begin_first_odd         // begin odd data phase if ((st_o[2] == 1'b0 ) ||
                            (st_o[1] == 1'b1 )) // unselected module
                                                // or busy module
                        begin
                          wait (! as_i) ;
                          phase_o = 2'b10 ;     // begin disconnect
                          st_reg = 5'b01110 ;   // go to disc
                                                // via null
                        end else begin              // module selected if (conn_cm[4] == 1'b0 &&
                               ~&{~st_o[5],st_i[5]}) begin
                                                // fbus read w/o
                                                // intervention
                                                // or read w broadcast
                                wait (ds_i || ~as_i) ;
                                if (as_i == 1'b0) begin
                                   phase_o = 2'b10 ;
                                   st_reg = 5'b01110 ;  // go to disc
                                                        // via null
                                end else begin
                                   phase_o = 2'b11 ;    // data phase
                                   if (~|{st_i[3],st_o[5]})
                                   dk_o = 1'b1 ;        // assert dk @ ds
                                   wait (! \data_av_i* || ~as_i ) ; // not needed,
                                end                                 // save gates
                           end
                           else                         // fbus write or
                                                        // read w/ interv
                                wait (! \sp_av_i* || ~as_i ) ; // not needed,
                                                               // save gates
                           st_reg = 5'b11100 ;
                        end end
        6'b0_11100 :                            // fbus slave
                begin : first_odd_data          // odd data phase \f_strb_o* = 1'b1 ;

wait (ds_i || ~as_i) ;

if (as_i == 1'b0) begin
                          phase_o = 2'b10 ;
                          st_reg = 5'b01100 ;   // go to disc
                                                // via null
                        end else begin
```

```
//node_27as0/cadence/t1fb/dcc/b/fb_ctl.v                           modified 09/02/92 11:14 AM.

phase_o = 2'b11 ;        // data phase
                    if ( ( ! st_i[5] && |{conn_cm[4],~st_i[3]} )
                                             // if not inter.
                                             // and not read
                                             // broadcast
                        dk_o = 1'b1 ;        // assert dk strobe @ ds else if (&{st_i[5],~st_o[5]})
                       begin
                          wait (dk_i ) ;     // source asserts
                                             //  dk first
                          dk_o = 1'b1 ;      // assert dk strobe @ dk
                       end wait (\f_ack_i* ) ;

st_reg = 5'b10100 ;
                end
           end

6'b0_10100 :                           // fbus slave
          begin : odd_data_test              // test for ED
                if (st_o[5] || st_i[3])
                    dk_o = 1'b1 ;

if (&{~conn_cm[4],st_o[5]} ||
                     ~|{conn_cm[4],st_i[5]})
                    di_o = 1'b0 ;            // acknowledge data
                if (conn_cm[4] == 1'b0 &&
                    ~&{~st_o[5],st_i[5]}) begin
                                             // fbus read w/o
                                             // intervention
                                             // or read w broadcast
                    wait ( ~ds_i || ~as_i) ;
                    if (as_i == 1'b0) begin
                       phase_o = 2'b10 ;
                       st_reg = 5'b00100 ;   // go to disc
                                             // via null
                       end
                    else begin
                       if (~|{st_i[3],st_o[5]})
                          di_o = 1'b1 ;      // assert di @ ds
                       wait (! \data_av_i* || ~as_i ) ;
                       st_reg = 5'b10101 ;
                       end
                    end
                else begin                   // fbus write or
                                             // read w/ interv
                    wait (! \sp_av_i* || ~as_i ) ;
                    st_reg = 5'b10101 ;
                    end
          end 6'b0_10101 :                           // fbus slave
          begin : even_data                  // begin even data phase if (~&{~conn_cm[4],st_o[5]} &&
                  |{conn_cm[4],st_i[5]})
                  di_o = 1'b0 ;              // acknowledge data \f_strb_o* = 1'b0 ;

wait (~ds_i || ~as_i) ;

if (as_i == 1'b0) begin
                 phase_o = 2'b10 ;
                 st_reg = 5'b00101 ;         // go to disc
                                             // via null
                 end else begin if ( ( ! st_i[5] && |{conn_cm[4],~st_i[3]} )
                    begin
                                             // if not inter.
                                             // and not read
                                             // broadcast
                       di_o = 1'b1 ;         // assert di strobe @ ds
                    end
```

//node_27ea0/cadence/t1fb/dcc/b/fb_ctl.v                                       modified 09/02/92 11:14 AM

```verilog
            else if (&{st_i[5],~st_o[5]})
               begin
                   wait (di_i ) ;     // source asserts
                                      // di first
                   di_o = 1'b1 ;      // assert di strobe @ di
               end wait (! \f_ack_i* ) ;
            st_reg = 5'b10111 ;

end end

6'b0_10111 :                        // fbus slave
     begin : even_data_test           // even data phase
        if (st_o[5] || st_i[3])
            di_o = 1'b1 ;

if (&{~conn_cm[4],st_o[5]} ||
            ~|{conn_cm[4],st_i[5]})
            dk_o = 1'b0 ;     //  acknowledge data
        if (conn_cm[4] == 1'b0 &&
            ~&{~st_o[5],st_i[5]}) begin
                                      // fbus read w/o
                                      // intervention
                                      // or read w broadcast
            wait ( ds_i || ~as_i ) ;
            if (as_i == 1'b0) begin
               phase_o = 2'b10 ;
               st_reg = 5'b00111 ;    // go to disc
                                      // via null
            end
            else begin
               if (~|{st_i[3],st_o[5]})
                  dk_o = 1'b1 ;       // assert dk strobe
                                      // @ ds
               wait (! \data_av_i* || ~as_i ) ;
               st_reg = 5'b10110 ;
               end
            end
         else begin                   // fbus write
                                      // or read w/ interv
            wait (! \sp_av_i* || ~as_i ) ;
            st_reg = 5'b10110 ;
            end
     end 6'b0_10110 :                        // fbus slave
     begin : odd_data                 // begin odd data phase if (~&{~conn_cm[4],st_o[5]} &&
            |{conn_cm[4],st_i[5]})
           dk_o = 1'b0 ;              // acknowledge data \f_strb_o* = 1'b1 ;

wait (ds_i || ~as_i) ;

if (as_i == 1'b0) begin
           phase_o = 2'b10 ;
           st_reg = 5'b00110 ;
           end else begin if ( ! st_i[5] && |{conn_cm[4],~st_i[3]} )
              begin
                  wait (ds_i ) ;      // if not inter.
                                      // and not read
                                      // broadcast
                  dk_o = 1'b1 ;       // assert dk strobe @ ds
              end else if (&{st_i[5],~st_o[5]})
              begin
                  wait (dk_i ) ;      // source asserts
                                      // dk first
                  dk_o = 1'b1 ;       // assert dk strobe @ dk
              end
```

```
                    wait ( \f_ack_i* ) ;
                    st_reg = 5'b10100 ;        // goto odd_data_test
                end
            end 6'b0_01010 :                        // fbus slave
              begin : partial_begin_slv         // begin slave partial
                  if (st_o[2] == 1'b0)
                      begin
                          wait (! as_i) ;
                          phase_o = 2'b10 ;
                          st_reg = 5'b01110 ;
                      end
                  else
                      begin
                          wait (ds_i || ~as_i) ;
                          if (as_i == 1'b0) begin
                             phase_o = 2'b10 ;
                             st_reg = 5'b01110 ;    // go to disc
                                                    // via null
                             end
                          else begin
                             phase_o = 2'b11 ;      // start data phase
                             st_reg = 5'b01011 ;
                             end
                      end
              end 6'b0_01011 :
              begin : byte_lanes
                  dk_o = 1'b1 ;             // assert dk @ ds di_o = 1'b0 ;             // signal capture of
                                            // byte lanes if (conn_cm[4] || &{~conn_cm[4],st_i[3],st_o[3]})
                                                    // fbus write
                                                    // or brcst rd
                      wait (! \sp_av_i* ) ;
                  else
                    begin
                      if (! st_i[3]) begin
                         wait (! ds_i ) ;           // master asserts ds
                         di_o = 1'b1 ;              // assert di @ ds
                         end
                      wait (! \data_av_i* ) ;
                    end st_reg = 5'b01111 ;
              end 6'b0_01111 :                        // fbus slave
              begin : partial_data_slv          // partial data transfer
                  \f_strb_o* = 1'b1 ;

if ( &{~conn_cm[4],st_i[3],st_o[3]} )  // read broad
                                                         // cast
                    begin
                        wait (di_i ) ;        // source asserts di
                                              // first
                        di_o = 1'b1 ;         // assert di strobe @ di
                    end
                  else if (! st_i[3]) begin
                      wait (! ds_i ) ;        // master asserts ds
                      di_o = 1'b1 ;           // assert di @ ds
                      end wait ( \f_ack_i* ) ;
                  if ( &{~conn_cm[4],st_i[3],~st_o[3]})  // source
                                                         //brcst rd
                      di_o = 1'b1 ;

dk_o = 1'b0 ;             // data acknowledge wait (! as_i) ;
                  phase_o = 2'b10 ;                 // disc phase
                  st_reg = 5'b01110 ;       // go to disc
              end 6'b0_00110 :                        // fbus slave
              begin : disc_slv                  // slave disconnect
```

//node_27ea0/cadence/t1fb/dcc/b/fb_ctl.v                                          modified 09/02/92 11:14 AM

```verilog
                        ai_o = 1'b1 ;           // assert ai @ as release
                        di_o = 1'b0 ;           // release di @ as release
                        dk_o = 1'b0 ;           // release dk @ as release
                        \f_strb_o* = 1'b1 ;

wait (! ds_i) ;

ak_o = 1'b0 ;           // release ak -> end trans st_reg = 5'b00010 ;     // return to idle state
                    end 6'b0_01110 :                    // fbus slave
                    begin : null4               // null to disc
                        st_reg = 5'b00110 ;
                    end 6'b0_01100 :                    // fbus slave
                    begin : null5               // null to disc
                        st_reg = 5'b00100 ;
                    end 6'b0_00101 :                    // fbus slave
                    begin : null6               // null to disc
                        st_reg = 5'b00100 ;
                    end 6'b0_00100 :                    // fbus slave
                    begin : null7               // null to disc
                        \f_strb_o* = 1'b1 ;
                        st_reg = 5'b00110 ;
                    end 6'b0_00111 :                    // fbus slave
                    begin : null8               // null to disc
                        st_reg = 5'b00110 ;
                    end 6'b0_00010 :                    // fbus slave
                    begin : null9               // null to idle
                        st_reg = 5'b00000 ;
                    end default
                    begin        // default return to idle
                        #5 st_reg = 5'b00000 ;
                    end endcase

2 ;                    // wait at least 1 tick(s) in each
                                // state to aid debugging
    end //*********************************************************************
// Task and Function Definitions
//********************************************************************* function [2:0] fmod_enc ;
        input cap2, cap1, disc, split_resp, part_1 ;

begin
            casez ({cap2,cap1,split_resp,disc,part_1})
                5'b?0000 : fmod_enc = 3'b001 ;
                5'b?1000 : fmod_enc = 3'b000 ;
                5'b0?110 : fmod_enc = 3'b111 ;
                5'b1?010 : fmod_enc = 3'b110 ;
                5'b0?01? : fmod_enc = 3'b011 ;
                5'b01001 : fmod_enc = 3'b010 ;
                default   fmod_enc = 3'b001 ;
            endcase
        end
    endfunction `endprotect
```

```
//node_27ea0/cadence/t1fb/dcc/b/fb_ctl.v                    modified 09/02/92 11:14 AM //*********************************************************************************
// End of Model
//*********************************************************************************
endmodule
```

//node_27ea0/cadence/tifb/dcc/b/dcc_rst.v                              modified 03/30/92 4:59 PM

```verilog
//*********************************************************************
//
//      Model Name   : dcc_rst.v
//      Revision     : $Revision: 1.5 $
//      Date         : $Date: 92/03/30 16:58:42 $
//      Author       : Steve Tsang
//      Description  : Reset module for dcc/pp1/ppc
//
//*********************************************************************

//*********************************************************************
// Module Definition
//*********************************************************************
`protect module dcc_rst
        (
        // Inputs - from I/O pads ar ,                    // arbitration synchronization
                as ,                    // address synchronization
                ai ,                    // address acknowledge inverse
                ref_clk ,               // reference 40MHz crystal clock
                \rst* ,                 // power up module reset // Inputs - from internal CSR block & gletch filter block air3 ,                  // CSR counter bits [31:0]
                air2 ,                  // CSR configuration bits [3:0]
                st_reset ,              // 1212 CSR  CSR12 - reset_start
                re_f ,                  // fbus reset filtered
                aq_f ,                  // arbitration sync filtered // Outputs - to I/O pads \binit_o* ,             // bus initialization - binit
                \sysrst_o* ,            // system reset       - sysrst
                reset_o ,               // fbus reset         - re+
                \busi_o* ,              // bus idle           - busi // Outputs - to internal blocks count_en ,              // counter enable to CSR [2:0]
                \align_occ* ,           // alignment occurred
                \st_ack* ,              // reset start local reset done ack
                \reset_fb* ,            // internal reset - fb related
                \reset_hb*              // internal reset - hb related

);

//*********************************************************************
// Define Parameters (optional)
//*********************************************************************

// Not Applicable

//*********************************************************************
// Port Declarations
//********************************************************************* input  ar , as , ai , ref_clk , \rst* , st_reset , re_f , aq_f ;
        input  [31:0] air3 ;
        input  [3:0]  air2 ;

output \binit_o* , \sysrst_o* , reset_o , \busi_o* ;
        output \align_occ* , \st_ack* , \reset_fb* , \reset_hb* ;
        output [2:0] count_en ;

//*********************************************************************
// Net Assignments and Declarations
//*********************************************************************

// Define inter-module nets
```

```
//node_27ea0/cadence/tifb/dcc/b/dcc_rst.v                                modified 03/30/92 4:59 Pl.

wire align   = air2[0] ,      // CSR configuration bit - align
             binit   = air2[1] ,      // CSR configuration bit - bus_init
             sysrst  = air2[2] ,      // CSR configuration bit - sys_reset
             alnwt   = air2[3] ;      // CSR configuration bit - align_wait // Define internal wire nets wire cnt130 , cnt50 , cnt8 , cnt3 , cntx , cnt1 ,
             align_en , binit_en , sysrst_en , strst_en ,
             align_c , binit_c , sysrst_c , strst_c ;

wire [15:0] sm_ins ;
        wire [4:0]  n_st , ex_outs ;
        wire [3:0]  sm_outs , req_en ;
        wire [2:0]  count ;

// Define internal reg nets reg  ref1 , ref2 , aqf1 , aqf2 , ar1 , ar2 , as1 , as2 , ai1 , ai2 ;
        reg  alnwt1 , alnwt2 , align_req , binit_req , sysrst_req , strst_req ;

reg  [4:0] p_st , ex_outs_r ;
        reg  [3:0] sm_outs_r , req_r ;

// Define register/latch elements

//      * synchronization flip-flops for asynchronization inputs always @ ( posedge ref_clk ) begin
          alnwt1 = alnwt ;
        end always @ ( posedge ref_clk ) begin
          alnwt2 = alnwt1 ;
        end always @ ( posedge ref_clk or negedge \rst* ) begin
          if ( ! \rst* ) #1 ref1 = 1'b0 ;
          else #1 ref1 = re_f ; end always @ ( posedge ref_clk or negedge \rst* ) begin
          if ( ! \rst* ) #1 ref2 = 1'b0 ;
          else #1 ref2 = ref1 ; end always @ ( posedge ref_clk or negedge \rst* ) begin
          if ( ! \rst* ) #1 aqf1 = 1'b0 ;
          else #1 aqf1 = aq_f ; end always @ ( posedge ref_clk or negedge \rst* ) begin
          if ( ! \rst* ) #1 aqf2 = 1'b0 ;
          else #1 aqf2 = aqf1 ; end always @ ( posedge ref_clk or negedge \rst* ) begin
          if ( ! \rst* ) #1 ar1 = 1'b0 ;
          else #1 ar1 = ar ; end always @ ( posedge ref_clk or negedge \rst* ) begin
          if ( ! \rst* ) #1 ar2 = 1'b0 ;
          else #1 ar2 = ar1 ; end always @ ( posedge ref_clk or negedge \rst* ) begin
          if ( ! \rst* ) #1 as1 = 1'b0 ;
          else #1 as1 = as ; end always @ ( posedge ref_clk or negedge \rst* ) begin
          if ( ! \rst* ) #1 as2 = 1'b0 ;
          else #1 as2 = as1 ; end always @ ( posedge ref_clk or negedge \rst* ) begin
          if ( ! \rst* ) #1 ai1 = 1'b0 ;
          else #1 ai1 = ai ; end always @ ( posedge ref_clk or negedge \rst* ) begin
          if ( ! \rst* ) #1 ai2 = 1'b0 ;
          else #1 ai2 = ai1 ; end //      * state registers/state machine
```

//node_27ea0/cadence/tifb/dcc/b/dcc_rst.v                                              modified 03/30/92 4:59 PM

```
        always @ ( posedge ref_clk or negedge \rst* ) begin
          if ( ! \rst* ) #1 req_r = 4'b1111 ;
          else #1 req_r = req_en ; end always @ ( posedge ref_clk or negedge \rst* ) begin
          if ( ! \rst* ) #1 p_st = 5'b00000 ;
          else #1 p_st = n_st ; end always @ ( posedge ref_clk or negedge \rst* ) begin
          if ( ! \rst* ) #1 sm_outs_r = 4'b1101 ;
          else #1 sm_outs_r = sm_outs ; end always @ ( posedge ref_clk or negedge \rst* ) begin
          if ( ! \rst* ) #1 ex_outs_r = 5'b00011 ;
          else #1 ex_outs_r = ex_outs ; end //      * state registers/latches/internal signals always @ ( posedge align or negedge align_c ) begin
          if ( ! align_c ) #1 align_req = 1'b0 ;
          else #1 align_req = 1'b1 ; end always @ ( posedge binit or negedge binit_c ) begin
          if ( ! binit_c ) #1 binit_req = 1'b0 ;
          else #1 binit_req = 1'b1 ; end always @ ( posedge sysrst or negedge sysrst_c ) begin
          if ( ! sysrst_c ) #1 sysrst_req = 1'b0 ;
          else #1 sysrst_req = 1'b1 ; end always @ ( posedge st_reset or negedge strst_c ) begin
          if ( ! strst_c ) #1 strst_req = 1'b0 ;
          else #1 strst_req = 1'b1 ; end //*********************************************************************
// Pre-defined Module Instantiations
//*********************************************************************

//   air3 counter in CSR block is a 32-bit counter
//   air3[24:0] counts with clock when enabled by count[0] - normal
//   air3[31:25] counts with clock & air3[15:0] == ffff when enabled by count[1]
//   air3[31:25] counts with clock when enabled by count[2] - bus1
//
//      1 period of 40MHz clock = 25ns
//
//      101 0000 0000 0000 0000 0000 = 5,242,880
//                        @ 30MHz = 174.76ms
//                        @ 40MHz = 131.00ms
//                        @ 50MHz = 104.86ms
//                   FB+ spec. = >100ms - <200ms
//      010 0000 0000 0000 0000 0000 = 2,097,152 ( continue from 2-4 )
//                        @ 30MHz =  69.91ms
//                        @ 40MHz =  52.00ms
//                        @ 50MHz =  41.94ms
//                   FB+ spec. = >  40ms - <  80ms
//      000 0100 0000 0000 0000 0000 =   262,144 ( continue from 2-4 )
//                        @ 30MHz =   8.74ms
//                        @ 40MHz =   6.55ms
//                        @ 50MHz =   5.24ms
//                   FB+ spec. = >   4ms - <  12ms
//      000 0001 1010 0000 0000 0000 =   106,496
//                        @ 30MHz =   3.55ms
//                        @ 40MHz =   2.66ms
//                        @ 50MHz =   2.13ms
//                   FB+ spec. = >   2ms - <   4ms
//              0100 0000 =        64
//                        @ 30MHz =   2.16us
//                        @ 40MHz =   1.60us
//                        @ 50MHz =   1.28us
//                   FB+ spec. = >   1us //*********************************************************************
// Gate and Structural Declarations
//*********************************************************************

//      * Internal signals
```

//node_27ea0/cadence/tifb/dcc/b/dcc_rst.v                                      modified 03/30/92 4:59 PM

```verilog
    assign
        cnt130      = air3[22] & air3[20] ,
        cnt50       = air3[21] ,
        cntx        = air3[29] ,
        cnt8        = air3[18] ,
        cnt3        = air3[16] & air3[15] & air3[13] ,
        cnt1        = air3[30] & count[2] ,
        align_c     = align_en & \rst* ,
        binit_c     = binit_en & \rst* ,
        sysrst_c    = sysrst_en & \rst* ,
        strst_c     = strst_en & \rst* ,
//      * External signals
        count_en[2] = count[2] & \rst* ,
        count_en[1] = count[1] & \rst* ,
        count_en[0] = count[0] & \rst* ,
        \reset_fb*  = \rst* & \binit_o* ,
        \reset_hb*  = \rst* & \sysrst_o* ;

//*****************************************************************************
// Procedural Assignments
//***************************************************************************** assign
        sm_ins = { ref2 , aqf2 , ar2 , as2 , ai2 , align_req , binit_req ,
                   sysrst_req , strst_req , alnwt2 , cnt130 , cnt50 , cnt8 ,
                   cnt3 , cntx , cnt1 ] , (ex_outs , req_en , n_st , sm_outs) = state_machine( p_st , sm_ins ) , count           = ex_outs_r[4:2] ,
        \align_occ*     = ex_outs_r[1] ,
        \st_ack*        = ex_outs_r[0] , align_en        = req_r[3] ,
        binit_en        = req_r[2] ,
        sysrst_en       = req_r[1] ,
        strst_en        = req_r[0] , \binit_o*       = sm_outs_r[3] ,
        \sysrst_o*      = sm_outs_r[2] ,
        reset_o         = sm_outs_r[1] ,
        \busi_o*        = sm_outs_r[0] ;

function [17:0] state_machine ;

input [4:0] p_st ;
        input [15:0] sm_ins ;

begin case ( p_st )    //synopsys full_case

5'b00000 :   // state A -- power_up check re_i & cnt130
                    begin
                        state_machine[17:15] = 3'b001 ;    // enable counter 1
                        state_machine[14]    = 1'b1 ;      // release \align_occ*
                        state_machine[13]    = 1'b1 ;      // release \st_ack*
                        state_machine[12]    = 1'b1 ;      // enable align request
                        state_machine[11]    = 1'b1 ;      // enable binit request
                        state_machine[10]    = 1'b1 ;      // enable sysrst request
                        state_machine[9]     = 1'b1 ;      // enable rststr request
                        state_machine[3]     = 1'b1 ;      // release \binit_o*
```

```
//node_27ea0/cadence/tifb/dcc/b/dcc_rst.v                              modified  03/30/92  4:59 PM state_machine[2]    = 1'b1 ;         // release \sysrst_o*
                state_machine[1]    = 1'b0 ;         // release reset_o
                state_machine[0]    = 1'b1 ;         // release \busi_o*
                if ( ref2 == 1'b1 )
                    state_machine[8:4] = 5'b00001 ;
                else
                if ( cnt130 && ! alnwt2 )
                    state_machine[8:4] = 5'b00010 ;  // auto alignment
                else
                    state_machine[8:4] = 5'b00000 ;
            end 5'b00001 :      // state B -- power_up check re_i
            begin
                state_machine[14]   = 1'b1 ;         // release \align_occ*
                state_machine[13]   = 1'b1 ;         // release \st_ack*
                state_machine[12]   = 1'b1 ;         // enable align request
                state_machine[11]   = 1'b1 ;         // enable binit request
                state_machine[10]   = 1'b1 ;         // enable sysrst request
                state_machine[9]    = 1'b1 ;         // enable rststr request
                state_machine[3]    = 1'b1 ;         // release \binit_o*
                state_machine[2]    = 1'b1 ;         // release \sysrst_o*
                state_machine[1]    = 1'b0 ;         // release reset_o
                state_machine[0]    = 1'b1 ;         // release \busi_o* state_machine[17:15] = 3'b011 ;      // enable counter 1 & 2
                if ( ! ref2 )
                    state_machine[8:4] = 5'b00000 ;  // go back
                else
                if ( cntx )
                    state_machine[8:4] = 5'b01001 ;  // system_reset
                else
                    state_machine[8:4] = 5'b00001 ;
            end 5'b00010 :      // state C -- power_up auto alignment
            begin
                state_machine[14]   = 1'b1 ;         // release \align_occ*
                state_machine[13]   = 1'b1 ;         // release \st_ack*
                state_machine[12]   = 1'b1 ;         // enable align request
                state_machine[11]   = 1'b1 ;         // enable binit request
                state_machine[10]   = 1'b1 ;         // enable sysrst request
                state_machine[9]    = 1'b1 ;         // enable rststr request
                state_machine[3]    = 1'b1 ;         // release \binit_o*
                state_machine[2]    = 1'b1 ;         // release \sysrst_o*
                state_machine[0]    = 1'b1 ;         // release \busi_o* state_machine[17:15] = 3'b000 ;      // disable counter
                state_machine[1]    = 1'b1 ;         // assert reset_o
                if ( !aqf2 && ar2 && !as2 && ai2 )
                    state_machine[8:4] = 5'b00011 ;  // bus idle
                else
                    state_machine[8:4] = 5'b00010 ;
            end 5'b00011 :      // state D -- bus idle
            begin
                state_machine[14]   = 1'b1 ;         // release \align_occ*
                state_machine[13]   = 1'b1 ;         // release \st_ack*
                state_machine[12]   = 1'b1 ;         // enable align request
                state_machine[11]   = 1'b1 ;         // enable binit request
                state_machine[10]   = 1'b1 ;         // enable sysrst request
                state_machine[9]    = 1'b1 ;         // enable rststr request
                state_machine[3]    = 1'b1 ;         // release \binit_o*
                state_machine[2]    = 1'b1 ;         // release \sysrst_o*
                state_machine[1]    = 1'b1 ;         // assert reset_o
                state_machine[0]    = 1'b1 ;         // release \busi_o* state_machine[17:15] = 3'b101 ;      // enable counter 1 & 3
                if ( cnt1 )
                    state_machine[8:4] = 5'b10110 ;  // alignment
                else
                    state_machine[8:4] = 5'b00011 ;
            end 5'b10110 :      // state X -- alignment
            begin
                state_machine[14]   = 1'b1 ;         // release \align_occ*
                state_machine[13]   = 1'b1 ;         // release \st_ack*
                state_machine[12]   = 1'b1 ;         // enable align request
                state_machine[11]   = 1'b1 ;         // enable binit request
                state_machine[10]   = 1'b1 ;         // enable sysrst request
```

//node_27ea0/cadence/tifb/dcc/b/dcc_rst.v                                        modified  03/30/92  4:59 PM

```verilog
            state_machine[9]   = 1'b1 ;      // enable rststr request
            state_machine[3]   = 1'b1 ;      // release \binit_o*
            state_machine[2]   = 1'b1 ;      // release \sysrst_o*
            state_machine[1]   = 1'b1 ;      // assert reset_o state_machine[17:15] = 3'b000 ;  // disable counter
            state_machine[0]   = 1'b0 ;      // assert \busi_o*
            state_machine[8:4] = 5'b10111 ;
          end 5'b10111 :    // state Y -- alignment transition
          begin
            state_machine[17:15] = 3'b000 ;  // disable counter
            state_machine[14]  = 1'b1 ;      // release \align_occ*
            state_machine[13]  = 1'b1 ;      // release \st_ack*
            state_machine[12]  = 1'b1 ;      // enable align request
            state_machine[11]  = 1'b1 ;      // enable binit request
            state_machine[10]  = 1'b1 ;      // enable sysrst request
            state_machine[9]   = 1'b1 ;      // enable rststr request
            state_machine[3]   = 1'b1 ;      // release \binit_o*
            state_machine[2]   = 1'b1 ;      // release \sysrst_o*
            state_machine[1]   = 1'b1 ;      // assert reset_o
            state_machine[0]   = 1'b0 ;      // assert \busi_o*
            state_machine[8:4] = 5'b10011 ;  // go to pre-normal
          end 5'b00100 :    // state E -- normal
          begin
            state_machine[13]  = 1'b1 ;      // release \st_ack*
            state_machine[12]  = 1'b1 ;      // enable align request
            state_machine[11]  = 1'b1 ;      // enable binit request
            state_machine[10]  = 1'b1 ;      // enable sysrst request
            state_machine[9]   = 1'b1 ;      // enable rststr request
            state_machine[2]   = 1'b1 ;      // release \sysrst_o*
            state_machine[1]   = 1'b0 ;      // release reset_o
            state_machine[0]   = 1'b1 ;      // release \busi_o* state_machine[17:15] = 3'b000 ;  // disable counter
            state_machine[14]  = 1'b1 ;      // release \align_occ*
            state_machine[3]   = 1'b1 ;      // release \binit_o*
            if ( ref2 )
               state_machine[8:4] = 5'b 00111 ;  // RE* asserted
            else
            if ( ! ref2 && sysrst_req )
               state_machine[8:4] = 5'b01101 ;   // global system reset
            else
            if ( ! ref2 && strst_req && ! as2 )  // steve 9/30
               state_machine[8:4] = 5'b10000 ;   // local system reset
            else
            if ( ! ref2 && binit_req )
               state_machine[8:4] = 5'b00101 ;   // bus init.
            else
            if ( ! ref2 && align_req )
               state_machine[8:4] = 5'b00010 ;   // alignment
            else
               state_machine[8:4] = 5'b00100 ;
          end 5'b00101 :    // state F -- "bus_init" bus init.
          begin
            state_machine[14]  = 1'b1 ;      // release \align_occ*
            state_machine[13]  = 1'b1 ;      // release \st_ack*
            state_machine[12]  = 1'b1 ;      // enable align request
            state_machine[11]  = 1'b1 ;      // enable binit request
            state_machine[10]  = 1'b1 ;      // enable sysrst request
            state_machine[9]   = 1'b1 ;      // enable rststr request
            state_machine[3]   = 1'b1 ;      // release \binit_o*
            state_machine[2]   = 1'b1 ;      // release \sysrst_o*
            state_machine[0]   = 1'b1 ;      // release \busi_o* state_machine[17:15] = 3'b001 ;  // enable counter 1
            state_machine[1]   = 1'b1 ;      // assert reset_o
            if ( cnt3 )
               state_machine[8:4] = 5'b00110 ;  // bus init.
            else
               state_machine[8:4] = 5'b00101 ;
          end 5'b00110 :    // state G -- "bus_init" bus init.
          begin
            state_machine[17:15] = 3'b001 ;  // enable counter 1
            state_machine[14]  = 1'b1 ;      // release \align_occ*
```

//node_27ea0/cadence/tifb/dcc/b/dcc_rst.v                                              modified 03/30/92 4:59 PM

```verilog
                    state_machine[13]   = 1'b1 ;           // release \st_ack*
                    state_machine[12]   = 1'b1 ;           // enable align request
                    state_machine[11]   = 1'b1 ;           // enable binit request
                    state_machine[10]   = 1'b1 ;           // enable sysrst request
                    state_machine[9]    = 1'b1 ;           // enable rststr request
                    state_machine[2]    = 1'b1 ;           // release \sysrst_o*
                    state_machine[1]    = 1'b1 ;           // release reset_o
                    state_machine[0]    = 1'b1 ;           // release \busi_o* state_machine[3]    = 1'b0 ;           // assert \binit_o*
                    if ( cnt8 )
                        state_machine[8:4] = 5'b10011 ;    // go to pre-normal
                    else
                        state_machine[8:4] = 5'b00110 ;
                end 5'b00111 :      // state H -- RE* asserted
                begin
                    state_machine[14]   = 1'b1 ;           // release \align_occ*
                    state_machine[13]   = 1'b1 ;           // release \st_ack*
                    state_machine[12]   = 1'b1 ;           // enable align request
                    state_machine[11]   = 1'b1 ;           // enable binit request
                    state_machine[10]   = 1'b1 ;           // enable sysrst request
                    state_machine[9]    = 1'b1 ;           // enable rststr request
                    state_machine[3]    = 1'b1 ;           // release \binit_o*
                    state_machine[2]    = 1'b1 ;           // release \sysrst_o*
                    state_machine[1]    = 1'b0 ;           // release reset_o
                    state_machine[0]    = 1'b1 ;           // release \busi_o* state_machine[17:15] = 3'b001 ;        // enable counter 1
                    if ( ! ref2 )
                        state_machine[8:4] = 5'b11000 ;    // set alignment occur
                    else
                    if ( cnt3 )
                        state_machine[8:4] = 5'b01000 ;    // bus init.
                    else
                        state_machine[8:4] = 5'b00111 ;
                end 5'b11000 :      // state Z -- set alignment occur
                begin
                    state_machine[13]   = 1'b1 ;           // release \st_ack*
                    state_machine[12]   = 1'b1 ;           // enable align request
                    state_machine[11]   = 1'b1 ;           // enable binit request
                    state_machine[10]   = 1'b1 ;           // enable sysrst request
                    state_machine[9]    = 1'b1 ;           // enable rststr request
                    state_machine[3]    = 1'b1 ;           // release \binit_o*
                    state_machine[2]    = 1'b1 ;           // release \sysrst_o*
                    state_machine[1]    = 1'b0 ;           // release reset_o
                    state_machine[0]    = 1'b1 ;           // release \busi_o* state_machine[17:15] = 3'b000 ;        // disable counter
                    state_machine[14]    = 1'b0 ;          // assert \align_occ*
                    state_machine[8:4]   = 5'b00100 ;      // return to normal
                end 5'b01000 :      // state J -- "RE*" bus init.
                begin
                    state_machine[17:15] = 3'b001 ;        // enable counter 1
                    state_machine[14]   = 1'b1 ;           // release \align_occ*
                    state_machine[13]   = 1'b1 ;           // release \st_ack*
                    state_machine[12]   = 1'b1 ;           // enable align request
                    state_machine[11]   = 1'b1 ;           // enable binit request
                    state_machine[10]   = 1'b1 ;           // enable sysrst request
                    state_machine[9]    = 1'b1 ;           // enable rststr request
                    state_machine[2]    = 1'b1 ;           // release \sysrst_o*
                    state_machine[1]    = 1'b0 ;           // release reset_o
                    state_machine[0]    = 1'b1 ;           // release \busi_o* state_machine[3]    = 1'b0 ;           // assert \binit_o*
                    if ( ! ref2 )
                        state_machine[8:4] = 5'b00100 ;    // return to normal
                    else
                    if ( cnt50 )
                        state_machine[8:4] = 5'b01001 ;    // global system reset
                    else
                        state_machine[8:4] = 5'b01000 ;
                end 5'b01001 :      // state K -- "\rst_i*" ,"RE*" or "sysrst" bit
                begin       //             global system reset
                    state_machine[14]   = 1'b1 ;           // release \align_occ*
```

```
//node_27ea0/cadence/tifb/dcc/b/dcc_rst.v                                        modified 03/30/92 4:59 P:

state_machine[13]    = 1'b1 ;         // release \st_ack*
            state_machine[12]    = 1'b1 ;         // enable align request
            state_machine[11]    = 1'b1 ;         // enable binit request
            state_machine[10]    = 1'b1 ;         // enable sysrst request
            state_machine[9]     = 1'b1 ;         // enable rststr request
            state_machine[0]     = 1'b1 ;         // release \busi_o* state_machine[17:15] = 3'b000 ;       // disable counter
            state_machine[3]     = 1'b0 ;         // assert \binit_o*
            state_machine[2]     = 1'b0 ;         // assert \sysrst_o*
            state_machine[1]     = 1'b1 ;         // assert reset_o
            state_machine[8:4]   = 5'b01010 ;     // global system reset
         end 5'b01010 :     // state L -- global system reset
         begin
            state_machine[14]    = 1'b1 ;         // release \align_occ*
            state_machine[13]    = 1'b1 ;         // release \st_ack*
            state_machine[12]    = 1'b1 ;         // enable align request
            state_machine[11]    = 1'b1 ;         // enable binit request
            state_machine[10]    = 1'b1 ;         // enable sysrst request
            state_machine[9]     = 1'b1 ;         // enable rststr request
            state_machine[3]     = 1'b0 ;         // assert \binit_o*
            state_machine[2]     = 1'b0 ;         // assert \sysrst_o*
            state_machine[1]     = 1'b1 ;         // assert reset_o
            state_machine[0]     = 1'b1 ;         // release \busi_o* state_machine[17:15] = 3'b001 ;       // enable counter 1
            if ( cnt3 )
                state_machine[8:4] = 5'b01011 ;   // global system reset
            else
                state_machine[8:4] = 5'b01010 ;
         end 5'b01011 :     // state M -- global system reset
         begin
            state_machine[14]    = 1'b1 ;         // release \align_occ*
            state_machine[13]    = 1'b1 ;         // release \st_ack*
            state_machine[12]    = 1'b1 ;         // enable align request
            state_machine[11]    = 1'b1 ;         // enable binit request
            state_machine[10]    = 1'b1 ;         // enable sysrst request
            state_machine[9]     = 1'b1 ;         // enable rststr request
            state_machine[3]     = 1'b0 ;         // assert \binit_o*
            state_machine[1]     = 1'b1 ;         // assert reset_o
            state_machine[0]     = 1'b1 ;         // release \busi_o* state_machine[17:15] = 3'b000 ;       // disable counter
            state_machine[2]     = 1'b1 ;         // release \sysrst_o*
            state_machine[8:4]   = 5'b01100 ;     // global system reset
         end 5'b01100 :     // state N -- global system reset
         begin
            state_machine[14]    = 1'b1 ;         // release \align_occ*
            state_machine[13]    = 1'b1 ;         // release \st_ack*
            state_machine[12]    = 1'b1 ;         // enable align request
            state_machine[11]    = 1'b1 ;         // enable binit request
            state_machine[10]    = 1'b1 ;         // enable sysrst request
            state_machine[9]     = 1'b1 ;         // enable rststr request
            state_machine[2]     = 1'b1 ;         // release \sysrst_o*
            state_machine[1]     = 1'b1 ;         // assert reset_o
            state_machine[0]     = 1'b1 ;         // release \busi_o* state_machine[17:15] = 3'b001 ;       // enable counter 1
            state_machine[3]     = 1'b1 ;         // release \binit_o*
            if ( cnt130 && ! alnwt2 )
                state_machine[8:4] = 5'b10011 ;   // go to pre-normal
            else
                state_machine[8:4] = 5'b01100 ;
         end 5'b01101 :     // state P -- "sys_reset" global system reset
         begin
            state_machine[14]    = 1'b1 ;         // release \align_occ*
            state_machine[13]    = 1'b1 ;         // release \st_ack*
            state_machine[12]    = 1'b1 ;         // enable align request
            state_machine[11]    = 1'b1 ;         // enable binit request
            state_machine[10]    = 1'b1 ;         // enable sysrst request
            state_machine[9]     = 1'b1 ;         // enable rststr request
            state_machine[3]     = 1'b1 ;         // release \binit_o*
            state_machine[2]     = 1'b1 ;         // release \sysrst_o*
            state_machine[0]     = 1'b1 ;         // release \busi_o*
```

//node_27ea0/cadence/tifb/dcc/b/dcc_rst.v                                modified 03/30/92 4:59 PM

```
                        state_machine[17:15] = 3'b001 ;    // enable counter 1
                        state_machine[1]     = 1'b1 ;      // assert reset_o
                        if ( cnt3 )
                           state_machine[8:4] = 5'b01110 ; // bus init.
                        else
                           state_machine[8:4] = 5'b01101 ;
                     end 5'b01110 :    // state Q -- "sys_reset" global system reset
                     begin
                        state_machine[17:15] = 3'b001 ;    // enable counter 1
                        state_machine[14]    = 1'b1 ;      // release \align_occ*
                        state_machine[13]    = 1'b1 ;      // release \st_ack*
                        state_machine[12]    = 1'b1 ;      // enable align request
                        state_machine[11]    = 1'b1 ;      // enable binit request
                        state_machine[10]    = 1'b1 ;      // enable sysrst request
                        state_machine[9]     = 1'b1 ;      // enable rststr request
                        state_machine[2]     = 1'b1 ;      // release \sysrst_o*
                        state_machine[1]     = 1'b1 ;      // assert reset_o
                        state_machine[0]     = 1'b1 ;      // release \busi_o* state_machine[3]     = 1'b0 ;      // assert \binit_o*
                        if ( cnt50 )
                           state_machine[8:4] = 5'b01001 ; // global system reset
                        else
                           state_machine[8:4] = 5'b01110 ;
                     end 5'b10000 :    // state R -- "start_reset" local system reset
                     begin
                        state_machine[14]    = 1'b1 ;      // release \align_occ*
                        state_machine[13]    = 1'b1 ;      // release \st_ack*
                        state_machine[12]    = 1'b1 ;      // enable align request
                        state_machine[11]    = 1'b1 ;      // enable binit request
                        state_machine[10]    = 1'b1 ;      // enable sysrst request
                        state_machine[9]     = 1'b1 ;      // enable rststr request
                        state_machine[3]     = 1'b1 ;      // release \binit_o*
                        state_machine[1]     = 1'b0 ;      // release reset_o
                        state_machine[0]     = 1'b1 ;      // release \busi_o* state_machine[17:15] = 3'b001 ;    // enable counter 1
                        state_machine[2]     = 1'b0 ;      // assert \sysrst_o*
                        if ( cnt3 )
                           state_machine[8:4] = 5'b10001 ; // local system reset
                        else
                           state_machine[8:4] = 5'b10000 ;
                     end 5'b10001 :    // state S -- local system reset
                     begin
                        state_machine[14]    = 1'b1 ;      // release \align_occ*
                        state_machine[13]    = 1'b1 ;      // release \st_ack*
                        state_machine[12]    = 1'b1 ;      // enable align request
                        state_machine[11]    = 1'b1 ;      // enable binit request
                        state_machine[10]    = 1'b1 ;      // enable sysrst request
                        state_machine[9]     = 1'b1 ;      // enable rststr request
                        state_machine[3]     = 1'b1 ;      // release \binit_o*
                        state_machine[1]     = 1'b0 ;      // release reset_o
                        state_machine[0]     = 1'b1 ;      // release \busi_o* state_machine[17:15] = 3'b000 ;    // disable counter
                        state_machine[2]     = 1'b1 ;      // release \sysrst_o*
                        state_machine[8:4]   = 5'b10010 ;  // local system reset
                     end 5'b10010 :    // state T -- local system reset
                     begin
                        state_machine[14]    = 1'b1 ;      // release \align_occ*
                        state_machine[13]    = 1'b1 ;      // release \st_ack*
                        state_machine[12]    = 1'b1 ;      // enable align request
                        state_machine[11]    = 1'b1 ;      // enable binit request
                        state_machine[10]    = 1'b1 ;      // enable sysrst request
                        state_machine[9]     = 1'b1 ;      // enable rststr request
                        state_machine[3]     = 1'b1 ;      // release \binit_o*
                        state_machine[2]     = 1'b1 ;      // release \sysrst_o*
                        state_machine[1]     = 1'b0 ;      // release reset_o
                        state_machine[0]     = 1'b1 ;      // release \busi_o* state_machine[17:15] = 3'b001 ;    // enable counter 1
                        if ( ref2 )
                           state_machine[8:4] = 5'b10100 ; // RE* asserted
```

//node_27es0/cadence/tifb/dcc/b/dcc_rst.v                              modified 03/30/92 4:59 Pl

```verilog
            else
            if ( cnt130 && ! alnwt2 )
                state_machine[8:4] = 5'b10101 ;       // set acknowledge
            else
                state_machine[8:4] = 5'b10010 ;
        end 5'b10100 :      // state U -- RE* asserted
        begin
            state_machine[14]    = 1'b1 ;       // release \align_occ*
            state_machine[13]    = 1'b1 ;       // release \st_ack*
            state_machine[12]    = 1'b1 ;       // enable align request
            state_machine[11]    = 1'b1 ;       // enable binit request
            state_machine[10]    = 1'b1 ;       // enable sysrst request
            state_machine[9]     = 1'b1 ;       // enable rststr request
            state_machine[3]     = 1'b1 ;       // release \binit_o*
            state_machine[2]     = 1'b1 ;       // release \sysrst_o*
            state_machine[1]     = 1'b0 ;       // release reset_o
            state_machine[0]     = 1'b1 ;       // release \busi_o* state_machine[17:15] = 3'b011 ;     // enable counter 1 & 2
            if ( ! ref2 )
                state_machine[8:4] = 5'b10010 ;    // local system reset
            else
            if ( cntx )
                state_machine[8:4] = 5'b01001 ;    // global system reset
            else
                state_machine[8:4] = 5'b10100 ;
        end 5'b10101 :      // state V -- set acknowledge
        begin
            state_machine[14]    = 1'b1 ;       // release \align_occ*
            state_machine[12]    = 1'b1 ;       // enable align request
            state_machine[11]    = 1'b1 ;       // enable binit request
            state_machine[10]    = 1'b1 ;       // enable sysrst request
            state_machine[9]     = 1'b1 ;       // enable rststr request
            state_machine[3]     = 1'b1 ;       // release \binit_o*
            state_machine[2]     = 1'b1 ;       // release \sysrst_o*
            state_machine[1]     = 1'b0 ;       // release reset_o
            state_machine[0]     = 1'b1 ;       // release \busi_o* state_machine[17:15] = 3'b000 ;     // disable counter
            state_machine[13]    = 1'b0 ;       // assert \st_ack*
            state_machine[8:4]   = 5'b10011 ;   // go to pre-normal
        end 5'b10011 :      // state W -- wait for RE* released
        begin
            state_machine[14]    = 1'b1 ;       // release \align_occ*
            state_machine[2]     = 1'b1 ;       // release \sysrst_o* state_machine[17:15] = 3'b000 ;     // disable counter
            state_machine[13]    = 1'b1 ;       // release \st_ack*
            state_machine[3]     = 1'b1 ;       // release \binit_o*
            state_machine[1]     = 1'b0 ;       // release reset_o
            state_machine[0]     = 1'b1 ;       // release \busi_o*
            if ( align_req )
                state_machine[12] = 1'b0 ;      // clear align request
            else
                state_machine[12] = 1'b1 ;      // enable align request
            if ( binit_req )
                state_machine[11] = 1'b0 ;      // clear binit request
            else
                state_machine[11] = 1'b1 ;      // enable binit request
            if ( sysrst_req )
                state_machine[10] = 1'b0 ;      // clear sysrst request
            else
                state_machine[10] = 1'b1 ;      // enable sysrst request
            if ( strst_req )
                state_machine[9] = 1'b0 ;       // clear rststr request
            else
                state_machine[9] = 1'b1 ;       // enable rststr request
            if ( ! ref2 )
                state_machine[8:4] = 5'b00100 ;    // return to normal
            else
                state_machine[8:4] = 5'b10011 ;
        end endcase end
```

```
//node_27ea0/cadence/tifb/doc/b/doc_rst.v                              modified 03/30/92 4:59 PM endfunction //*********************************************************************
// Task and Function Definitions
//*********************************************************************
// Not Applicable `endprotect
//*********************************************************************
// End of Model
//*********************************************************************
endmodule
```

//node_27ea0/cadence/tifb/dcc/b/dcc_fil.v                              modified 03/30/92 4:57 PM

```verilog
//*********************************************************************
//
//      Model Name      : dcc_fil.v
//      Revision        : $Revision: 1.7 $
//      Date            : $Date: 92/03/30 16:57:34 $
//      Author          : Phil Roden
//      Description     : dcc glitch filters
//
//*********************************************************************

//*********************************************************************
// Module Definition
//*********************************************************************
`protect module dcc_fil
        (
        // Inputs
                ak_i ,          // fbus address acknowledge
                ai_i ,          // fbus address acknowledge inverse
                dk_i ,          // fbus data acknowledge
                di_i ,          // fbus data acknowledge inverse
                aq_i ,          // fbus data arbitration message sync
                re_i ,          // fbus data fbus reset
                filtr_sel,      // glitch filter select from CSR // Outputs
                ak_f_i ,        // fbus address acknowledge filtered
                ai_f_i ,        // fbus addr. acknowledge inverse filtered
                dk_f_i ,        // fbus data acknowledge filtered
                di_f_i ,        // fbus data ack. inverse filtered
                aq_f_i ,        // fbus data arbitration message sync filtered
                re_f_i          // fbus data fbus reset filtered
                );

//*********************************************************************
// Define Parameters (optional)
//*********************************************************************

// Not Applicable

//*********************************************************************
// Port Declarations
//********************************************************************* input ak_i, ai_i, dk_i, di_i, aq_i, re_i;

input [2:0]
                filtr_sel ;

output  ak_f_i, ai_f_i, dk_f_i, di_f_i, aq_f_i, re_f_i;

//*********************************************************************
// Pre-defined Module Instantiations
//*********************************************************************

//*********************************************************************
// Gate and Structural Declarations
//*********************************************************************

//*********************************************************************
// Procedural Assignments
//********************************************************************* wire #(filtr_dec(filtr_sel)) ak_f_i = ak_i ;
        wire #(filtr_dec(filtr_sel)) ai_f_i = ai_i ;
        wire #(filtr_dec(filtr_sel)) dk_f_i = dk_i ;
        wire #(filtr_dec(filtr_sel)) di_f_i = di_i ;
        wire #(filtr_dec(filtr_sel)) aq_f_i = aq_i ;
        wire #(filtr_dec(filtr_sel)) re_f_i = re_i ;

//*********************************************************************
// Task and Function Definitions
//********************************************************************* function [8:0]filtr_dec;
          input [2:0] filtr_sel;
```

//node_27ea0/cadence/tifb/dcc/b/dcc_fil.v                                    modified  03/30/92  4:57 P

```
      begin
      casez (filtr_sel)
        3'b0?? : filtr_dec = 1 ;
        3'b100 : filtr_dec = 2 ;
        3'b101 : filtr_dec = 4 ;
        3'b110 : filtr_dec = 6 ;
        3'b111 : filtr_dec = 8 ;
      endcase
      end
    endfunction
`endprotect
//*********************************************************************
// End of Model
//*********************************************************************
endmodule
```

What is claimed is:

1. A bus controller, comprising:

a system bus control module connected to a system bus; and a local bus control module connected to the system bus control module and a local bus, wherein the system bus control module and the local bus control module provide simultaneous, autonomous activity with both the local bus and the system bus and allow the bus controller to resolve bus collisions caused by the bus controller attempting to be a slave on the local bus and the system bus simultaneously by asserting a "back-off" signal to discontinue attempts by other components on a system board to obtain mastership of a bus until completion of a higher priority task and further allow the bus controller to resolve "live-lock" conditions by confining "back-off" signals to local buses, thereby circumventing situations where multiple boards alternatively back each other off the system bus.

2. The bus controller of claim 1 further comprising at least one control status register connected to both the local bus module and the system bus module, said at least one control status register indicating a capability of components within a computer system.

3. The bus controller of claim 1 further comprising:

a reset circuit connected to the local bus control module and the system bus control module, whereby the reset circuit executes various types of reset such as start, power-up, system initialization and local bus initialization; and a filter circuit connected to the system bus control module, the reset circuit, and the system bus, whereby the filter circuit is operable to filter incoming signals from the system bus.

4. The bus controller of claim 1 wherein the local bus control module further comprises:

a local bus control circuit that monitors signals on the local bus and communicates a status of the local bus to the system bus control module; and a local bus decoder/encoder circuit that decodes or encodes command signals between the local bus and the system bus.

5. The bus controller of claim 1 wherein the system bus control module further comprises a system bus control circuit that monitors signals on the system bus and communicates a status of the system bus to the local bus control module.

* * * * *